(12) United States Patent  
Watanabe et al.

(10) Patent No.: US 10,581,841 B2  
(45) Date of Patent: Mar. 3, 2020

(54) AUTHENTICATED NETWORK

(71) Applicant: Zentel Japan Corporation, Tokyo (JP)

(72) Inventors: Hiroshi Watanabe, Kanagawa-ken (JP); Takeshi Hamamoto, Hyogo (JP)

(73) Assignee: Zentel Japan Corporation, Tokyo (JP)

( * ) Notice: Subject to any disclaimer, the term of this patent is extended or adjusted under 35 U.S.C. 154(b) by 416 days.

(21) Appl. No.: 15/430,650

(22) Filed: Feb. 13, 2017

(65) Prior Publication Data

US 2018/0234413 A1 Aug. 16, 2018

(51) Int. Cl.
*H04L 29/06* (2006.01)
*H04L 9/32* (2006.01)
(Continued)

(52) U.S. Cl.
CPC ........ *H04L 63/0861* (2013.01); *G06F 9/4406* (2013.01); *G06F 21/575* (2013.01);
(Continued)

(58) Field of Classification Search
CPC ............. H04L 63/0861; H04L 63/0823; H04L 63/0428; H04L 9/3268; H04L 41/0803;
(Continued)

(56) References Cited

U.S. PATENT DOCUMENTS 4,509,172 A * 4/1985 Chen .................. G06F 11/1028
714/759
6,119,233 A * 9/2000 Hawkins ................. H04L 51/00
726/26

(Continued)

FOREIGN PATENT DOCUMENTS

JP   2005-123883 A   5/2005
JP    2009519473 A   5/2009
(Continued)

OTHER PUBLICATIONS

Zvi Gutterman, et al., "Analysis of the Linux Random Number Generator", May 2006, Proceedings of the 2006 IEEE Symposium on Security and Privacy (S&P'06), 2006 (Year: 2006).*

(Continued)

*Primary Examiner* — Farid Homayounmehr
*Assistant Examiner* — Raied A Salman
(74) *Attorney, Agent, or Firm* — Alan D. Kamrath; Karin L. Williams; Mayer & Williams PC

(57) ABSTRACT

An authenticated network in which a physical network including physical nodes with actual physical substances and a logical network including logical nodes without actual substances are uniquely linked to expand public ledger technology, which secures Peer-to-peer (P2P) type communication on a logical network, to a physical network, is provided. The authenticated network includes a private key uniquely linked to a public key. The private key is generated by a key generator and an identification device having physical substance and included in an identification core. The private key is regarded as a physical address of the identification core and is confined in the identification core. The public key is publicized as a logical address of a logical node. The logical node and the physical node are uniquely linked by the public key and the private key. The security of the whole network is thus effectively improved.

16 Claims, 72 Drawing Sheets

(51) Int. Cl.
*G06F 9/4401* (2018.01)
*G06F 21/57* (2013.01)
*H04L 9/06* (2006.01)
*H04L 9/08* (2006.01)

(52) U.S. Cl.
CPC .......... *H04L 9/0637* (2013.01); *H04L 9/0869* (2013.01); *H04L 9/3239* (2013.01); *H04L 9/3247* (2013.01); *G06F 2221/034* (2013.01); *H04L 2209/38* (2013.01); *H04L 2209/56* (2013.01)

(58) Field of Classification Search
CPC ... H04L 41/0806; H04L 67/12; H04L 67/125; G11C 16/10; G11C 16/26; G11C 16/3459; G11C 16/0483; G06F 21/75; G06F 9/4406; G06F 9/0637; G06F 9/0869; G06F 9/3239; G06F 9/3247; G06K 7/1413; G06K 7/1486
USPC .................................................. 713/168, 192
See application file for complete search history.

(56) References Cited

U.S. PATENT DOCUMENTS

| | | | | |
|---|---|---|---|---|
| 6,229,731 | B1* | 5/2001 | Kasai ..................... | G11C 16/22 365/185.04 |
| 6,704,871 | B1* | 3/2004 | Kaplan .................. | G06F 21/72 713/192 |
| 6,871,168 | B1* | 3/2005 | Tanaka ................... | G11C 29/56 703/2 |
| 8,040,725 | B2* | 10/2011 | Kang .................. | G11C 11/5642 365/185.03 |
| 8,533,492 | B2* | 9/2013 | Kasuya ................ | H04L 9/3242 713/189 |
| 9,292,710 | B2* | 3/2016 | Kim ........................ | G06F 21/73 |
| 9,563,501 | B2* | 2/2017 | Bueb .................... | G06F 11/1012 |
| 9,626,543 | B1* | 4/2017 | Ray ...................... | G06K 7/1413 |
| 9,640,240 | B2* | 5/2017 | Riho .................. | G11C 11/40622 |
| 9,729,324 | B2* | 8/2017 | Yamamoto .............. | H04L 9/32 |
| 10,073,779 | B2* | 9/2018 | Hum ................... | G06F 12/0811 |
| 10,169,126 | B2* | 1/2019 | Lim ..................... | G06F 3/0619 |
| 10,187,376 | B2* | 1/2019 | Vijayasankar ...... | H04L 63/0823 |
| 10,248,499 | B2* | 4/2019 | Sehgal ................ | G06F 11/1068 |
| 10,268,843 | B2* | 4/2019 | Fiske ..................... | G06F 9/448 |
| 2007/0240204 | A1* | 10/2007 | Somekawa ............. | H04L 63/08 726/5 |
| 2008/0237506 | A1 | 10/2008 | Ophey et al. | |
| 2013/0047209 | A1* | 2/2013 | Satoh ..................... | H04L 9/3278 726/2 |
| 2015/0207627 | A1* | 7/2015 | Yamamoto ................ | H04L 9/32 713/168 |
| 2016/0154979 | A1* | 6/2016 | Kim ........................ | G06F 21/73 713/189 |
| 2016/0254235 | A1* | 9/2016 | Leobandung ......... | H01L 23/544 257/368 |
| 2017/0054550 | A1* | 2/2017 | Choi ..................... | H04L 9/0637 |
| 2017/0110206 | A1* | 4/2017 | Ryu ........................ | G11C 29/44 |
| 2018/0261290 | A1* | 9/2018 | Uehara ............... | G11C 11/5628 |

FOREIGN PATENT DOCUMENTS

| | | |
|---|---|---|
| JP | 2013131868 A | 7/2013 |
| JP | 2015139010 A | 7/2015 |
| JP | 2015201884 A | 11/2015 |
| WO | WO2011118548 A1 | 9/2011 |

OTHER PUBLICATIONS

Kai-Min Chung, et al., "Physical Randomness Extractors: Generating Random Number with Minimal Assumptions", https://www.researchgate.net/publication/260269232_Physical_Randomness_Extractors, Mar. 2015, 2015 (Year: 2015).*

Huaiqing Lin, et al., CL-PKC-Based Secure Multicast Communication for P2P Network, Apr. 2010, 2010 Second International Conference on Networks Security, Wireless Communications and Trusted Computing, pp. 1-4.*

Taher Elgamal, A Public Key Cryptosystem and a Signature Scheme Based on Discrete Logarithms,IEEE Transactions on Information Theory, Jul. 1985, 4 pages, vol. IT-31, No. 4, IEEE, USA.

R.L. Rivest, A. Shamir, and L. Adleman, A Method for Obtaining Digital Signatures and Public-Key Cryptosystems, Communications of the ACM, Feb. 1978, pp. 120-126, vol. 21, Issue 2, ACM, Inc., USA.

Fatemeh Tehranipoor, Nima Karimian, Kan Xiao and John Chandy, DRAM based Intrinsic Physical Unclonable Functions for System Level Security, 2015, 7 pages, Association for Computing Machinery (ACM), Philadelphia, PA, USA.

Yoshiki Higashikado et al., A study on certificate management in consortium chain, 2017 Symposium on Cryptography and Information Security, The Institute of Electronics, Information and Communication Engineers, Japan, Jan. 24, 2017, 7 pages, Japan.

* cited by examiner

| input code | registration code 403 |
|---|---|
| RTSDEDDTAG!$&D() | oq&\|QX5'Xj*LS]e{lCY |
|  | C(Y6;sHWLnp!L+5P[+@ |
|  | p;A18;6Nd[ic8a"+.SO |
|  | wG;x'5@/O(GM";ODS+K |
|  | ... |
| 0D$zD)X=Fpgd[_&x.*n | LJ/z5J@e$q9mhd0/9Mx |
|  | _pJQ|9ecbe{2Ieq=!?E |
|  | u+x~53cvmJfyvZ"GzI# |
|  | cb9KvCaB7p~uzUwM+Pb |
| ... | ... |

402 / 403

FIG. 18 input code: $\{a(i)\}$ output code: $c(i) = mod(a(i) + d(i), 2)$

| $a(i)$ | $d(i)$ | $c(i)$ |
|---|---|---|
| 0 | 0 | 0 |
| 0 | 1 | 1 |
| 1 | 0 | 1 |
| 1 | 1 | 0 |

FIG. 32 input code: $\{a(i)\}$ intermediate code: $f(i) = mod(a(i) + d(i+N), 2)$

| $a(i)$ | $d(i+N)$ | $f(i)$ |
|---|---|---|
| 0 | 0 | 0 |
| 0 | 1 | 1 |
| 1 | 0 | 1 |
| 1 | 1 | 0 |

FIG. 35 intermediate code: $\{f(i)\}$ output code: $c(i) = mod(f(i) + d(i), 2)$

| $f(i)$ | $d(i)$ | $c(i)$ |
|---|---|---|
| 0 | 0 | 0 |
| 0 | 1 | 1 |
| 1 | 0 | 1 |
| 1 | 1 | 0 |

FIG. 36

AUTHENTICATED NETWORK

BACKGROUND OF THE INVENTION

1. Field of the Invention

The present disclosure generally relates to networks with the technology to authenticate apparatuses existing in the networks, and more particularly, in networks of client-server (CS) type and peer-to-peer (P2P) type.

2. Description of the Related Art

The number of apparatuses connected to internet has increased in recent years along with development. The configuration of networks has become complicated and diversified. However, it may be roughly classified into two types: (1) the client-server (CS) type where servers have a specialized function playing roles of central nodes (stem nodes) and (2) the peer-to-peer (P2P) type where all nodes are connected on even ground without any stem nodes. However, there must be a smallest network unit in any types of network, as shown in FIG. 1.

Similarly, the network may generally have nominal points (nodes) and communication lines (links). In FIG. 1, a first node 2001 and a second node 2002 are linked by a signal transmission pathway 1000 serving as communication line. For example, the first node 2001 and the second node 2002 exchange a protocol data unit via the signal transmission pathway 1000. The first node 2001 and the second node 2002 treat the protocol data unit according to protocols sharing consistency to some extent, respectively.

There are names usually used for protocol data units: frame, packet, segment and so on. Those names are used separately regarding communication hierarchy (communication layer, or layer) and defined by the concept of the whole network system. For example, as shown in FIG. 2, there are physical layer (layer-1), datalink layer (layer-2), network layer (layer-3), transport layer (layer-4), and upper layer (layer-5) from bottom to top. However, this communication configuration is merely one of the examples. Under a different concept, the transport layer may be decomposed into three layers to form a configuration of seven layers. In general, the protocol data unit is called frame in the datalink layer (layer-2), packet in the network layer (layer-3), and segment in the transport layer (layer-4).

(Communication Hierarchy)

In general, the information communication via internet may be to exchange suitable sized pieces of cut and divided digital data between nodes serving as information terminals on the network. A group of pieces of data attached with control information necessary to the management in the network is called protocol data unit. The regular arrangement of pieces of data and control information is called format. The format and its usage are regulated by a kind of procedure called protocol. Two nodes mutually making information communication must be subject to protocols respectively sharing a certain consistency.

The illustration is continued under the configuration of five layers in FIG. 2 as follows:

First, the original data to be transmitted may be divided into suitable sized pieces of data. The communication layer where data given like this exists is the upper layer (layer-5) shown in FIG. 2.

A TCP header is attached to this data. TCP is an abbreviation of transmission control protocol, that is, a kind of protocol. Thus, a data attached with TCP header is called a segment. The communication layer to treat segments is the transport layer (layer-4).

A segment attached with an internet protocol header (IP header) is a protocol data unit called a packet. The communication layer treating packets is the network layer (layer-3) and the protocol is IP. There are versions, for example, IPv4 and IPv6.

A packet attached with an Ethernet protocol header (Ethernet header) is a protocol data unit called a frame. The communication layer treating frames is the datalink layer (layer-2) and the protocol is Ethernet.

The Ethernet standard may be able to define the conversion to the physical layer at the bottom (layer-1), that is, the conversion to optical signal or electrical signal. The converted frame may be passed to a cable such as 10BASE-T and so forth.

The communication hierarchy has a configuration of a nesting structure, wherein each layer is independent from the others. More specifically, as shown in FIG. 2, the format of segment in the layer-4 (transport layer), which is data attached with TCP header only, includes the format of layer-5 (upper layer), which is data only without revision. Accordingly, the TCP header and the original data are not confused irreversibly. Similarly, the format of packet of layer-3 (network layer), which is a segment attached with IP header only, includes the format of layer-4 (transport layer), which is segment only without revision. Accordingly, the IP header and the segment are not confused irreversibly. In addition, the format of the frame of layer-2 (datalink layer), which is packet attached with Ethernet header and FCS (frame check sequence), includes the format of layer-3 (network layer), which is packet only without revision. Accordingly, the Ethernet header and the FCS are not confused with the packet irreversibly. Here, FCS is an abbreviation of frame check sequence, which is used for checking if the packet is appropriately received.

With such configuration, upper layers are free from any change in the format or protocol in lower layers.

For example, in FIG. 2, the original data is not influenced at all by replacing TCP header with another header in the layer-4 (transport layer). That is, the layer-5 (upper layer) is not influenced at all even by making any changes in the layer-4 (transport layer).

Similarly, the segment is not influenced at all by changing IP header from IPv4 to IPv 6 in the layer-3 (network layer). That is, the layer-4 (transport layer) is not influenced at all even by making any changes in the layer-3 (network layer). The layer-5 (upper layer) is free from any change if the layer-4 (transport layer) is not influenced at all.

In addition, the packet is not influenced at all by replacing Ethernet header with another in the layer-2 (data link layer). For example, the packet is free from any change by changing the protocol from Ethernet to Point-to-Point Protocol (PPP). Accordingly, the layer-3 (network layer) is not influenced at all even by making any changes in the layer-2 (datalink layer). The layer-4 (transport layer) is free from any change if the layer-3 (network layer) is not influenced at all. The layer-5 (upper layer) is also free from any change if the layer-4 (transport layer) is free from any change.

In addition, the layer-2 (datalink layer) is not influenced at all even by making any changes in the layer-1 (physical layer). For example, suppose signal transmission pathways are changed from optical fibers to wireless LAN. Even in this case, the contents of information (frame) to be transmitted via optical fibers must be identical to that via wireless LAN. The layer-3 (network layer) is free from any change if the layer-2 (datalink layer) is not influenced at all. The layer-4 (transport layer) is free from any change if the layer-3 (network layer) is not influenced at all. The layer-5 (upper layer) is also free from any change if the layer-4 (transport layer) is free from any change.

Accordingly, it is found that any upper communication layer is free from any change even though making any change in any lower layer. The present disclosure is provided to remove a barrier of coming technological revolution.

On the other hand, the present disclosure is related to the bottom two layers, which are the physical layer and datalink layer. For this reason, any data to be transmitted in the logical layers (upper than or equal to layer-3) is free from any change due to the present disclosure.

In order to configure the network to have a physical substance, information apparatuses being nominal points of network (nodes) and signal transmission pathways to link nodes may be necessary. The signal transmission pathway may be either wired or wireless. Furthermore, there may be a plurality of kinds of signals. The signal transmission pathways may be roughly classified, for example, into electrical signals and optical signals. In other words, nodes are physically linked with wired/wireless optical/electrical signal transmission pathways in the network. The layer regulating such physical link and transmission standard is the physical layer (layer-1).

The protocols to be used in a same layer must have a certain consistency with each other. However, the protocols to be used in different layers may not have any consistency with each other. In other words, to design the hierarchy is to design the relationship among the protocols. In the above, the physical layer and datalink layer are assumed to be different layers (layer-1 and layer-2). However, in a different concept of hierarchy, they are subject to a same Ethernet protocol and regarded as a same layer. In this case, the number of layers is decreased by one to be four. Moreover, the formats of transport layer (layer-4) and network layer (layer-3) are combined to be called TCP/IP standard. In addition, there may be a hierarchy concept of fractionalization. For example, in OSI (open systems interconnection) reference model, the upper layer is further divided into three layers. Thus, there are a session layer (layer-5), a presentation layer (layer-6), and an application layer (layer-7) from bottom to top.

The configuration of the network is generally complicated, but both ends of the signal transmission pathway must be terminated with nodes, respectively. FIG. 1 is the simplest example of such unit of network. Information to be input to the first node 2001 from a certain source may be converted (coded) to a protocol data unit according to a predetermined format and then transmitted to the second node 2002 via the signal transmission pathway 1000. The second node 2002 may inversely convert (decode) the received protocol data unit according to a predetermined format which has a certain consistency with the format that the first node 2001 subjected to, and then reproduce the original data before input to the first node 2001. Accordingly, a piece of data converted (coded) to the protocol data unit may be exchanged on the network. This is a basic configuration of data transfer.

As mentioned above in FIG. 1, two nodes terminating a signal transmission pathway 1000 (first node 2001 and second node 2002) must be subject to protocols having a certain consistency with each other. If the protocols are subject to an insufficient consistency, this signal transmission pathway may regard the first node 2001 and the second node 2002 as non-connected.

In the case that the communication corresponding to FIG. 1 is the communication in the transport layer (layer-4), the protocol data unit is segment and the conversion protocol is TCP. For example, if the first node 2001 receives a data, a TCP header is attached thereto according to the format of TCP standard so as to form a segment. The segment is sent to the second node 2002 via the signal transmission pathway 1000. The second node 2002 receives the segment and then inversely converts (decodes) it according to the format of TCP standard, so as to reproduce the original data. More specifically, the second node 2002 removes the TCP header from the received segment.

In the case that the communication corresponding to FIG. 1 is the communication in the network layer (layer-3), the protocol data unit is a packet and the conversion protocol is IPv4, IPv6 and so forth. For example, if the first node 2001 receives a data (a segment in this case), an IP header is attached to the segment according to the format of IPv4 or IPv6 standard to form a packet. This packet is transmitted to the second node 2002 via the signal transmission pathway 1000. The second node 2002 receives the packet and then inversely converts (decodes) it according to the format of IPv4 or IPv6 standard. Thus, the original segment is reproduced. More specifically, the IP header is removed from the packet. Alternatively, the TCP header is also removed to reproduce the data.

In the case that the communication corresponding to FIG. 1 is the communication in the datalink layer (layer-2), the protocol data unit is a frame. For example, the first node 2001 receives a data (a packet in this case), the packet is attached with an Ethernet header according to the format of the Ethernet standard to form a frame. In the Ethernet standard, a frame check sequence (FCS) is also attached to a frame for checking if the packet is appropriately received. Thus, the frame generated accordingly is transmitted to the second node 2002 via the signal transmission pathway 1000. The second node 2002 receives the frame and then inversely converts (decodes) it to recover the original packet according to the format of the Ethernet standard. More specifically, it is checked if the packet is appropriately received by checking the FCS, and then the repair or request of resending are performed as necessary. If it is confirmed that the packet is appropriately received, the Ethernet header and the FCS are removed.

In the above, the unidirectional transmission of data from the first node to the second node is illustrated. However, the utilization method of protocol is free from the change of the direction of the transmission. In this case, first, information input to the second node 2002 is converted (coded) to a protocol data unit according to a predetermined format. Then, it is transmitted to the first node 2001 via the signal transmission pathway 1000. The first node 2001 inversely converts (decodes) the received protocol data unit to reproduce the original data before input to the second node 2002.

Moreover, in the case that the first node 2001 is a relay from any third node to the second node 2002, the first node 2001 may transfer protocol data unit to be received from the third node to the second node 2002 via the signal transmission pathway 1000 without decoding. Alternatively, it may be possible to be transferred to the second node 2002 via the signal transmission pathway 1000 after editing a portion of received protocol data unit (header for example). As a result of this edit, the protocol data unit is appended with a certain kind of code which indicates that it goes through the first node 2001 with or without intention. The second node 2002 inversely converts (decodes) protocol data unit to be received according to a predetermined format to reproduce data before input to any third node.

More specifically, the header corresponding to the layer under consideration is edited and then transferred. For example, in the case that the first node 2001 serving as a relay is in the datalink layer (layer-2), it is possible to transfer a frame after editing the Ethernet header of the frame. More specifically, a predetermined authentication of the first node 2001 serving as a relay is appended to the Ethernet header. This transit point is recognized as an address having a physical substance (physical address).

In addition, in the case that the first node 2001 serving as a relay is in the network layer (layer-3), a TCP/IP header of packet is edited and then the packet is transferred. For example, at least a predetermined authentication for the first node 2001 serving as relay in the system is added to the TCP/IP header. Thus, when the second node 2002 receives a protocol data unit, it is possible to trace through which addresses the protocol data unit has gone. Those transit points are recognized as addresses having no physical substance (logical address). This logical address is called IP address in particular. The IP address, for example, is an intrinsic address allocated to an operating system. The addresses in the layers upper than or equal to the layer-3 (network layer) are all logical addresses and has no relation with physical substance.

In other words, in the network of TCP/IP standard, any nodes and any signal transmission pathways are virtual substances defined logically and have no relation with physical substance. In contrast, in the network of the Ethernet standard (datalink layer), any nodes and any signal transmission pathways have physical substances. For example, in the datalink layer, it may be always able to answer questions such as: To which terminal does this node correspond? To which LAN cable does this signal transmission pathway correspond?

For example, in the case that a packet is input to the first node 2001 serving as a relay from any third node in the network layer (layer-3), this packet is converted to a frame according to the Ethernet standard, and then transferred to the second node 2002 via the signal transmission pathway 1000. Thus, the first node 2001, the second node 2002 and the signal transmission pathway all have physical substances. Accordingly, the physical address indicating the physical existence of the first node serving as relay is attached to the frame.

Alternatively, in the case that a segment is input to the first node 2001 serving as a relay from any third node in the transport layer (layer-4), the segment is converted to a packet according to the IP standard and then transferred to the second node 2002 via the signal transmission pathway 1000 in the network layer. Thus, the first node 2001, the second node 2002, and the signal transmission pathway 1000 are all logical substances with no relation to any physical substances. Accordingly, the logical addresses indicating the logical existence of the first node serving as relay is attached to the packet.

It is self-evident that physical address and logical address are different as follows. For example, suppose that an electronic apparatus configuring the first node 2001 serving as a relay is replaced. In this case, the operating system of the electronic apparatus configuring the relay node before the replacement (old electronic apparatus) must be re-installed into the electronic apparatus configuring the relay node after the replacement (new electronic apparatus). Thus, the physical address which is the authentication being intrinsic of the electronic apparatus having physical substance must be replaced. On the other hand, the logical address being intrinsic to the operating system is taken over as the IP address of the third node even after the replacement. This is the reason that the logical network (TCP/IP network) has been extensively adopted.

FIG. 3 shows the relation between physical network and logical network in the communication hierarchy. There are physical nodes linked with each other under the physical layer at the bottom of the hierarchy, which includes LAN cable, optical or ADSL lines, or WiFi and so forth. The physical addresses are used to authenticate and link those physical nodes with each other in the physical layer. There is the datalink layer just above the physical layer. There is the logical layer-1 thereabove. The logical layer-1, for example, is subject to the TCP/IP protocol. There are logical nodes in the logical layer-1, above which the logical network is configured. The logical addresses (IP address and so forth) are used to authenticate and link those logical nodes with each other in the logical layer-1.

In this way, the datalink layer is between the logical network and the physical network and then the networks are associated by the datalink layer. However, this doesn't mean the linkage of logical nodes and physical nodes, because the physical addresses and the logical addresses are completely independent from each other.

The target to which malicious hackers attack is mainly the logical layer. Because the whole logical layer is administrated in the logical space, the attack is also completed only in the logical space. Accordingly, as long as the target is connected to the network, the hackers can always attack it even from the other side of the earth. As for the physical layer, it may be also possible to take over the physical addresses to hijack the apparatuses.

Once a vulnerability of the logical layer-1 is found and the security is broken, as shown in FIG. 4, the logical layer-2 is developed to fix the vulnerability and then used in the network. In this example, HTTP/SLL is adopted but the present disclosure is not limited to HTTP/SSL. It is important that the logical layer-2 is laminated on the logical layer-1 and the logical addresses are used in the logical layer-2. The logical nodes mutually recognize themselves in the logical layer-2 and then select and connect some of them to each other.

Once a vulnerability of the logical layer-2 is found and then the security is broken, as shown in FIG. 5, the logical layer-3 is developed to fix the vulnerability and then used in the network. In this example, OAuth and DKIM are adopted but the present disclosure is not limited to these. It is important that the logical layer-3 is laminated on the logical layer-2 and the logical addresses are used in the logical layer-3. The logical nodes mutually recognize themselves in the logical layer-3 and then select and connect some of them to each other.

By this way, it is found that the attack by hackers and the lamination of logical nodes are limitless. Furthermore, no matter how many logical layers are laminated, the logical addresses and the physical addresses are not related. It means that hackers can still attack the physical layer even though security technologies are configured above the logical layers. In particular, the attack to the physical layer is significant in the Internet-of-Things (IoT) where nodes having physical substances configure a broad network.

In the network before IoT is developed, the protection of the logical nodes has been sufficient. However, since the era of IoT begins, it may become a significant problem how to safely administrate connected apparatuses (such as industrial facilities, industrial robots, electric appliances, infrastructure facilities, auto-driving vehicles and so forth).

On the other hand, a significant revolution has come in the security technologies for logical layer recently. It is called blockchain. The blockchain is a public ledger which has been invented to disable the manipulation of transaction data of a crypto currency called bitcoin. Details will be described below, in short, it is a system in which unspecified large number of logical nodes connected in a certain logical layer mutually put themselves under surveillance, and then irregular manipulation and transaction are prohibited. As a result of blockchain, it may become able to make safe international or domestic remittance not via any bank. In other words, the remittance fee is limitlessly close to zero because no bank is involved. Furthermore, governments or tax authorities become able to monitor all transaction on the network. In addition, no one can manipulate the transaction record.

The blockchain enables substantial cost reduction and time saving of financial services which are completely executed in the logical layer. Thus, it can be regarded as a great reform since the birth of internet which has realized the substantial cost reduction and time saving of information communication. FIG. 6 is a conceptual illustration that the blockchain is implemented into the communication hierarchy. There is the logical layer-3 on the blockchain layer and all of the logical nodes are further distributed thereon. The communication among those logical nodes is unable to be manipulated in public with the public ledger system made by blockchain. The tax authorities and intelligence agencies of various countries may also join the blockchain to surveil.

(Blockchain)

The blockchain is illustrated briefly below.

The blockchain is a public ledger system on the peer-to-peer (P2P) type network. In the configuration of P2P network, no server is assumed to play the central role. All of the nodes (nominal points) connected to the network are non-central and equal to each other. It is necessary to ensure the security of the network by mutually putting all of the nodes under surveillance. Therefore, the blockchain is able to provide applications which having been unable in the client-server type network which assumes servers taking central roles (core) in the network.

The remittance system of crypto currency called bitcoin is the most important application. In the bitcoin system, first, a record of past transactions and a name of an account initiating new transaction are combined and encrypted to form an electronic signature. The new transaction is executed by transferring the electronic signature to the destination node. By doing so, there is no bank involved in any stage of the transaction process. The updated and transferred transaction record is put under surveillance by the large number of other non-central nodes and then authorized in a similar manner to the majority decision.

The transfer of the transaction record is identical to the transfer of the remittance. The authorized transaction record is treated similarly as the currency. Thus, the transaction is continued without any specialized central role existence like bank.

The encryption to be used for electronic signature flowing on the network is a general one called public key encryption, which is famous with a metaphor of Alice and Bob. As shown in FIG. 7, Alice sends her public key to Bob in advance. The public key is permitted to be stolen by someone on the network. Bob encrypts a letter with Alice's public key and then sends it to Alice. A private key forming a unique pair with Alice's public key is necessary to decrypt the encrypted letter. Accordingly, as long as the encryption is not broken, the content of the letter cannot be read even though the letter stolen by someone. It is because only Alice has the private key. Alice can decrypt the encryption of Bob's letter with her own private key and then read it.

By doing so, the public key may be exposed to the network. Accordingly, parties to which Alice sends her public key are not only Bob. However, only Alice having the private key can decrypt the letter encrypted by the public key and read it, as long as the encryption is not broken. The public key and the private key must be generated as a pair to make it impossible to reproduce the private key from public key. Moreover, the letter encrypted by the private key can be decoded by the public key. Basically, the difference of public key and private key is that one of the pair is public and the other one of the pair is secret.

Another important role of the public key is the address for sending a letter to Alice, that is, Alice's address on the network. Once Bob exposes the encrypted letter to the network, any receivers connected to the network can take it. However, they cannot read it as long as they cannot decrypt it. Having no way to read the letter is identical to not receiving the letter. Accordingly, only Alice can read the letter, which is identical to that the letter it is sent only to Alice. Thus, it is clarified that another role of the public key is the address on the network. Therefore, the public key used in bitcoin system is so-called bitcoin address.

FIG. 8 shows an example of basic concept of wallet to store crypto currency and so forth. This is a common composition for the crypto currencies like bitcoin and so forth. The address on the network is allocated to the wallet in advance. Something having monetary value (currencies or coins equivalent thereto) is stored in the content of the wallet. Furthermore, it may be able to attach an electronic signature having the address and the content to the wallet with certain encryption technology.

As shown in FIG. 9, for example, such a wallet may be used by installing a special application in hardware such as personal computers, tablets, smartphones, smart cards and so forth. In this case, the content of the wallet is saved as digital data in the storage of hardware in which the special application is installed. It is necessary for supervisors or owners of the hardware to manage such digital data in the electronic transaction such as the P2P, for example, with responsibility. In this regard, it is different from the client-server type network. In the client-server type network, for instance, financial organizations must have the obligation to deal with the digital data with responsibility. In the electronic transaction of the P2P network, the existence of such kind of financial organization having the function of the central role is unnecessary.

FIG. 10 shows a chain of transactions (N−2, N−1), (N−1, N), (N, N+1) . . . . The transaction (N−2, N−1) is the transaction from the wallet (N−2) to the wallet (N−1). The transaction (N−1, N) is the transaction from the wallet (N−1) to the wallet (N). The transaction (N, N+1) is the transaction from the wallet (N) to the wallet (N+1). However, N is an arbitrary natural number.

Assume that the content of the wallet, for example, is 1000 JPY remitted from somewhere. The sender of the 1000 JPY is assumed to be the wallet (N−2) and the electronic signature (N−2) is appended to the 1000 JPY. However, 1000 JPY is an example and not limiting. The content may be any digital information which is equivalent to or convertible to other monetary values. The wallet (N−1) has the contents of 1000 JPY, the private key (N−1) which is used for generating next electronic signature, and the public key (N−1) which forms a unique pair with the private key (N−1).

As mentioned above, the public key (N−1) is the address of the wallet (N−1) on the network. As an example, it may be the bitcoin address.

Next, a hash value (N−1) is generated from the public key (N−1), the content of the wallet (N−1), and the electronic signature (N−2) by using hash function (SHA-256 as an example). The hash value (N−1) is transferred to the wallet (N) and then stored by the wallet (N) as the content thereof. On the other hand, the public key (N), which is the address of the wallet (N), and the hash value (N−1), which is the content of the wallet (N), are encrypted with the private key (N−1) of the sender and then transferred to the wallet (N) along with the hash value (N−1).

Accordingly, the wallet (N) has the hash value (N−1), the electronic signature (N−1), and further a pair of intrinsic public key (N) and private key (N). Thus, the remittance of 1000 JPY from the wallet (N−1) to the wallet (N) is completed.

The hash value (N−1) includes information that the 1000 JPY comes from the wallet (N−1). However, since the hash is unable to be inversely transformed unlike encryption, it is impossible to read the information included into the hash value (N−1) by the inverse-transformation. Then, the electronic signature (N−1) is attached to the hash value (N−1). The electronic signature (N−1) is generated by collecting and encrypting the public key (N) and the hash value (N−1) with the private key (N−1). Accordingly, in order to confirm if the electronic signature really comes from the wallet (N−1), the electronic signature (N−1) may be decrypted with the public key (N−1) and then compared with the public key (N) and the hash value (N−1) which are stored in the wallet (N). As long as the encryption is not broken, it may be confirmed that the electronic signature (N−1) is certainly encrypted by the private key (N−1) if they are coincident. Otherwise, the electronic signature should be doubted. Otherwise, if they are coincident with the electronic signature (N−1) decrypted by another public key, public key (Q) for example, it may be found that a fraudulent transaction was made in the wallet (Q) whose address is the public key (Q).

However, another method is necessary to prove there is no fraudulent transaction in the transaction history. Because it is impossible to negate the possibility that a person regularly owning the private key (N−1) performs the fraudulent action only with the electronic signature. For example, it may be possible for the owner to abuse a private key. In the bitcoin system in the P2P type network, such a fraudulent action may be protected by "Proof-of-Work" (PoW). This is recognized to be generally progressing successfully. The Proof-of-Work" (PoW) is described below.

Generally in the client-server type network, an authentic third party is necessary to confirm the regularity of transactions. It may be, for example, a financial organization which is trustful and being a central node (server) in a reliable network. In other words, the owner of the wallet (N−1) is able to remit to the owner of the wallet (N) via a certain financial organization. However, there is no method to perfectly prove the reliability of those central nodes. Then, the confirmation requests are sent to the sender at every remittance. Some remittance may be executed across a plurality of financial organizations, which causes a large number of confirmation requests. In addition, each confirmation process has a certain cost. Thus, there is a certain minimum of the remittance fee. For example, suppose the minimum is 500 JPY. In this case, 500 JPY should be paid even for every remittance of less than 500 JPY. Thus, it is found that the client-server type network is not suitable for any business given that there are numerous small remittances.

Subsequently, in FIG. 10, the hash value (N) is generated from the public key (N), the content of the wallet (N) (such as the hash value (N−1)), and the electronic signature (N−1) by using hash function (SHA-256 as an example). The wallet (N) sends the hash value (N) to the wallet (N+1) and then the wallet (N+1) stores it as the content of the wallet (N+1). On the other hand, the public key (N+1), which is the address of the wallet (N+1), and the hash value (N) are encrypted to form the electronic signature (N) by using the private key (N) in the wallet (N). Subsequently, the electronic signature (N) is sent to the wallet (N+1) with the hash value (N).

From the above, it is found that the transaction (N−1, N) from the wallet (N−1) to the wallet (N) is recorded by the hash value (N−1) in the wallet (N). Similarly, it is found that the transaction from the wallet (N) to the wallet (N+1) is recorded by the hash value (N) in the wallet (N+1). Thus, it is found that the content of any wallets includes the histories of all past transactions in a manner of chain reactions. In other words, the latest hash value represents the history of all past transactions.

On the other hand, the number of wallets remitting to another wallet is not limited to one, unlike the example shown in FIG. 10. Actually, in many cases, a plurality of wallets may remit to a wallet. Alternatively, a wallet may remit to a plurality of wallets. Thus, the transaction histories may be more complicated. Accordingly, it may cause extraordinary costs if any of those confirmation processes is executed in the client-server type network.

Moreover, in order to record all past transactions in the P2P type network, any node may have to retroactively store all past transaction records all over the world. This may cause the storage of the hardware, in which the special application of wallet is installed, to be saturated. However, there is only one hash value including the latest transaction record. It is called root of Merkle. Accordingly, the history can be retroactively traced from the root of Merkle. It may configure a tree diagram where many branches come from the root of Merkle. This is called Merkle tree diagram. For example, the hash value (ABCD), which is the root of Merkle, is connected to the histories corresponding to the hash value (AB) and hash value (CD). The hash value (AB) is further connected to the hash value (A) and hash value (B) which respectively correspond to the past records, i.e., the transaction (A) and transaction (B). The hash value (CD) is further connected to the hash value (C) and hash value (D) which respectively correspond to the past records, i.e., the transaction (C) and transaction (D).

However, it is impossible to trace the history of transactions by decoding hash values since they are unable to be inversely-transformed. For example, one of the methods to actually trace the history of the past transactions of the content of the wallet (N) (the hash value (N−1)) is by firstly selecting any other wallet (M), decoding the electronic signature (N) with the public key (M), and then comparing the decoded results with the public key (N) and the hash value (N−1). If they are not coincident, another wallet (M+1) is selected and then the similar procedure is performed by using the public key (M+1). If they are coincident, the transaction is turned out to be the remittance from the wallet (M+1). In this case, M+1 is turned out to be identical to N−1. Subsequently, the public key (N−2) of the wallet (N−2) including the hash value (N−3) is traced to by repeating such procedure. Here, M and N are arbitrary natural numbers.

It is therefore logically possible to trace the history of past transactions, but it is generally unnecessary to do so one by one using the hash values. Instead, hundreds or thousands of transactions are collected together to form a block and then it may be preferred to approve that those transactions are real with a certain method. More specifically, the latest hash value (such as ABCD) may be adopted as a symbol while deleting the hash values other than the root of Merkle (such as ABCD). A group of transactions which are represented by a symbol is called a block. Thus, it may be possible to save the storages of hardware in which the special application of wallet is installed.

It is approved that a block of past transactions represented by a root of Merkle (the hash value (ABCD) in the above example) is real by sealing it with a timestamp. Thus, the authorized block is released on the network. Such release is an operation (work) similar to the date authentication that documents being carried to a notary public's office and sealed with date there. In bitcoin system, the release of a new block is called registering. A person registering a block is given a fixed reward for the compensation of authorization work. For the first 210,000 registrations, the reward is 50BTC per registration, where BTC is the unit of bitcoin. For the registrations from 210,001st to 420,000th, the reward is 25BTC. In other words, the reward is reduced by half for every 210,000 registrations and the reward becomes zero at the 6,929,999th registration. The reward is 25BTC per registration in June, 2016.

There is no notary public's office (an example of central node) in P2P type network. Then, unspecified large number of users of bitcoin who work in P2P type network may approve and seal a group of transactions for notarization. However, only a user may be able to release (register) a new block by sealing it with timestamp at each registration. Accordingly, a plurality of users contends for the authorization work for the registration reward.

Taking FIG. 11 as an example, the authorization work is briefly shown. Firstly, some kind of hash value related to an authorized past block may be obtained. Next, a group of unauthorized transactions existing on the network may be found and then the root of Merkle (hash value) of the group may be obtained. Those two hash values may be added with variable nonce values and then hashed to form a block hash. In this case, SHA-256 is used as the hash function in the bitcoin system. Of course, other hash function may be used to generate a block hash.

The nonce value is generally any value of 32 bits. The hash value generated with the nonce value (block hash here) added is a value of 256 bits. Two to the power of 256 is larger than 10 to the power of 77. Then, it turns out that block hash has huge freedom. First several bits are able to be made zero by adjusting the nonce value. For example, the probability that the first 16 bits are all zero in a newly generated block hash is one over two to the power of 16, i.e., 1/65,536. That is, it hardly occurs by chance. A suitable operation (work) is necessary to mine such nonce value.

However, the hash function is irreversible. Thus, it is impossible to find a nonce value to make the first several bits zero (16 bits in this example) by the inverse-transformation. That is, the hashing must be repeated while adjusting nonce value and continued until the first several bits of the hash value is made all zero. By doing so, it is turned out that a sufficient usage of computers is necessary to define a nonce value to generate a block. For the compensation, a reward (fixed bitcoin) is given. Since it is similar to mining gold, this operation is called mining. Users of bitcoin who mine for the reward are called miners.

In the P2P network, a node for mining differs from a node with special central function. Any node can perform the mining as long as it has a suitable resource of computers. Miners, more precisely, nodes that those miners used in the P2P network may perform a diallel search on the network while adjusting nonce value. Accordingly, they may find a group of unauthorized transactions, the hash value of the group is all zero in the first several bits. In other words, they may go around and mine throughout the network while adjusting nonce value. By doing so, it is generally unnecessary to adjust nonce value of a specialized group of unauthorized transactions.

Thus, if a block hash where the first several bits are all zero (16 bits in this example) is mined, the group of unauthorized transactions corresponding to this block hash is permitted to be linked as a newly approved block to the past block having been authorized. That is, it is the block linkage condition making the first several bits all zero in the hash value of the group. Thus, a miner who firstly mined the block hash to satisfy such condition is permitted to register. A plurality of blocks is linked by repeating this operation (mining) and then the block chain is formed.

As mentioned above, the reliability of a currency is identical to the reliability of transaction record in bitcoin. The blockchain ensures the reliability for the notary public. It becomes harder to manipulate the transaction record as the chain is lengthened. For example, once a part of block data is edited, the linkage condition of neighboring blocks (first several bits are all zero in block hash) cannot be satisfied. Thus, the nonce values of those neighboring blocks must be revised to satisfy such condition. As mentioned above, since the hash function is irreversible, a sufficient calculation is necessary. However, once the nonce values of the neighboring blocks are adjusted, the nonce values of further neighboring blocks must also be adjusted. Lastly, all the nonce values of all blocks linked in blockchain must be adjusted to revise a part of data. This certainly consumes further huge amount of computing ability. Thus, it becomes harder at exponential rate to manipulate the transaction record as the blockchain is lengthened.

Nevertheless, there may be a couple of weak points of blockchain. First, the encryption is broken and then private keys are stolen to be used. Public keys which are addresses of wallets are exposed to the network. If successfully breaking the encryption to reproduce a private key from a public key, it can be able to freely counterfeit electronic signatures by other person's account. This makes the electronic signature invalid. Then, the whole transaction may be made unreliable.

The biggest threat for encryption is quantum computer. If it is assumed that a block is generated every 10 minutes, it can be estimated that the last bitcoin may be mined in around 2140. It is not improbable to successfully develop quantum computer by then. Thus, since the electronic signature adopting today's encryption technology may become invalid, the blockchain may fall out of use before the final bitcoin is mined. However, it is still far from then. Without theoretical evidence, it may be expected that blockchain will be extensively used in the coming ten years or decades all over the world.

On the other hand, the counterfeit of currency is the manipulation and irregular copy of the history of past transactions. Since the electronic signature is attached to the transaction record as the evidence that the confirmation of the transaction is successful, the counterfeit of currency is the counterfeit of electronic signature. As long as the encryption is not broken, only the owner of the sending wallet with the private key necessary for an electronic signature can generate the electronic signature. On the contrary, even though encryption is not broken, a regular user of the private key may still want to manipulate the past transaction record. As mentioned above, however, once the blockchain is established, it is difficult even for the regular user of the private key to manipulate all nonce values configuring the blockchain. That is, as the blockchain is lengthened, it becomes hardly manipulated or edited by tracing the past transactions. This is the system of "Proof-of-Work" (PoW).

However, in the case that a new transaction is executed, there is a method that the regular user of the private key can perform an improper transaction. For example, while a regular transaction (N, N+1) is carried out from the wallet (N) to the wallet (N+1), the owner of the wallet (N) generates electronic signature (N') by maliciously using the private key (N) and then remits to the wallet (M) before such action is found. That is, it is identical to improperly issuing currency. This is the so-called double transaction problem.

As a result, the transaction (N, M) is improper. The owner of the wallet (M) may believe in the electronic signature (N') and then continue next transaction to remit to the wallet (M+1). The owner of the wallet (N+1) may also believe in the electronic signature (N) and then continue next transaction to remit to the wallet (N+2). The only improper transaction is the transaction (N, M), but after that, the transaction (M+1, M+2), the transaction (M+2, M+3) . . . may be continuously done. Thus, a new block collecting them may be formed.

However, the regular block not including the improper transaction (N, M) has been existing before the double transaction was made in the wallet (N). Accordingly, as long as the generation speed of blocks derived from the block including the improper transaction (N, M) does not surpass the generation speed of the regular block, the longer block should be regarded as the regular block. In the blockchain, the authentication is determined by the length of the chain.

However, when the computational ability of the malicious party dominates the computational ability distributed to the other miners all over the world, the chain including improper transaction may be longer than the regular chain. This is called "51% attack".

It is sometimes discussed that the 51% attack is unrealistic due to poor performance-cost. However, it may be an exceptional that the 51% attack is performed as a cyber-attack to weaken the financial base of a certain group. For example, suppose that the Fintech 2.0 on the base of blockchain has been extensively spread in a certain big country. A certain small country may invest the national defense expenditure into the mining in order to paralyze the financial system of the big country. This may cost less than the development of nuclear weapon. Moreover, some players may temporarily acquire the ability of 51% attack with the advanced in cloud mining.

This may force the big country to be attacked to join the blockchain. Then, there may be no problem when a plurality of countries joins the blockchain because no country can carry out the 51% attack. As a result, the blockchain may be able to take such an additional advantage of international infrastructure of information communication, although it is P2P.

Such an idea of public ledger that the reliability is ensured by sharing the transaction histories on the network and leaving the authorization works to miners is expected to be extensively used as the infrastructure of information communication other than bitcoin, because it may actually disable the manipulation of past transactions with least cost.

The database actually impossible to be manipulated may be, for example, demanded by healthcare to use the daily-increasing accumulative medical data, the stock exchange to use daily-increasing accumulative transaction data, and every possible information service to use daily-increasing accumulative big data. Thus, it gives rise to the world-wide trend of technological innovation called Fintech 2.0.

Another point to suppress the 51% attack is, first, to limit the number of attacking nodes. If addresses allocated to nodes are logical addresses like IP addresses, it is possible for attackers to acquire limitless number of attacking nodes. Accordingly, all nodes to be linked to P2P should be allocated with physical addresses to be linked to CPUs or other physical existences. This is called One-CPU-One-Vote (OCOV). For example, one-ballot-one-voter is an indispensable condition for a system like majority decision.

It is thus turned out to be necessary to associate the private key and the individual authentication having physical substance. However, private key is a product of software technology and then has no relation with physical substance. From the intention, the software is developed to work equally in any information appliances designed and manufactured with a same specification. Therefore, the software has no relationship with physical substances. However, the network is configured by an aggregate of numerous information apparatuses and wired or wireless signal transmission pathways to link those information apparatuses. It is self-evident that the signal transmission pathways are physical substances, so as the information apparatuses. There may be a hint to associate the private key and the physical substance.

More specifically, it is to link the public keys and the physical addresses with a certain method to preclude the manipulation.

Referring back to FIG. 6, the physical and logical addresses are still disconnected. This certainly tells that the merit of blockchain is powerless against the network of nodes having physical substances, that is, IoT, as well as the 51% attack. However, to solve this problem, the public ledger system is to be bringing into IoT while defending the 51% attack.

(Physical Address)

FIG. 12 briefly illustrates an example of the usages of media-access controller (MAC) address which has been most extensively used as a physical address.

The MAC addresses are allocated as intrinsic control numbers to Ethernet cards installed in information apparatuses. A typical Ethernet card 3000, for example, includes an arithmetic processor chip 3020 for MAC and a non-volatile memory chip 3010 to record the MAC address.

The MAC address is standardized by the Institute of Electrical and Electronic Engineers (IEEE) to be an assembly of numeral sequence with the length being 48 bits (6 bytes), and the information quantity is about 280 trillion. The upper 24 bits (the left half in the example of FIG. 13) is called vendor code 3071 and allocated to every vendor. The lower 24 bits (the right half in the example of FIG. 13) is called serial number 3072 and allocated without duplication by every vendor. The last 2 bits in the vendor code 3071 are UL bit and IG bit. Thus, the MAC address is represented by dividing a numeral sequence of 48 bits including UL bit and IG bit by every 8 bits to be written in hexadecimal notation.

If the MAC address is a global address, the UL bit is 1. Otherwise, the UL bit is 0. That is, in the case of global address (UL bit=1), the MAC addresses must be allocated without duplication all over the world. Another 1 bit among 24 bits of vendor code is allocated to what is called IG bit. In the case of IG bit=0, the communication is unicast communication. Otherwise, the communication is multicast communication. The unicast communication is to send data (frame) to a uniquely selected destination on the network of information apparatuses. In contrast, the multicast communication is to send data (frame) to multiple-selected destinations on the network of information apparatuses. Thus, 46 bits left by excluding 2 bits of UL bit and IG bit from 48 bits is the actual freedom of MAC address, which is estimated to be about 70 trillion.

It should be noted here that the MAC addresses should be allocated across information apparatuses not only ones that are currently being used but also discarded ones and lost ones all over the world without duplication. At present, the MAC address has not dried up yet. However, in the coming era of IoT, the number of physical nodes to be actively connected to the network is expected to be more than 10 trillion. However, since MAC address is editable, it is able to re-use MAC addresses not being used due to certain reason. It thus appears to be able to avoid the dry-up. However, it is a fact that the edit of MAC address enables the falsification and the capture of MAC address.

Accordingly, MAC address is a code written in a non-volatile memory chip 3010 and then allocated to an Ethernet card 3000 including the non-volatile memory chip 3010. Thus, the MAC address is editable and cannot ensure One-CPU-One-Vote.

(Uneditable Physical Address)

Thus, it is obvious that "uneditable physical address" is necessary to replace the MAC address. Hereinafter, suppose that a certain identification device is equipped into the chip.

FIG. 14 shows that the first node 2001 and the second node 2002 are connected via the signal transmission pathway 1000, where the first node mounts a first chip 110 and is equipped with an identification device 60. The identification device 60 is a device to realize "uneditable physical address" with a certain method and to be integrated into a semiconductor chip. Thus, the first chip 110 becomes the identification core of the first node or of the information apparatus. Furthermore, the first chip 110 is linked to the signal transmission pathway 1000 via an external input-output 50.

The chip identification device 60 outputs an output code in reply to a call (input code) coming from the external input-output 50. The output code generated here has been generated by using physical randomness which is intrinsic of every chip. It is therefore characteristic that a different input code causes a different output code even with a same identification device 60. In this regard, the chip identification device is totally different from the MAC address stored in the non-volatile memory of Ethernet cards. In other words, the MAC address is unable to change output according to input code.

(Common Passcode)

As shown in FIG. 15, at least one of common passcodes is stored in the second node 2002 and may be sent to every other node when identifying that node. For example, the second node 2002 sends the first common passcode 1410 to the first, third and fourth nodes (2001, 430 and 440, respectively). Those nodes regard the second node 2002 as "the one sending the first common passcode 1410 to them".

As shown in FIG. 16, the first node 2001, the third node 430, and the fourth node 440 return the first identification 4101, the second identification 4201, and the third identification 4301, respectively, to the second node 2002 in response to the input of the first common passcode 1410.

The second node 2002 regards the first node 2001, the third node 430, and the fourth node 440 as "the ones respectively returning the first identification 4101, the second identification 4201, and the third identification 4301 in response to the first common passcode 1410". Here, any two of the first, second and third identifications (4101, 4201 and 4301, respectively) are different from each other. Furthermore, the second node 2002 is capable of using another common passcode. This may be helpful for more advanced security administration. Accordingly, it may be preferred that each sending node uses a plurality of common passcodes.

Thus, (the property of output independence) that different identification devices return different outputs even to a same input code is presumed. (The property of output independence) is described below in detail.

Which is considered next is the condition to be satisfied by a node (the second node 2002 in the example of FIGS. 14 and 15) communicating with the nodes respectively including the above-mentioned identification devices (such as the first node 2001, the third node 430, and the fourth node 440 in FIGS. 14 and 15).

The communicating node (such as the second node 2002 in FIGS. 14 and 15) needs to be equipped with at least a signal transmitter to transmit common passcodes or an inner memory to store the passcodes. Furthermore, an operational system to process the received identification codes (such as the first, second, and third identifications 4101, 4201, and 4301, respectively, in FIG. 16) is necessary.

The operational system, as an example, includes the inner memory 401 to store the input code 402 and the registration code 402, as shown in FIG. 17. In the case that a plurality of passcodes is used as mentioned above, a plurality of input codes is stored therein and a plurality of registration codes is respectively registered therein.

The identification devices equipped into the above-mentioned nodes (such as the first node 2001, the third node 430, and the fourth node 440 in FIGS. 14 and 15) should be all different. The communicating node 2002 may include at least the common passcode 1410, as shown in FIGS. 15 and 16. As shown in FIG. 17, the common passcode that the second node 2002 outputs is stored as the input code 402 in the inner memory 401 of the second node 2002.

As shown in FIG. 15, the nodes (2001, 430 and 440) to which the common passcode 1410 is input, outputs to the second node 2002 the specific identification codes (4101, 4201, and 4301), respectively. Any two of those identification codes to be returned here are necessary to be all different. Accordingly, the identification device is required to satisfy (the property of output independence). As shown in FIG. 18, the second node 2002 may compare the identification codes respectively returned in response to the input codes with the registration codes 403 strictly stored in the inner memory 401 as necessary.

It is preferred that a trained expert strictly protects devices such as the second node 2002 where the inner memory stores input codes and registration codes. Like this, the second node 2002 is assumed to be centered, play a central role, and be under the central control by security supervisors. This is called a stem node. In contrast, nodes connecting to the stem nodes and out of the central control by security supervisors are called peripheral nodes. That is, FIG. 17 shows an example in which three peripheral nodes (the first node 2001, the third node 430, and the fourth node 440) are connected to the second node 2002 serving as the stem node.

A stem node stores a list of input codes and registration codes in the inner memory. On the other hand, peripheral nodes store neither registration codes nor input codes and are equipped with chips respectively having different identification devices. Moreover, sets of an input code and a registration code in a list stored in the inner memory of the stem node respectively correspond to the communications with peripheral nodes. The stem node stores those sets in the inner memory in the form of the list shown in FIG. 18.

Even though it is assumed to block the remote attack by putting stem nodes under a strict central control, in the case that the number of peripheral nodes connecting to the network is more than several trillions, it may be practically impossible to strictly protect and manage all peripheral nodes. This shows the limitation of the central control. Thus, a remote-attacker may try to hijack a peripheral node out of the central control, such as one of the first node 2001, the third node 430, the fourth node 440 . . . shown in the example of FIG. 17.

For example, the remote-attacker may naively select and send a signal (X, Y, Z) to the first node 2001 and then receive the response (X1, Y1, Z1). On the other hand, the first node 2001 carries an identification device and the second node 2002 (stem node) sends the input code 402 (P, S, T . . . ) to the first node 2001 and then receives the identification code (P1, S1, T1 . . . ). Furthermore, the second node 2002 stores the same code (P1, S1, T1 . . . ) as a registration code in the inner memory 401.

In the case that the signal (X, Y, Z) differs from the input code 402 (P, S, T), the response (X1, Y1, Z1) that the remote-attacker receives also differs from the registration coded 402 (P1, S1, T1). It is assumed here that the chip identification device equipped in the peripheral nodes may have (the property of output independence) in which a chip identification device outputs different respectively outputs in response to different inputs. Thus, as long as the chip identification device has (the property of output independence), the remote attack fails. Here, what may happen if the peripheral nodes and a stem node adopt the mutual communication in the Ethernet format? The remote-attacker is able to easily acquire the MAC address from the inner memory of the Ethernet card (e.g., the non-volatile memory chip 3010 in the example of FIG. 13) which is equipped into the peripheral node. This is identical to taking over the control of the apparatuses connected to the network. For example, a hacker on the other side of the earth is able to hijack a car under driving.

The residual problem here is that the set of signals (X, Y, Z) naively selected by the remote-attacker accidentally coincides with the input code 402 (P, S, T) stored in the inner memory 401 of the stem node. To avoid such an accident, the number of elements of input codes should be as large as possible and further should be confidential to any other than the administrators of the stem server. Then, this information has to be strictly protected by the administrators of the stem node. Moreover, it is preferred to be occasionally changed. When the change is made, the stem node needs to re-register the peripheral nodes connecting to the stem node. To reduce the frequency of re-registration like this, the number of elements of input codes should be administrated to be as large as possible. The input code plays a role of the passcode while satisfying those requirements.

In other words, the format of mutual communication using chip identification device governs the mutual communication among nodes having physical substances similarly to the Ethernet standard. On the other hand, the nodes composing the network are divided into nodes storing information related to mutual communication under the central control (stem node) and the other nodes (peripheral nodes). The peripheral nodes are equipped with identification devices instead of storing information related to mutual communication and return outputs in response to a given input. Like this, (the property of output independence) is satisfied, wherein different outputs are respectively returned in response to different inputs. (The property of output independence) may be described in detail below.

Here, it is preferred that input codes are input to a plurality of peripheral nodes and then used for inspecting the identification codes to be obtained as output. Considering such a situation, the input codes may be regarded as "common passcodes". Thus, it is preferred that a stem node owns at least a common passcode.

In the case that the above-mentioned stem node is a computer (personal computer and so on), the peripheral nodes connecting thereto may be, for example, mouse, keyboard, microphone, and so forth. As mentioned above, it is assumed that administrators responsibly administrate the main body of computer, which is the stem node, with advanced anti-virus software. The role of the identification device is to protect peripheral nodes out of the control by anti-virus software aiming to protect the main body of computer from the remote attack.

In the case that the above-mentioned stem node is a server playing a central role of the network service, the peripheral nodes connecting thereto may be terminals of end users to use this service. For example, they may be smart phones, tablets, computing terminals, remote controllers of smart electrical apparatuses, controlling panels of auto-driving cars, or other wearable terminals. As mentioned above, it is assumed that the stem node is responsibly administrated by trained experts with advanced security software. The role of identification devices is to protect the terminals of end users (smart phones, tablets, computing terminals, other wearable terminals and so on), which even trained experts are not able to protect with the advance security software, from the remote attack.

In the case that the above-mentioned stem node is a data center playing a central role of cloud-sensing service, peripheral nodes connecting thereto, for example, may be sensors to collect data that the data center requires. The number of sensors is innumerable and widespread all over the world. Accordingly, it is actually impossible to protect all sensors from the remote attack by the central control. The examples of those sensors may be innumerable, i.e., GPSs, virus monitors, thermometers, earthquake recorders, socket-type visible light communication devices, biosensors, various smart meters and so forth. As mentioned above, it is presumed that the stem nodes are responsibly administrated by trained experts with advanced security software. On the contrary, the role of identification devices is to protect the innumerable sensors on the network for the cloud-sensing from a remote attack, which even trained experts cannot protect with advance security software.

In the above-mentioned examples, the nodes connecting to the network are classified into the stem nodes storing input codes (common passcodes) and registration codes, and the peripheral nodes not storing them. The stem nodes should be under central control and the peripheral nodes should be equipped with identification devices. This is similar to the client-server type network configuration seen in typical financial service.

It can be regarded that FIG. 17 is identical to FIG. 19, for example, if it is assumed that the first node 2001, the third node 430, the fourth node 440 and the second node 2002 in FIG. 17 correspond to the first client 5510, the second client 5520, the third client 5530 and the server 5000, respectively. Furthermore, it is assumed that the inner memory 401, the input code 402 and the registration code 403 correspond to the storage 5010, the passcode 5020, and the status after the last transaction 5030, respectively.

FIG. 19 shows that account holders (clients) access the server 5000 of a financial organization. Then, the first, second and third clients (5510, 5520 and 5530, respectively, for example) connect to the server 5000. The first client 5510 sends the passcode (P, S, T . . . ) to the server 5000. The second client 5520 sends the passcode (R, O, A . . . ) to the server 5000. The third client 5530 sends the passcode (X, A, U . . . ) to the server 5000. The server 5000 compares those passcodes 5020 with the saved code information and confirms whether or not the received passcodes come from the regular clients. After confirming that those clients are regular clients, the server 5000 provides predetermined services to the first client 5510, the second client 5520, the third client 5530, and so forth. Lastly, the server 5000 saves the records of transactions occurring due to those services as statuses after transaction with regard to accounts, respectively. In the example of FIG. 19, the status after transaction for the first client 5510 is (P1, S1, T1 . . . ). The status after transaction for the second client 5520 is (R2, O2, A2 . . . ). The status after transaction for the third client 5530 is (X3, A3, U3 . . . ), and so forth.

Thus, the server 5000 may notify all or a part of the status after the last transaction to each client with a predetermined method. Here, the account information comprises the passcode 5020 with respect to each client and the status after the last transaction 5030. For example, in the case of the first client 5510, the account information may be (P, S, T . . . ; P1, 51, T1 . . . ). In the case of the second client 5520, the account information may be (R, O, A . . . ; R1, O1, A1 . . . ). In the case of the third client 5530, the account information may be (X, A, U . . . ; X1, A1, U1 . . . ). Thus, the list of account information may be saved in the storage 5010 of the server that the banking institution manages and administrates.

In the actual banking service, the number of end-users owning accounts in a banking institution (account holders) is not limited and the quantity of account information to be managed by a banking institution is also not limited. That is, the number of peripheral nodes is limitless in theory. On the contrary, the number of banking institutions providing financial service is also limitless. Therefore, the number of servers (stem nodes) connecting to the network is also limitless.

As shown in FIG. 20, for example, a peripheral node (the first node 2001 for example) connects to a plurality of stem nodes (the first stem node 1400, the second stem node 2400, and the third stem node 3400, for example). The first stem node 1400, the second stem node 2400, and the third stem node 3400 store the first passcode 1410, the second passcode 2410, and the third passcode 3410, respectively. In other words, this peripheral node may regard the first stem node 1400 as "inputting the first passcode 1410", the second stem node 2400 as "inputting the second passcode 2410", and the third stem node 3400 as "inputting the third passcode 3410". In response to those inputs, the first stem node 1400 may regard the peripheral node as "returning the first identification 11", the second stem node 2400 may regard the peripheral node as "returning the second identification 12", and the third stem node 3400 may regard the peripheral node as "returning the third identification 13".

The first stem node 1400 stores at least the input code 402 and the registration code 403 as a set of the common passcode 1410 and the first identification 11, respectively, in the inner memory, as shown in FIG. 17. The second stem node 2400 stores at least the input code 402 and the registration code 403 as a set of the common passcode 2410 and the second identification 12, respectively, in the inner memory, as shown in FIG. 17. The third stem node 3400 stores at least the input code 402 and the registration code 403 as a set of the common passcode 3410 and the third identification 13, respectively, in the inner memory, as shown in FIG. 17. On the other hand, the first node 2001 which is the peripheral node is equipped with the identification device 60, as shown in FIG. 14.

In such a structure of network (client-server type), at least a server is necessary for a certain client to remit money to another client. In order to remit money to a client owning an account in another banking institution, the transaction between banks, that is, between servers should be carried out safe. For example, online partnership or multi-payment network (MPN) may be used for the domestic transaction between banks. On the other hand, the service provided by Society for Worldwide Interbank Financial Telecommunication (SWIFT) is necessary to remit money to an account in foreign banking institution. At present, all international transactions are executed with the operational system provided by SWIFT. (This service may be also called SWIFT hereinafter.)

If the identification device to realize (uneditable physical address) is adopted, it may be possible to avoid the attack to physical layer, which is to falsify physical address, and then various business applications may be possible. However, it differs from avoiding the attack to logical layers. (See FIGS. 3-5.) The blockchain avoids the attack to logical layers, that is, the manipulation of records stored in logical layers. (See FIG. 6.)

Next, the conditions to be satisfied by identification devices may be described.

(Independent Property of Input)

If different input codes are input to a same identification device, different output codes may be output, respectively. For example, as shown in FIG. 21, if the input code C is input to an identification device 600, the output A is output. If the input code D is input to the same identification device 600, the output code B is output. However, the output code A and the output code B are different from each other, as long as the input code C and the input code D are different from each other. This is a necessary condition to be satisfied to realize the utilization of FIG. 20. Moreover, it shows that a terminal having an identical identification device can be shared by a plurality of users as long as those users use passcodes different from each other.

(Independent Property of Output)

The response to a same input to two different identification devices is specified here. As shown in FIG. 22, a same input code Q is input to two different identification devices, i.e., the first identification device 21 and the second identification device 22. In this case, the first identification device 21 outputs the output code A, while the second identification device 22 outputs the output code B. However, the output codes A and B are different from each other. Accordingly, even while the input codes are identical, different identification devices output different output codes, respectively. This is a necessary condition to be satisfied to realize the utilization of FIGS. 15 and 16.

(Unpredictability of Output)

As shown in FIG. 23, when n input codes (Q1, Q2 . . . Qn) are input to a same identification device 600, the output codes (R1, R2 . . . Rn) to be respectively output in response to those input codes are all known. In this case, it must be impossible to predict the output code Rn+1 to be output in response to the input code Qn+1 that is different from any of n input codes (Q1, Q2 ... Qn) without inputting the input code Qn+1. However, n is an integer more than or equal to 2. This is equivalent to that output to unknown input is unpredictable even though a set of input and output is stolen somewhere on the network.

In the case that the identification device 600 generates output according to a certain algorithm, that is, software returns authentication, the output code must be generated in response to the input code according to the certain algorithm. However, as long as the program is designed by algorithm, any program cannot satisfy (Unpredictability of output). This is identical to that it is impossible to generate perfect random number with any program. Accordingly, it is found that the identification device 600 must adopt physical randomness. In other words, (Unpredictability of output) is the "requirement for physical randomness".

(Reliability of Input-Output)

As shown in FIG. 24, the input code error 31 ($\Delta Q$) is involved into the input code Q due to uncontrollable noise related to circuit to control the input code Q. On the contrary, the output code error 32 ($\Delta R$) is involved into the output code R due to not only the input code error 31 ($\Delta Q$) but also uncontrollable noise related to the circuit to control the output code. In this case, the absolute value of the difference of two different input codes (e.g. Q1 and Q2) is assumed to be larger than the maximum of the absolute value of the input code error 31 ($\Delta Q$). Thus, the absolute value of difference of the output code R1 to the input code Q1 and the output code R2 to the input code Q2 must be larger than the absolute value of the output code error 32 ($\Delta R$). This is equivalent to that the relation of input and output is stable and reliable.

(Actual Limitlessness of Output)

In the coming IoT era, the number of nodes to be actively connect to the network is expected to be more than ten trillions. On the other hand, the physical addresses are also allocated to physical nodes not to be connected to the network due to loss, breakdown or another kind of reason. Accordingly, the number of independent authentications (nodes having physical substances) should be extremely large. Accordingly, the fifth condition that the identification devices have to satisfy is that the number of patterns of outputs to an input is regarded as large as actual infinity, in order to allocate physical addresses to huge number of physical nodes more than several ten trillions on the network. It must be at least a hundred trillions.

(Physical Uneditability)

It is physically impossible to manipulate the relation between input and output codes.

The identification devices must simultaneously satisfy at least one or more of the six conditions of (Independent property of input), (Independent property of output), (Unpredictability of output), (Reliability of input-output), (Actual limitlessness of output) and (Physical uneditability) according to objectives.

(Physically Unclonable Function)

A technology having a similar function has drawn considerable attention in recent years. It is so-called Physically Unclonable Function (PUF). (See Patent Literatures 1-4.) This serves as individual authentication of semiconductor chips by using physical properties which are specific to every semiconductor chip in a similar way to individual authentication of persons by using bio-information such as finger prints, retina and so forth. In addition, the property is physically unclonable. The other requirements for PUF are: (1) different inputs to a same PUF must cause outputs different from each other. (2) Different PUFs to be input with a same input must cause outputs different from each other. (3) It must be impossible to predict output in response to unknown input, even while a set of inputs and outputs is stolen. (4) The relation between input and output must be stable and reliable.

[Patent Literature 1] Japan Patent Publication Number (Kokai) 2009-519473

[Patent Literature 2] Japan Patent Publication Number (Kokai) 2015-201884

[Patent Literature 3] World Intellectual Property Organization Patent Publication Number WO 2011118548A1

[Patent Literature 4] Japan Patent Publication Number (Kokai) 2013-131868

Accordingly, (1)-(4) are identical to (Independent property of input), (Independent property of output), (Unpredictability of output), (Reliability of input-output), respectively. In addition, (Actual limitlessness of output) should be also satisfied if it is used for IoT.

However, "Physically unclonable" and "physically unable to re-write" are subtly different concepts each other. For example, the former means that it is impossible to clone chips having a physically identical randomness. On the contrary, the latter means that it is impossible to manipulate physical randomness of an identical chip. While both are necessary for physical chip authentication, the identification device related to the present disclosure realizes (Physical uneditability). As described later, a system may disable for cloning physically identical randomness in the present disclosure.

In the case of IC chip products (semiconductor chip products), there are two types of PUFs as follows: One is to use optical characteristics of forming agent sealing chip (coating PUF). The other is to use characteristics related to chip itself (chip PUF). In recent years, the technologies equipping with the latter chip PUF into chip has drawn more attention. It is because the thefts of encryption keys and chip counterfeits have been more concerned.

The chip PUF is mainly divided into two types: to use the dispersion of circuits and to use the dispersion of miniaturized structures other than circuits (fabrication PUF) (See the Patent literature 2). The circuit PUF is further divided into delay PUF to use the wiring delay of circuits (See the Patent literature 3) and metastability PUF to use the metastability of circuits (See the Patent literature 4). The delay PUF is to use the uncontrollable dispersion of the operation time of a plurality of circuits integrated with the same design specification in IC. The typical examples of used circuits are arbiter circuit, glitch circuit, ring oscillation circuit and so forth. The circuit used in the metastability PUF is mainly Static Random Access Memory (SRAM hereinafter) and latch circuit (butterfly circuit).

The weak point of the circuit PUF is, firstly, that individual difference is too small. Next, the output is unstable and unfavorable to satisfy the condition (Reliability of input-output). Furthermore, it is too sensitive to the external environment such as temperature change and then weak to the fault attack. Then, it is necessary to append additional amplifier and temperature sensor circuits. By doing so, the load on design is increased and then the length of PUF data is limited. It may therefore be difficult to satisfy the above condition (Actual limitlessness of output). If the length of output data itself is short, the number of chips to be authenticated may be practically limited even though the output is random.

The fabrication PUF is to use random short due to the fabrication dispersion of inter-layer via to be purposely integrated. It is possible to solve most of weak points of the circuit PUF. However, special structures having never been used in the conventional semiconductor products are necessary to be integrated and then may generally increase load on fabrication process. Therefore, it may be hard to be widespread.

Apart from the above, the reliability of electron devices is used to form PUF (See Patent literature 5), but the reliability itself is lower and then not satisfy (Reliability of input-output). Furthermore, another PUF is reported, which uses the dispersion of capacitors of dynamic random access memory (DRAM hereinafter) on turning switch on. (See non-patent literature 1.) This theoretically has a common problem with the latch circuit PUF. That is, individual difference is too small to be weak to fault attack which uses the change of environment factors.

[Patent Literature 5] Japan Patent Publication Number (Kokai) 2015-139010

[Non-Patent Literature 1] Fatemeh Tehranipoor, Nima Karimian, Kan Xiao, John Chandy, "DRAM based Intrinsic Physical Unclonable Functions for System Level Security", in GLSVLSI '15 Proceedings of the 25th edition on Great Lakes Symposium on VLSI, pp. 15-20, 2015.

As mentioned above, there are problems that should be solved in various types of invented PUF, respectively. On the other hand, it is unnecessary to limit the possibility of the replacement of physical address to PUF. In the present disclosure, the identification device having (Physical uneditability) and not (Physically Unclonable Function) is disclosed to serve as physical address for PUF.

SUMMARY OF THE INVENTION

The present disclosure is provided in view of the circumstances mentioned above and then aims to provide "physical address generated physically random, specific to every chip and unable to be re-written and copied" as private key. Accordingly, also provided is a method of utilizing electronic signature technology for public ledger system for administrating the network of hardware.

The present disclosure adopts the following solutions for above-mentioned problems.

An authenticated network is provided in the present disclosure. The authenticated network may include a logical network having a plurality of logical nodes, a physical network having a plurality of physical nodes, and a physical random number code. Each of the plurality of physical nodes may include an identification core, and each of the plurality of logical nodes may be respectively linked to the identification core. The identification core may include a semiconductor chip intrinsically having a physical randomness, and the semiconductor chip may include a memory cell array and a peripheral region. The memory cell array may include a plurality of memory cells distributed according to a predetermined address format. The physical randomness may be generated as a combination of addresses of fail bits occurred due to a certain physical process in the memory cell array, may be read with a predetermined method, and may be recorded as an electronic information in a special inner memory included in the peripheral region of the semiconductor chip. The physical random number code may reflect the physical randomness generated in response to the electronic information recorded in the special inner memory. The identification core may generate a private key based on the physical random number code and may output a public key generated based on the private key with a key generator. The public key may serve as a logical address of the logical node linked to the identification core, and the private key may serve as a physical address of the physical node. The logical node and the physical node may be uniquely linked by the private key and the public key, and the private key may be confined in the identification core.

Furthermore, in the authenticated network of the present disclosure, the combination of the addresses of the fail bits may be acquired by utilizing an acquiring code of a special mode. The acquiring code of the special mode may include the addresses of the fail bits, access modes to select methods to access each of the plurality of memory cells in the memory cell array, and an operation mode to write, erase, and read. The plurality of memory cells may be distributed at addresses according to the predetermined address format. The addresses may be distributed according to cross-points of rows and columns, which are respectively parallel to a X-axis direction and a Y-axis direction in the memory cell array on a semiconductor surface. An aggregation of the addresses may be divided into a first row batch and a second row batch along the Y-axis direction. The access modes may include a first access mode, a second access mode, and a third access mode. The first access mode may be to access all of the memory cells along the Y-axis direction throughout the first and the second row batches at an arbitrary selected address on the X-axis direction. The second access mode may be to access all of the memory cells along the Y-axis direction throughout the first row batch at the arbitrary selected address on the X-axis direction. The third access mode may be to access rows that do not include the fail bits in the second row batch and to access rows in the first row batch after re-allocating rows including the fail bits in the second row batch. Firstly, all of the memory cells to be accessed in the first access mode may be written with a first value. Next, all of the memory cells to be accessed in the second access mode may be written with a second value. Lastly, all of the memory cells to be accessed in the third access mode may be read, and row numbers of the memory cells may be lined up in an order of finding the second values and then recorded in the special inner memory. The physical randomness may be formed of a distribution of the fail bits among the plurality of memory cells.

Alternatively, in the authenticated network of the present disclosure, the access modes may include a second access mode and a third access mode. The second access mode may be to access all of the memory cells along the Y-axis direction throughout the first row batch at an arbitrary selected address on the X-axis direction. The third access mode may be to access rows that do not include the fail bits in the second row batch and to access rows in the first row batch after re-allocating rows including the fail bits in the second row batch. Firstly, all of the memory cells to be accessed in the third access mode may be written with a first value. Next, all of the memory cells to be accessed in the second access mode may be written with a second value. Lastly, all of the memory cells to be accessed in the third access mode may be read, and row numbers of the memory cells are lined up in an order of finding the second values and then recorded in the special inner memory. The physical randomness may be formed of a distribution of the fail bits among the plurality of memory cells.

Moreover, in the authenticated network of the present disclosure, the identification core may generate a private key based on the physical random number code and further based on an input code from an external of the identification core. The identification core may output a public key generated based on the private key and further based on the input code with a key generator. The input code may be an independent input that a regular user of electronic apparatus including the identification core sets up arbitrarily. The independent input may include at least one of a digital code information, a biological information, and a personal information. The digital code information may include at least one selected from passcode, pin code, barcode and QR code. The biological information may include at least one selected from finger print information, vein information, retina information and DNA information of the regular user. The personal information may include at least one selected from voice, picture and physical information extracted from and able to identify the regular user. Such kinds of information may be necessary to boot an application software operating on the authenticated network, may be that the regular user is required by an application software operating on the authenticated network as necessary, or may be necessary to boot an information terminal installed with an application software operating on the authenticated network.

According to the present disclosure, a physical address which is uniquely allocated to a network node really having physical substance, and unable to be re-written, is provided as a private key. Furthermore, it is able to expand the utilization of blockchain technology to IoT.

The preferred embodiments for carrying out the present disclosure is specifically illustrated as follows.

BRIEF DESCRIPTION OF THE DRAWINGS

The present disclosure will become more fully understood from the detailed description given hereinafter and the accompanying drawings which are given by way of illustration only, and thus are not limitative of the present disclosure. In the various drawings, same numerals designate same or similar parts. Furthermore, when the terms "inner", "outer", "side", "top", "bottom", "front", "rear", "left", "right" and similar terms are used hereinafter, it should be understood that these terms have reference only to the structure shown in the drawings as it would appear to a person viewing the drawings, and are utilized only to facilitate describing the disclosure, and wherein:

FIG. 32 shows an example of relationship between an input code to be input to an identification device (challenge) and an output code to be output (response).

FIG. 35 shows an example of relationship between an input code to be input to an identification device (challenge) and an intermediate code as an intermediate output.

FIG. 36 shows an example of relationship between an intermediate code as an intermediate output from an identification device and an output code.

DETAILED DESCRIPTION OF THE INVENTION

As mentioned above, by making various elaborations inside semiconductor chips which are physical substances, the identification device related to the present disclosure is able to realize (Uneditable physical address) which is specific to every chip. The output from this identification device is a kind of physical random number and able to be used to generate private key to be used in the electronic signature of blockchain.

By precisely designing the configuration to use such properties, it becomes possible to utilize excellent functions of blockchain which is powerful on the network of logical nodes (logical network) to the network of physical nodes (physical network). The detailed is illustrated along with drawings as follows.

First Embodiment

Figure 1:
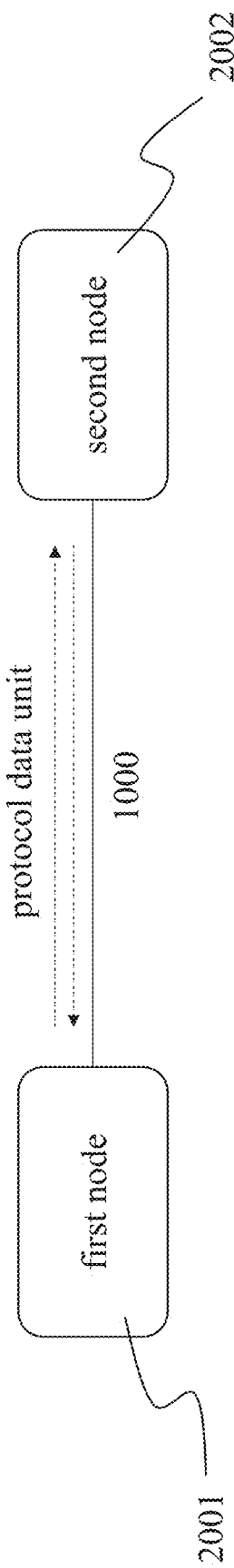
FIG. 1 is a diagrammatic view of a smallest unit of a network system.
Figure 25:
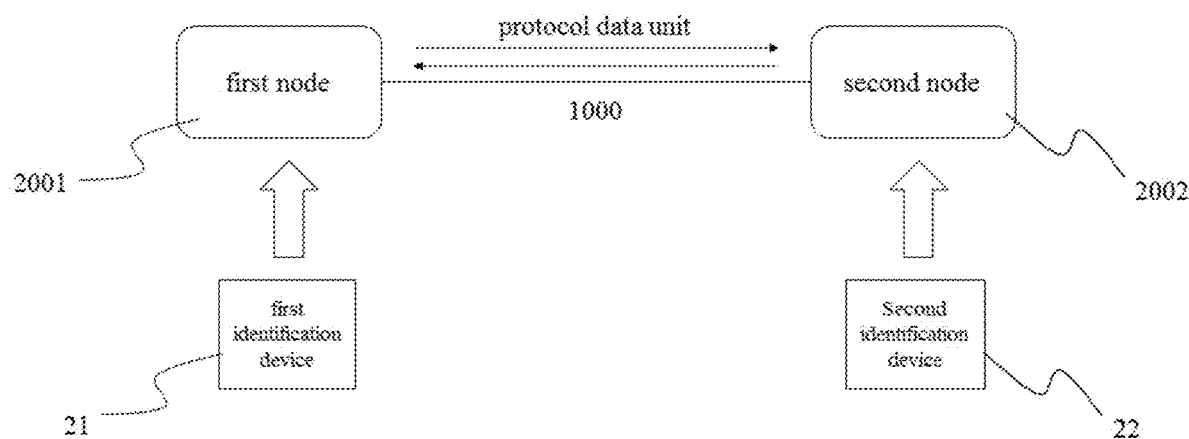
FIG. 25 shows an example of using a method of an identification device.

In FIG. 25, two different identification devices (the first identification device 21 and the second identification device 22) to satisfy those conditions are equipped into the first node 2001 and the second node 2002, respectively. The first node 2001 and the second node 2002 are linked by the signal transmission pathway 1000 and then are able to exchange protocol data unit according to a predetermined format. FIG. 25 is equivalent to FIG. 1 if the first identification device 21 and the second identification device 22 are added to FIG. 1.

Figure 26:
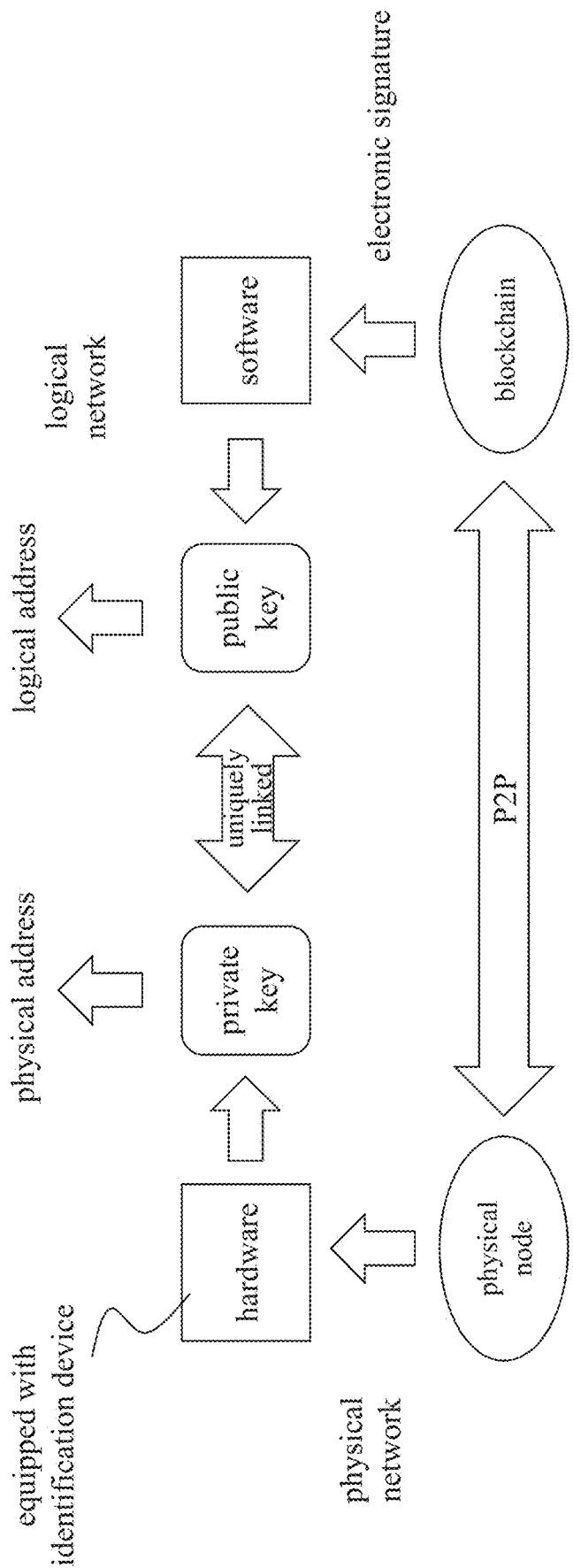
FIG. 26 shows the concept of a network in which an identification device and a blockchain cooperate.

FIG. 26 shows the configuration of physical network including hardware with identification devices related to the present disclosure and logical network in which blockchain is utilized. The hardware has physical substances to be nodes forming physical network and then may be regarded as physical nodes. The (Uneditable physical address) generated by identification device is deemed as a private key. The logical node of which logical address is the public key forming a pair with this private key forms a pair with the hardware including the identification device. Thus, (Uneditable physical addresses) and logical address are linked on the P2P network. It means that software and hardware are linked and any manipulation is thus impossible.

Figure 27:
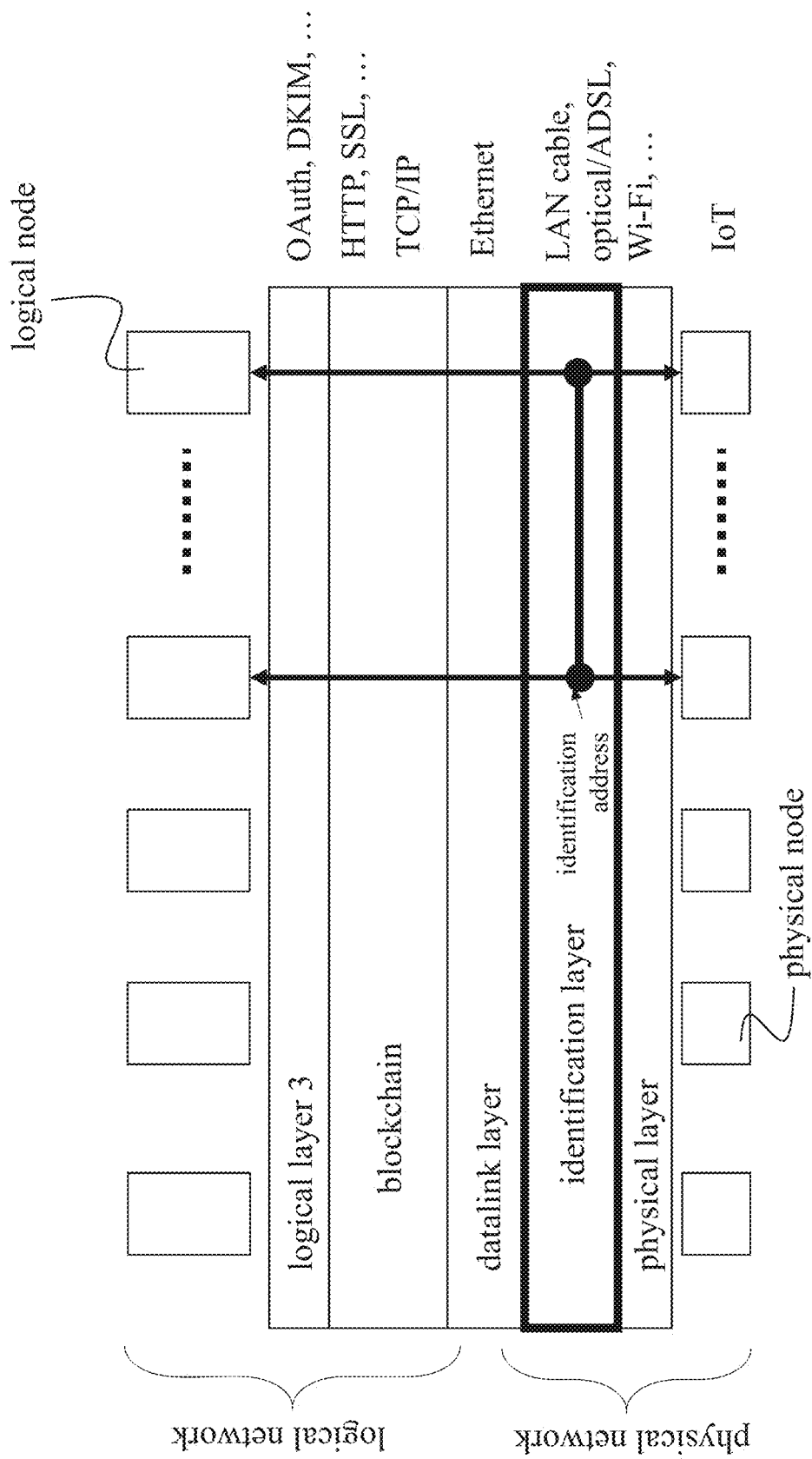
FIG. 27 shows an example of a network in which an identification device and a blockchain cooperate.

FIG. 27 shows the identification device related to the present disclosure links logical address and physical address. First, the identification device forms an identification layer between the datalink layer and the physical layer. The logical address and the physical address forming the pair with the public key encryption are combined to be identification address in the identification layer. Thus, the logical nodes distributed above the logical layers and the physical nodes distributed below the physical layer are linked with no possibility of manipulation.

Second Embodiment

Figure 28:
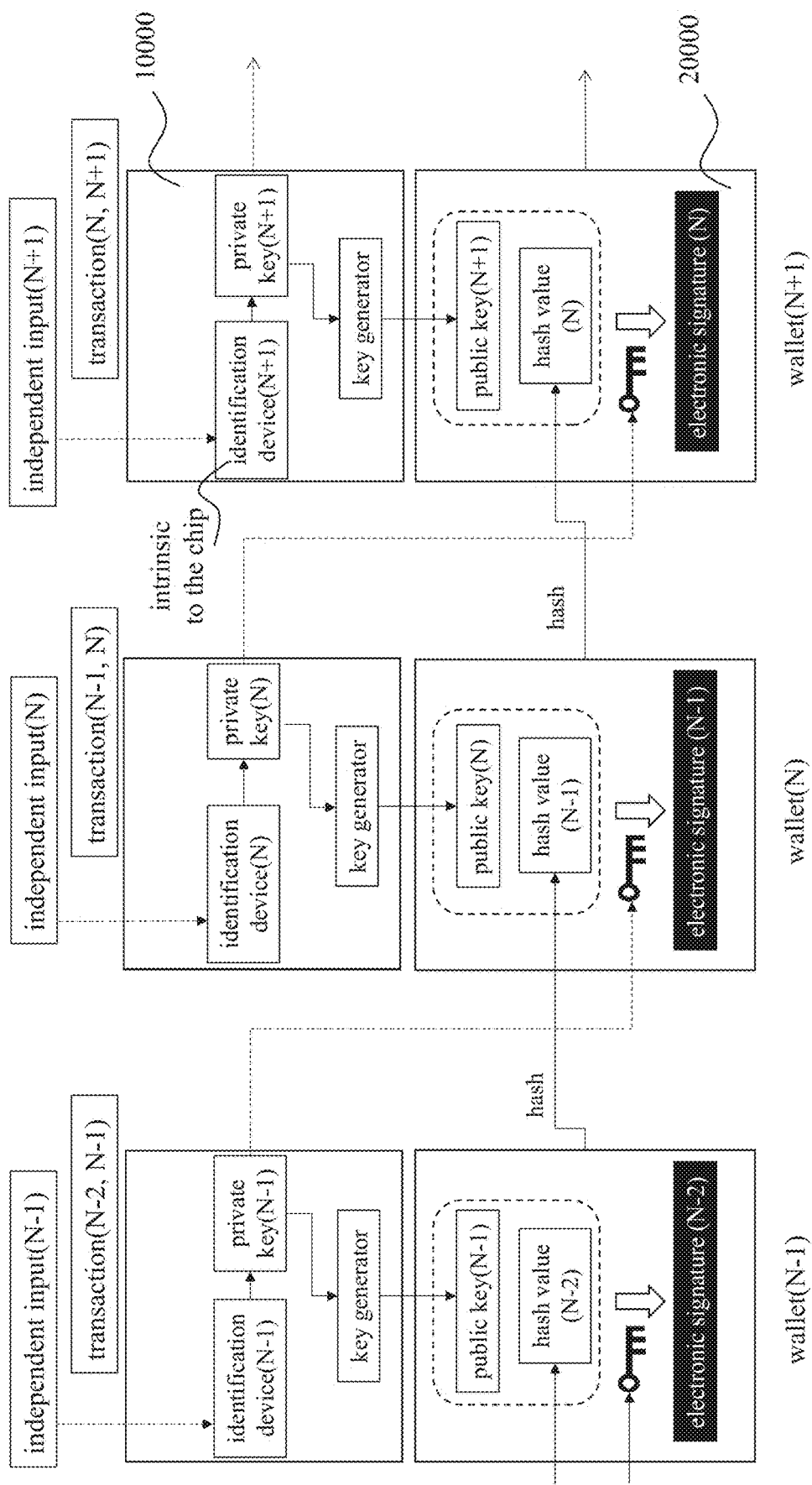
FIG. 28 shows the concept of a bitcoin type remittance with the utilization of an identification device.

FIG. 28 is a drawing showing an example that the transaction (N−2, N−1) is executed from the wallet (N−2) to the wallet (N−1), the transaction (N−1, N) is executed from the wallet (N−1) to the wallet (N), and the transaction (N, N+1) is executed from the wallet (N) to the wallet (N+1), where N is arbitrary integer allocated to physical nodes connected to the network by some kind of method. The wallet (N) is equivalent to the node (N). At the bottom row, there are three squares 20000, which secure the public keys, hash values and electronic signatures. On the contrary, in the upper row, there are key generators and three squares including identification devices and the private keys (Uneditable physical addresses).

Figure 29:
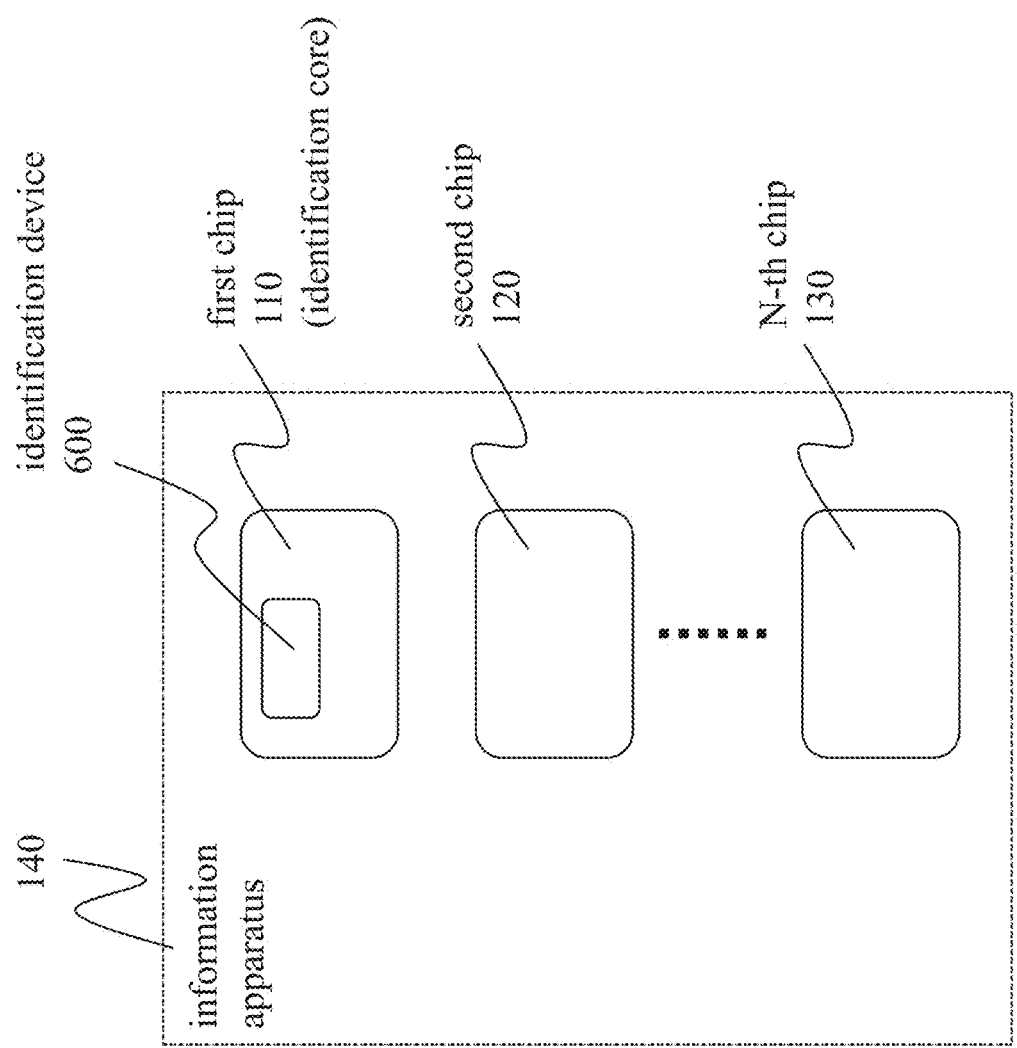
FIG. 29 shows an example of information apparatuses including a chip having an identification device (identification core).

Those identification devices correspond to the identification devices 600 included into the first chip 110 (identification core), as shown in FIG. 29. The information apparatuses have physical substances and differ from logical nodes, the addresses of which are IP addresses and public keys. Thus, the first chip 110 has the identification device 600 to associate the information apparatuses and the logical network. In this regard, the first chip 110 can be deemed as the identification core of information apparatus 140. The first chip 110 configures the information apparatus 140 together with a plurality of other semiconductor chips (for example, the second chip 120 . . . the N-th chip 130). That is, the three squares arrayed in the upper row of FIG. 28 are the identification cores 10000 to be respectively equipped into information apparatuses.

Figure 8:
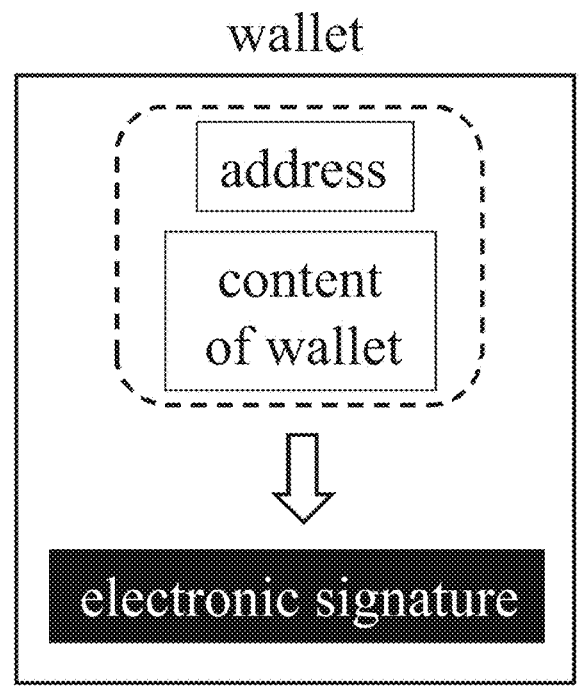
Figure 9:
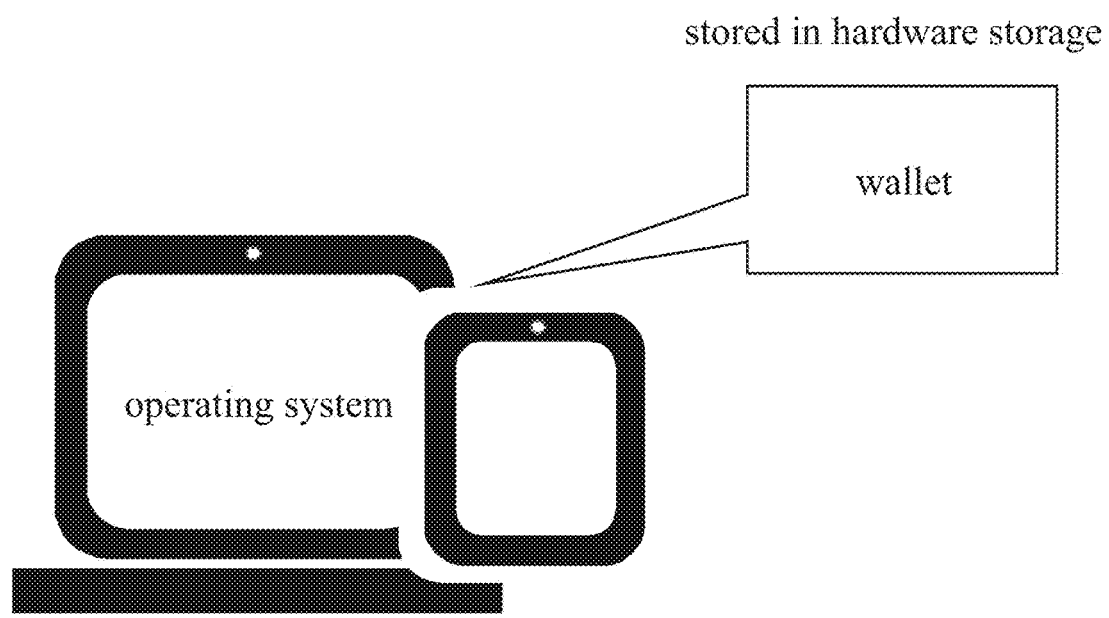

On the other hand, the wallet of bitcoin shown in FIG. 8 corresponds to the squares at the bottom row of FIG. 28. In other words, the identification cores are appended in the upper row in the present disclosure. Furthermore, in the present disclosure, a private key is included into an identification core and then is able to be confined in a physical substance (semiconductor chip).

To actually follow the operation, the wallet (N) in the center of the bottom column may be considered. The hash value (N−1) is the content of the wallet (N) and generated in the previous wallet (N−1) by the following method. First, the public key (N−1), which is the logical address in the network (bitcoin address in bitcoin system), the hash value (N−2), which is the content of the wallet (N−1), and the electronic signature (N−2) are hashed together. The hash function may be used to hash them. There are plenty of hash functions such as: MD2, MD4, MD5, RIPE-MD160, SHA-256, SHA-384, SHA-512 and so forth. As an example, the bitcoin adopts one of them, which is SHA-256.

The wallet (N−1) gets the public key (N) to be the logical address of the wallet (N) in the network. The public key (N) and the hash value (N−1) are encrypted together by the private key (N−1) to form the electronic signature (N−1). The electronic signature (N−1) and the hash value (N−1) are forwarded to the wallet (N). In the wallet (N), the public key (N), the hash value (N−1) and the electronic signature (N−1) are hashed together to form the hash value (N). The hash value (N) and the electronic signature (N) are forwarded to the wallet (N+1). Since the methods to generate the electronic signature (N−2) and the electronic signature (N) are similar to that to generate the electronic signature (N−1), the description for this may be omitted.

Figure 10:
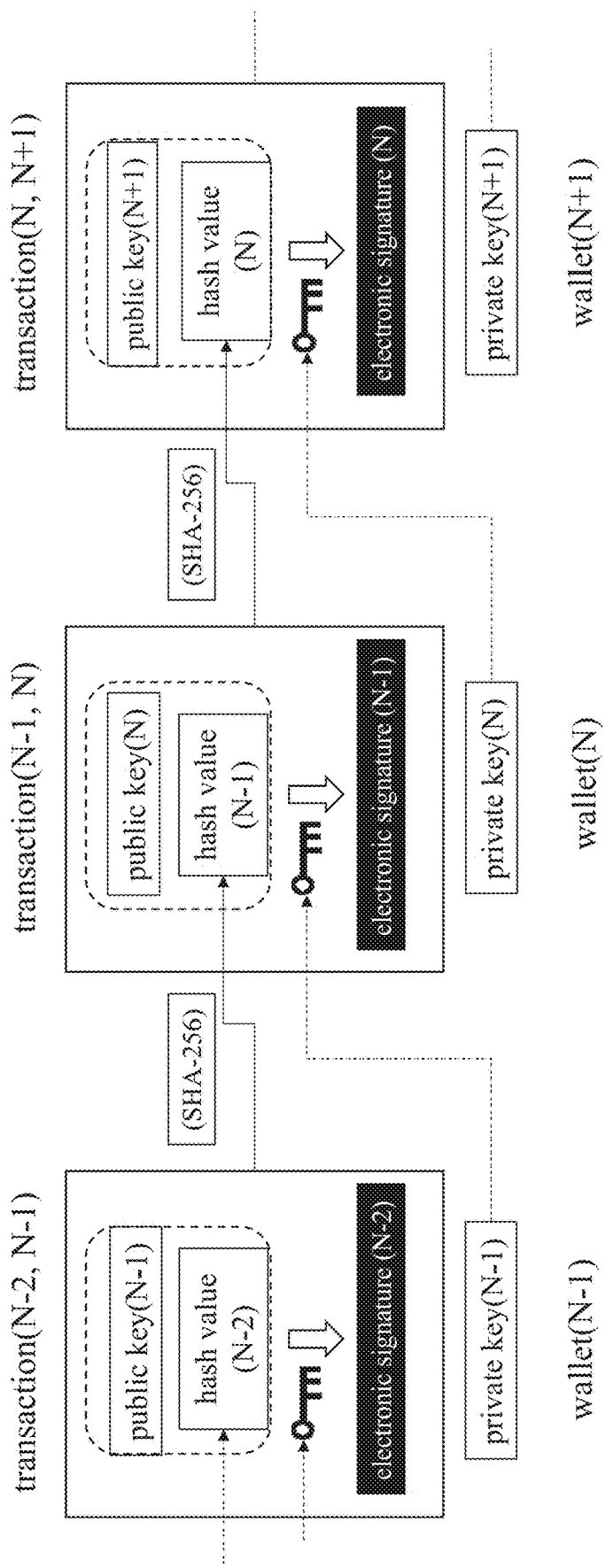
FIG. 10 shows the configuration of a remittance of encryption currency.
Figure 11:
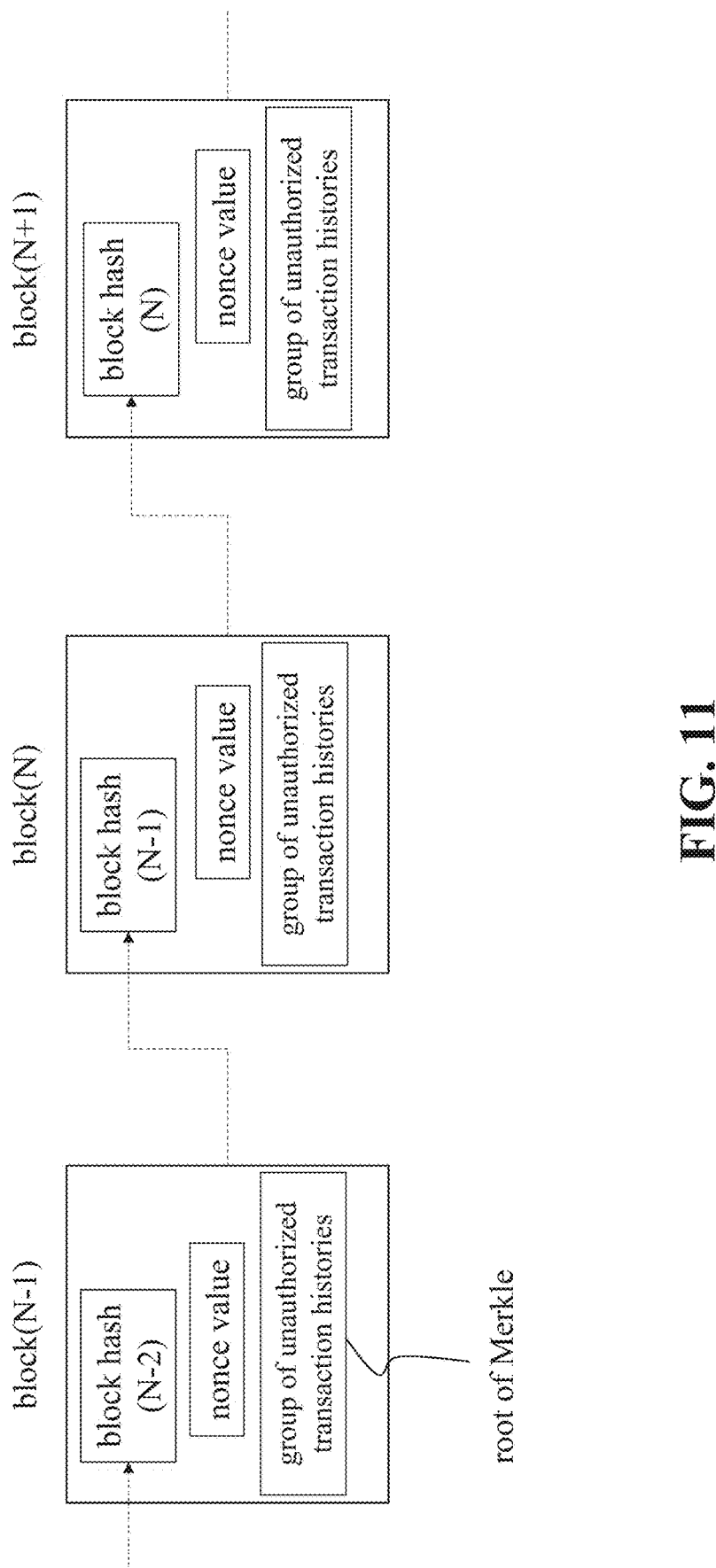
FIG. 11 is a diagrammatic view of the configuration of a blockchain.
Figure 12:
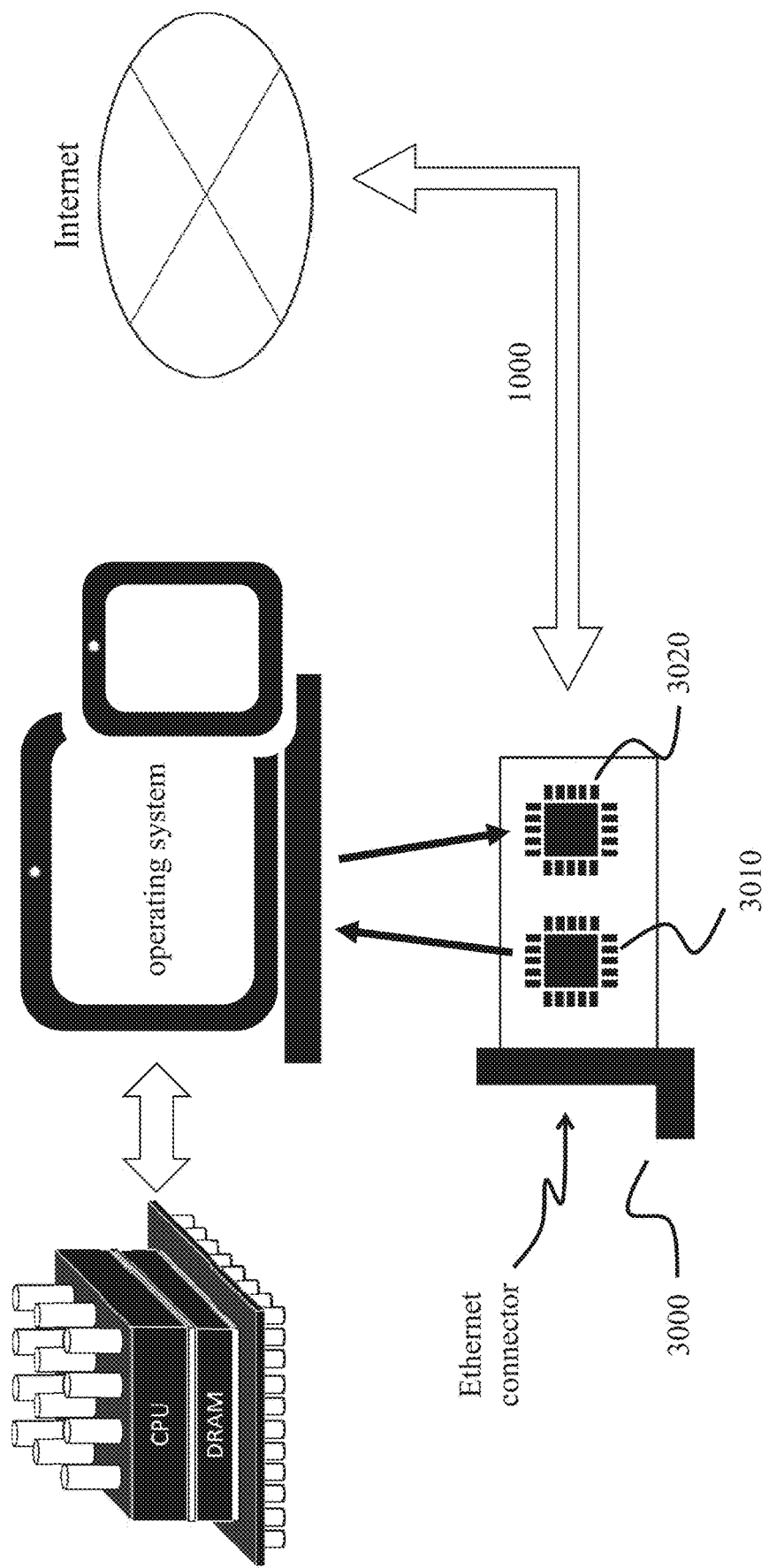
FIG. 12 is a diagrammatic view of the configuration to utilize a MAC address.
Figure 13:
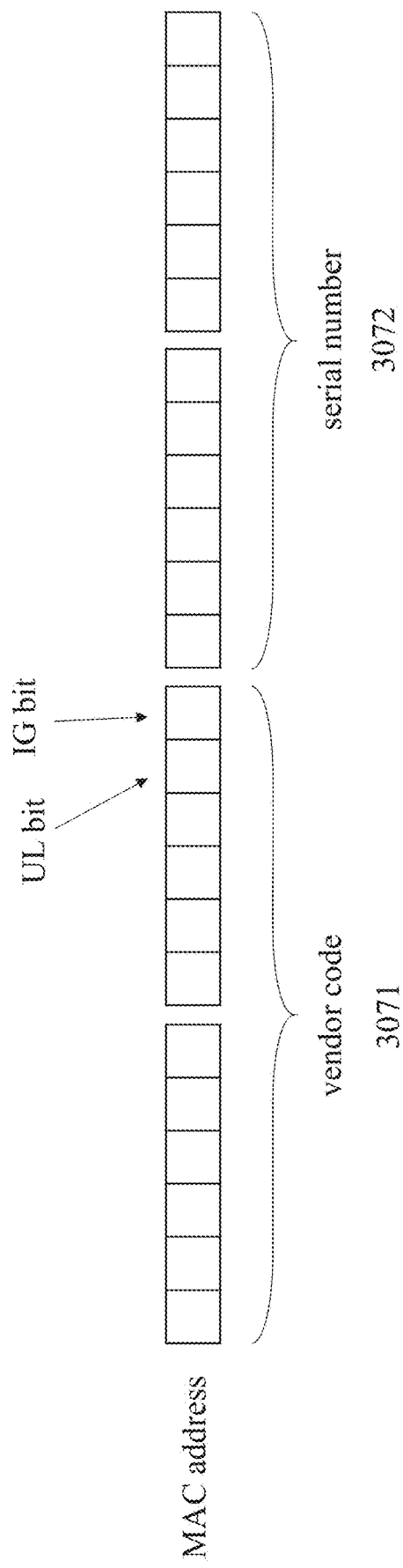
FIG. 13 is a diagrammatic view of the configuration of a MAC address.

Accordingly, the description is same as that in FIG. 10 with the exception that the private key is included in the identification core 10000. Accordingly, the present disclosure has a complete consistency with the conventional block chain.

The decisive difference from FIG. 10 is therefore the identification core 10000. That is, the public keys included in the square 20000 at the bottom row differ from addresses of wallets to be logically given like bitcoin and are generated through a designed physical generation process by the squares in the upper row, that is, the identification cores 10000.

An square in the upper row, i.e., an identification core 10000 is one of semiconductor chips (or, chips) configuring a physical node on the network. In general, semiconductor chips are physical substances and then those existences cannot be generated logically by any software.

The square in the upper row, that is, the identification core 10000 includes at least three components of identification device, certain code information to be input to the identification device (independent input), and private key to be generated by the identification core.

As an example, the independent input is a digital code information to boot certain application executing on the network such as passcode, PIN code, barcode, QR code and so forth, certain biometric information to identify the regular user of the application such as finger print information, finger vein information, retina information, DNA information and so forth, voice and image information extracted from voice and picture of regular users to identify an individual person, physical information extracted from physical characteristics of regular users to identify an individual person, and other personal information to identify a regular user.

As another example, the independent input is a digital code information that certain application requires from users as necessary such as passcode, PIN code, barcode, QR code and so forth, certain biometric information to identify the regular user of the application such as finger print information, finger vein information, retina information, DNA information and so forth, voice and image information extracted from voice and picture of regular users to identify an individual person, physical information extracted from physical characteristics of regular users to identify an individual person, and other personal information to identify a regular user.

As an example, the independent input is a digital code information to boot an information apparatus to which certain application operating on the network is installed such as passcode, PIN code, barcode, QR code and so forth, certain biometric information to identify the regular user of the said application such as finger print information, finger vein information, retina information, DNA information and so forth, voice and image information extracted from voice and picture of regular users to identify an individual person, physical information extracted from physical characteristics of regular users to identify an individual person, and other personal information to identify a regular user.

Moreover, as a further example, the independent input is an acquiring code of special mode to acquire physical randomness to be generated properly to every semiconductor chip configuring identification device by certain physical process. However, the acquiring code of special mode is at least a code to identify access mode, address and operation mode to data inside the chip.

Moreover, the independent input may be configured by combining a plurality of the independent inputs. It is thus able to link private key to be generated by the identification device having the physical substance and the logical address on the network. That is, it can be able for the identification core related to the present disclosure to functionally link the semiconductor chip having physical substance (hardware) and the logical network (software).

On the other hand, one of the few weak points of blockchain is the 51% attack. This is a problem how to distinguish the regular blockchain from a fake blockchain to be generated by double transaction which a regular user of private key has made. As mentioned above, if the regular blockchain has existed before the double transaction, it is deemed that this problem is solved by regarding the longer chain as the regular chain. However, in the case that a malicious attacker dominates more than 51% of the computational ability to be used for the blockchain all over the world, it may not be impossible to lengthen a blockchain to be generated later more than an older blockchain.

With the square in the upper row related to the present disclosure, i.e., identification core 10000, it is able to disable even regular owners or users from extracting the private key from the chip configuring the identification core.

The description may be continued with FIG. 28 as follows. For example, it may begin with the method to generate the electronic signature (N) with the private key (N). First of all, the wallet (N) forms the hash value (N) by hashing the hash value (N−1) which is the content of the wallet (N), the public key (N) and the electronic signature (N−1) together. This may be temporarily stored in the wallet (N). Next, the wallet (N) is to get the public key (N+1) which is the logical address of the destination of the transaction on the network, i.e., the wallet (N+1). Subsequently, by using the private key (N) confined inside the chip of the identification core 10000 linked to the wallet (N), the hash value (N) and the public key (N+1) are encrypted together by the key generator inside the identification core to generate the electronic signature (N). Lastly, the generated electronic signature (N) and the hash value (N) are forwarded to the wallet (N+1) whose logical address is the public key (N+1).

By doing so, all of the processes of transaction (N, N+1) is able to be completed on the side of the wallet (N). Then, it is unnecessary to expose the private key to the external of the identification core. Then, it may be able to avoid the abuse of private key and then it is unnecessary to worry about the 51% attack.

Third Embodiment

Figure 30:
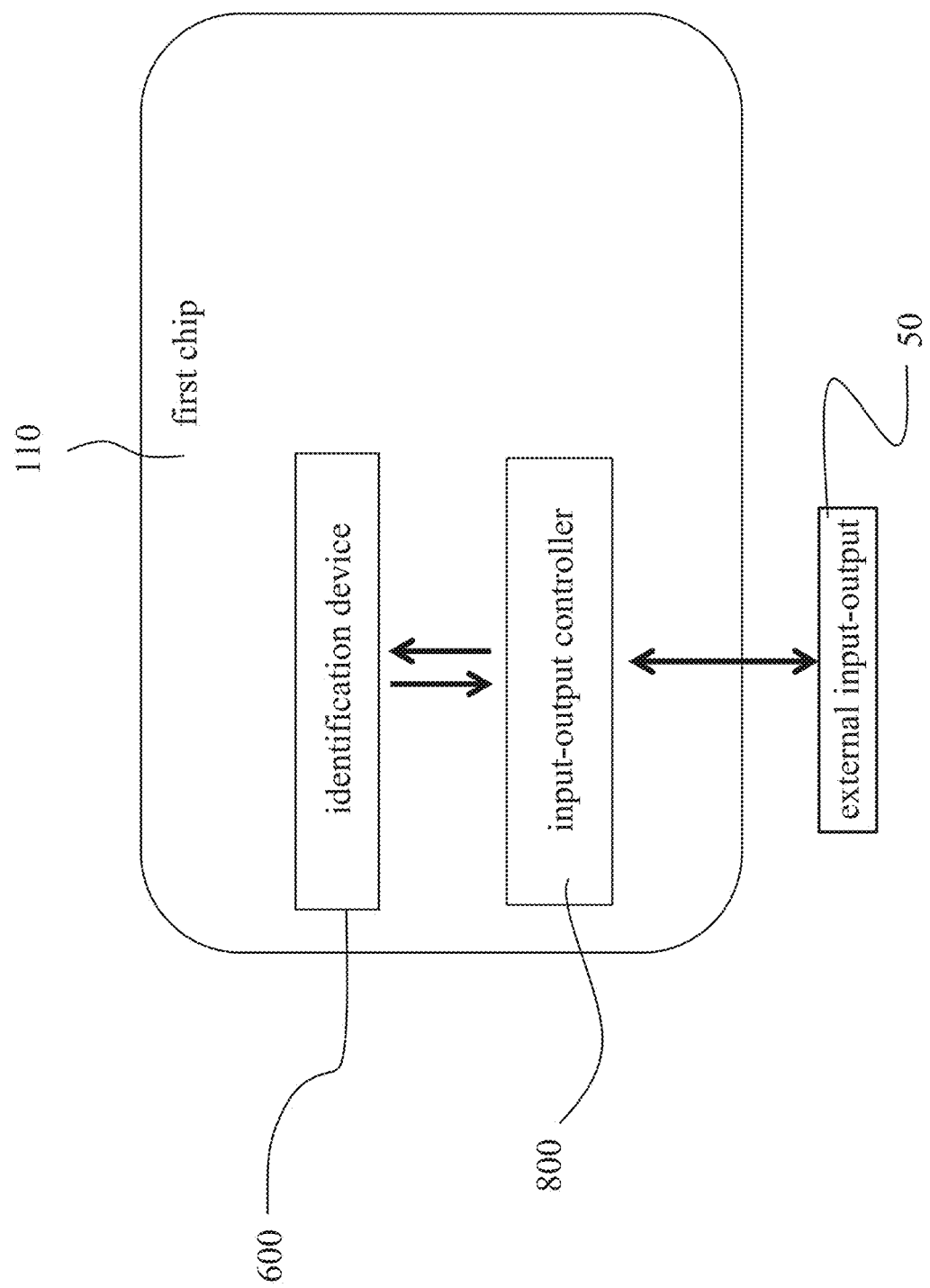
FIG. 30 shows an example of configurations of chip including an identification device.

In the example of FIG. 29, the first chip 110 configures the identification core related to the present disclosure. The chip is equipped with at least the identification device 600 and the input-output controller 800 as shown in FIG. 30, for example. The input-output controller 800 may further include an input-output controlling circuit, a word line controlling circuit, a bit line controlling circuit, a buffer for data input-output and so forth, and then may be able to exchange data with the external via an external input-output 50.

Accordingly, it is not common that the number of chips configuring electronic apparatuses is only one. It may be regarded that the nodes composing the network includes at least one or more chips. As an example: in FIG. 29, the information apparatus 140 being a physical node includes the first chip 110, the second chip 120 . . . the N-th chip 130. Among them, it may not be generally necessary that all of the chips include the identification device related to the present disclosure. In the example of FIG. 29, only the first chip 110 includes the identification device 600 and then serves as the identification core.

The identification device like this may be equipped together with modules having other functions inside the chip, or manufactured as an independent chip having only the identification function. Moreover, it may be preferred that the identification device generates output code according to physical randomness whenever it receives an input code. In the case that plurality of chips configures an electronic apparatus, at least one of those chips is necessary to include the identification device related to the present disclosure.

Figure 31:
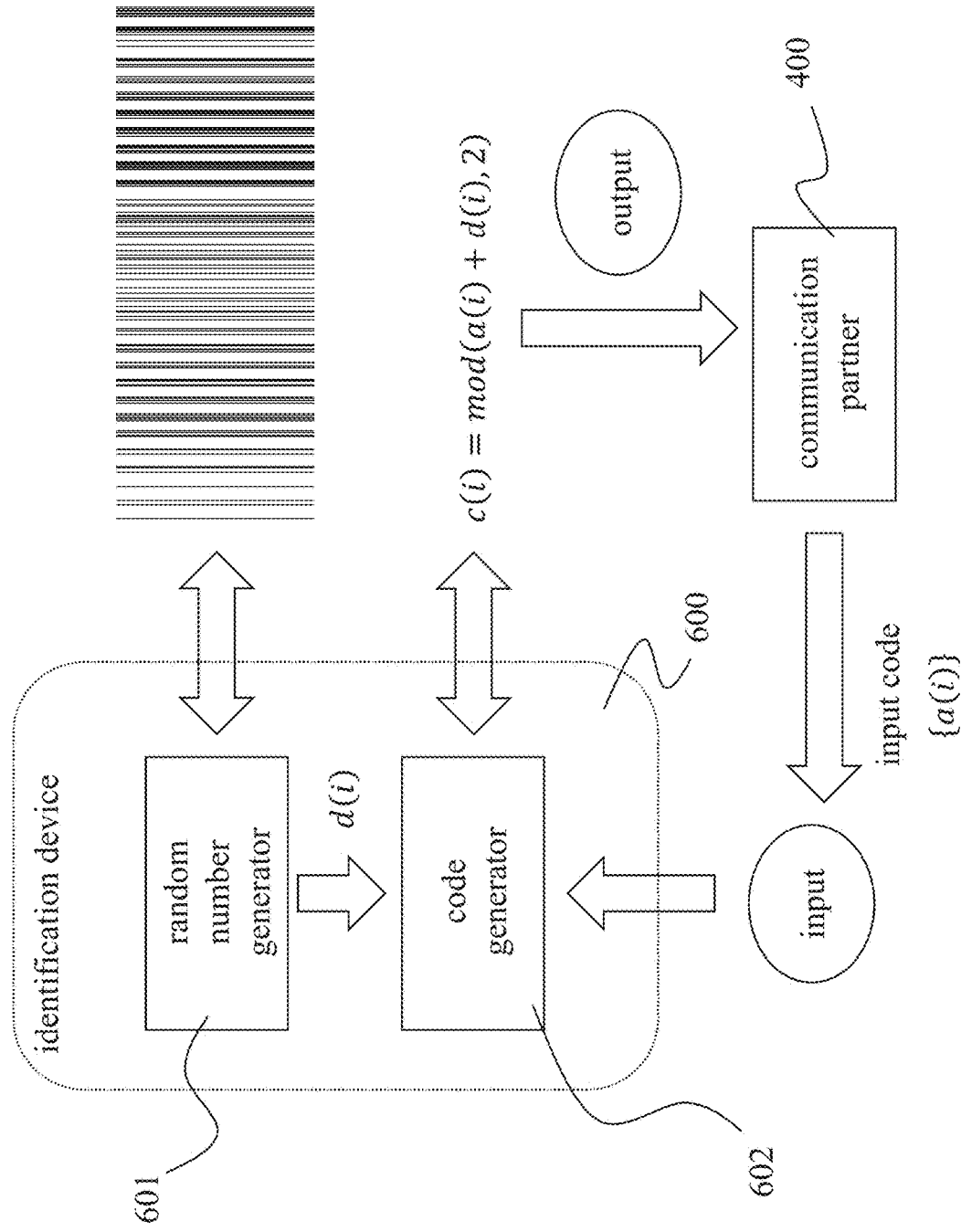
FIG. 31 shows an example of communication methods with the utilization of identification devices including a random number generator and a code generator.

FIG. 31 is a conceptual drawing showing the configuration of the identification device of FIG. 29 and an example of utilization method. The identification device may include at least the random number generator 601 and the code generator 602. That is, a random code $\{d(i)\}$ is generated by the random number generator 601 and then forwarded to the code generator 602. An input code $\{a(i)\}$ is also input from the communication partner 400 to the code generator 602. Then, the code generator 602 generates an output code $\{c(i)\}$. However, i is an integer ranging from 1 to N.

Figure 14:
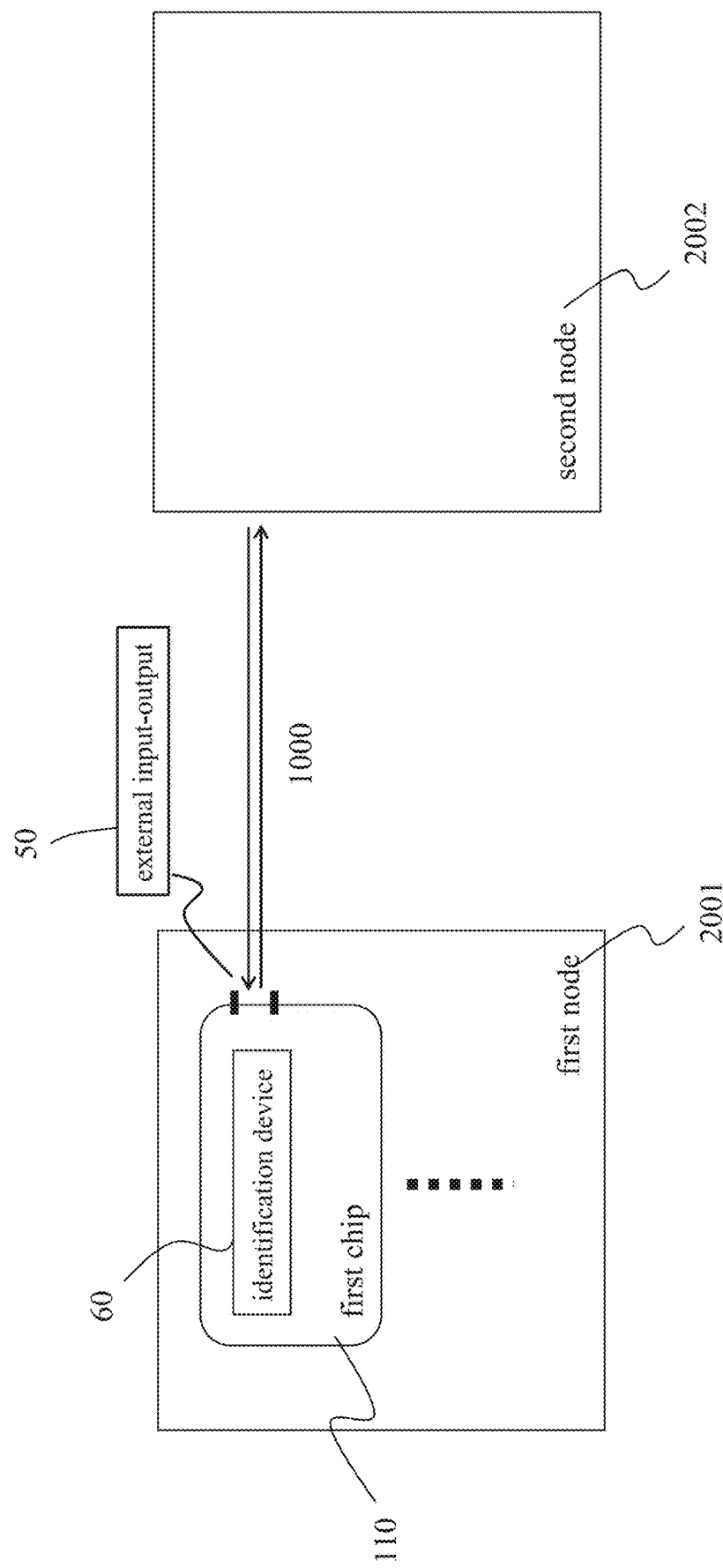
FIG. 14 is a diagrammatic view of the configuration of an identification device.

As an example, a communication partner 400 may correspond to the second node 2002 in FIGS. 14 and 25. On the other hand, a physical node including the identification device 600 may correspond to the first node 2001 in FIGS. 14 and 25. If the second node 2002 is a physical node, FIG. 31 is the conceptual drawing of the communication among physical nodes.

In another example, the input code $\{a(i)\}$ is also able to be the independent input in FIG. 28. In this case, the communication partner 400 is a consumer or user of the wallet.

(Code Generator)

Anyway, $\{a(i)\}$ is a progression of 0 and 1 in binary notation, which is converted from the input code (P, S, T . . . ) that the communication partner 400 inputs. Additionally, the physical random number code $\{d(i)\}$ generated by the random number generator 601 is a random aggregation of 0 and 1. Subsequently, by using a certain method, the output code $\{c(i)\}$ is generated from the input code $\{a(i)\}$ and the random code $\{d(i)\}$. This is the role of the code generator. The output code $\{c(i)\}$ is returned to the communication partner 400. Thus, the input code $\{a(i)\}$ and the output code $\{c(i)\}$ may be exchanged between the communication partner 400 and the identification device.

As an example like equation (1), to generate the output code $\{c(i)\}$, the residue operation mod (x, y) may be adopted. This provides the remainder of dividing x by y. FIG. 32 is the chart showing the relation among the input code {a(i)}, the physical random number code {d(i)}, and the output code {c(i)} to be output according to the equation (1).

$$c(i)=\mod(a(i)+d(i),z) \quad \text{Equation (1)}$$

With this method, it is easily construed that the ratio of 0 to 1 is unchangeable before and after the conversion. Such condition is necessary to stabilize the data quantity to be treated. That is, it is required that the information quantity to be input to the right hand side of the equation (1) is almost identical to the data quantity to be output from the left hand side of the equation (1). In the case that the information quantities of input and output are quite different, the information quantity of the system, which is defined by the equation (1), is fit to the smaller one. As a result, the information entropy (physical randomness) may be lost by the difference between them. The loss of information entropy should be avoided as possible because it may degrade the (Actual limitlessness of output) to that extent.

(Random Number Generator)

The specific configuration of the random number generator is described in detail below.

In the example of FIG. 31, both of the random number generator 601 and the code generator 602 compose the identification device 600. On the other hand, not specially illustrated since it may be self-evident, in another example, the code generator 602 may be out of the identification device 600. This may not be a problem as long as the code generator 602 is included in the identification core 10000. Or in further different example, the code generator is unnecessary. In this case, the physical random number code {d(i)} can be the output code {c(i)} itself. In the example of FIG. 28, the independent input to the identification core may be omitted.

The code generator 602 may be configured by a program as conceptually illustrated in the equation (1). Then, a certain algorithm is used to generate a code. However, it is not a problem because the physical randomness is incorporated with the physical random number code {d(i)}.

Fourth Embodiment

Figure 33:
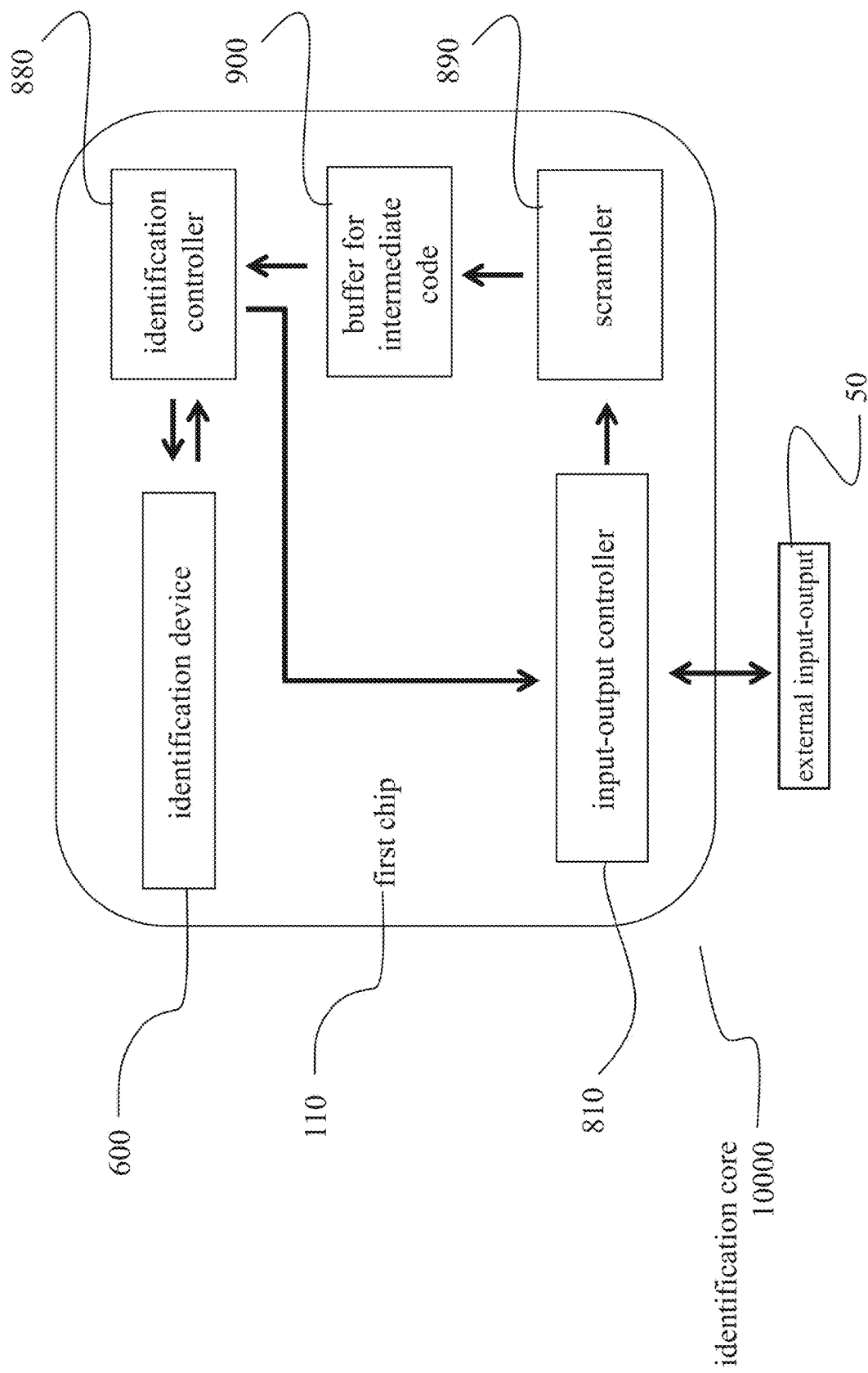
FIG. 33 shows an example of configurations of an identification core.

As shown in FIG. 33, the identification core 10000 related to the present disclosure may be, for example, configured by at least an identification device 600, an identification controller 880, an input-output controller 810, a scrambler 890, and a buffer 900 for intermediate code. They are then equipped into a chip.

The input-output controller 810 is able to include the input-output controlling circuit and the buffer for data input-output but not the word line controlling circuit and the bit line controlling circuit. The scrambler 890 generates an intermediate code. The intermediate code is stored in the buffer 900 for intermediate code, which is independent from the external of the chip 10. Thus, the intermediate code is not output to the external even though it is required from the external. It is for confining the intermediate code inside the chip. The identification controller 880 may include a word line control module, a bit line control module, and a data buffer.

Figure 34:
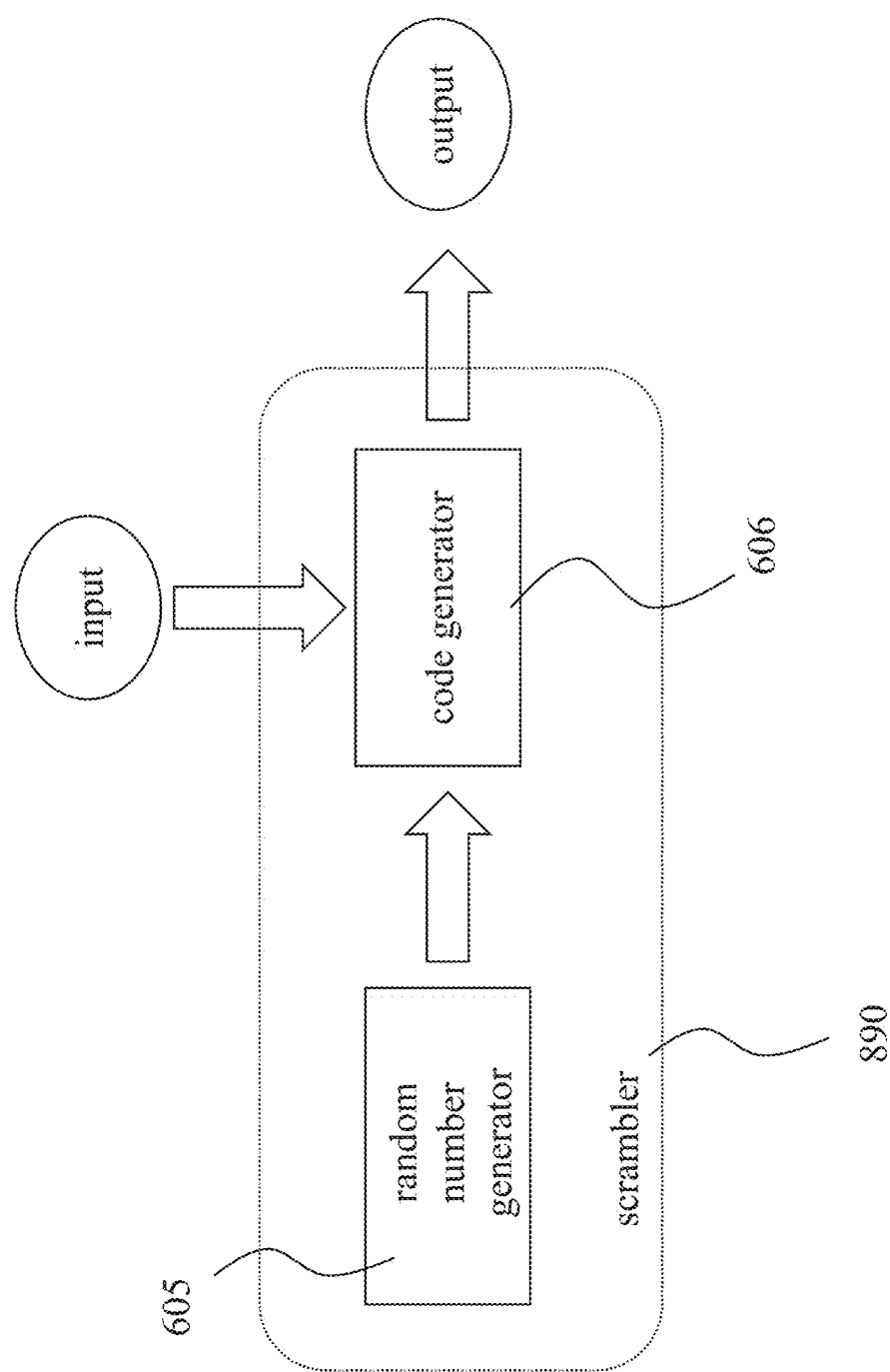
FIG. 34 shows an example of configurations of a scrambler.

If the input code {a(i)} is input from the external input-output (I/O) 50, the input-output controller 810 forwards the input code {a(i)} to the scrambler 890. However, the scrambler 890 includes at least the random number generator 605 and the code generator 606, as shown in FIG. 34. Additionally, it may include a word line controlling circuit, a bit line controlling circuit and a data buffer.

The intermediate code {f(i)} generated according to equation (2) by the scrambler 890 is temporarily stored in the buffer 900 for intermediate code and then forwarded to the identification controller 880. However, {d(i+N)} in the equation (2) is a random number code generated by the random number generator 605 and differ from the random number code {d(i)} generated by the random number generator 601. Moreover, the code generator 606 to generate the intermediate code {f(i)} according to the equation (2) is, in general, unnecessary to be identical to the code generator 602 in FIG. 31. However, in the case that the identification core 10000 is one-chip, as another example, the code generator 602 may play a role of the code generator 606. In this case, the chip area is saved by the code generator 606.

$$f(i)=\mod(a(i)+d(i+N),2) \quad \text{Equation 2}$$

As an example, as shown in FIG. 35, the residue operator mod (x, y) may be adopted to generate the intermediate code {f(i)}. The residue operation provides the residue of dividing x by y. FIG. 35 is the chart showing the relation among the input code {a(i)}, the physical random number code {d(i+N)} and the intermediate code {f(i)} to be output according to the equation (2).

The identification controller 880 commands the inner word line controlling circuit, the inner bit line controlling circuit, the inner data buffer and so forth to generate the output code {c(i)} according to equation (3) in response to the physical random number code {d(i)} to be obtained from the identification device 600 and the intermediate code {f(i)} to be obtained from the module of the buffer 900 for the intermediate code.

$$c(i)=\mod(f(i)+d(i),2) \quad \text{Equation 3}$$

As an example, as shown in FIG. 36, the residue operator mod (x, y) may be adopted to generate the intermediate code {f(i)}. The residue operation provides the residue of dividing x by y. FIG. 36 is the chart showing the relation among the intermediate code {f(i)}, the physical random number code {d(i)} and the output code {c(i)} to be output according to the equation (3).

The output code {c(i)} is temporarily stored in the inner data buffer of the identification controller 880. The input-output controller 810 gets the output code from the inner data buffer of the identification controller 880 and then exports it to the external of the identification core 10000 via the external input-output 50. However, the intermediate code {f(i)}, the physical random number codes {d(i)} and {d(i+N)} are confined inside the identification core 10000 and not exported to the external.

Furthermore, not specially illustrated since it may be self-evident, the scrambler 890 may be included into the identification device 600 in the present disclosure. The detailed description for this is omitted because it is self-evident.

Fifth Embodiment

Figure 37:
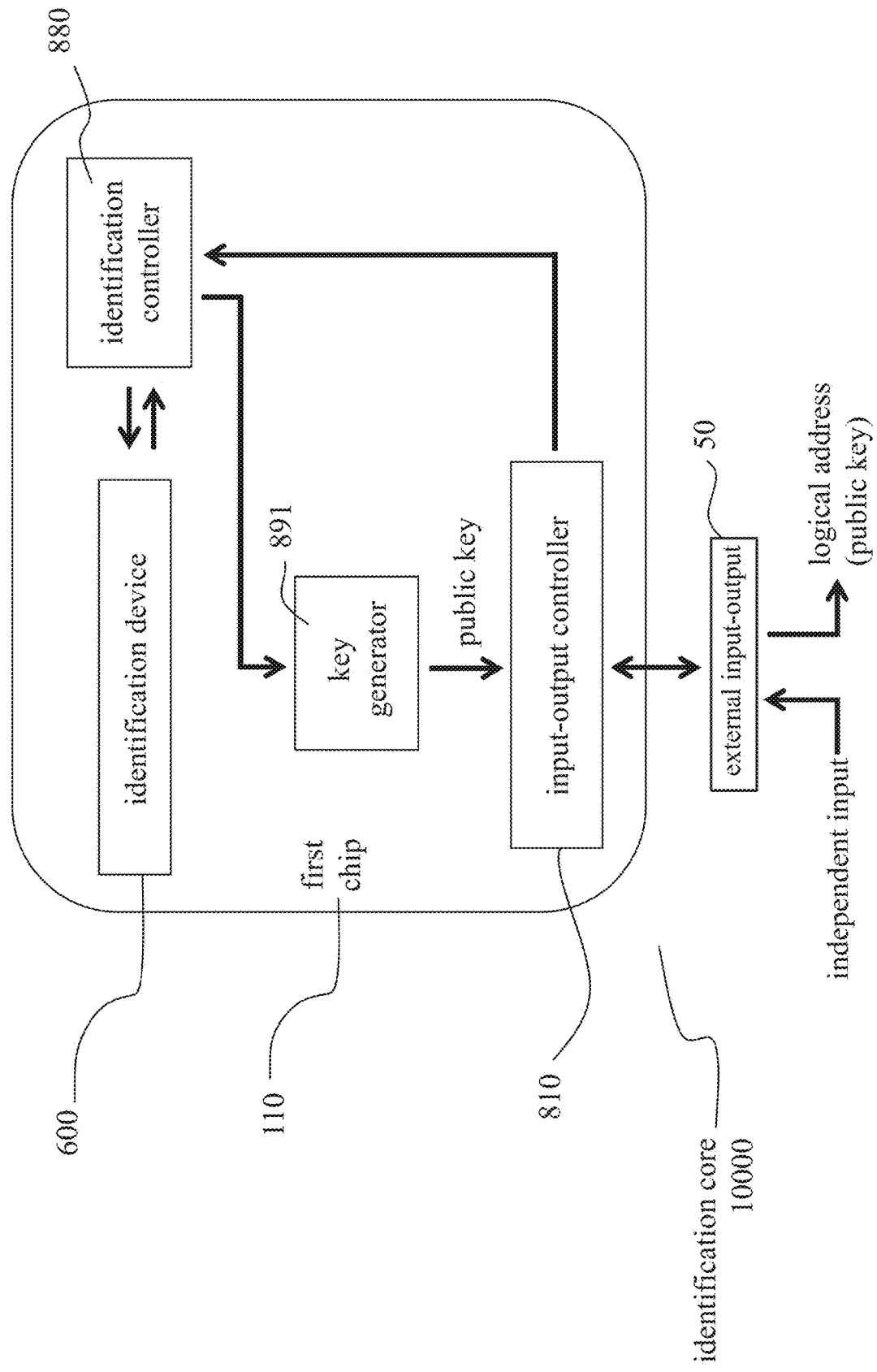
FIG. 37 shows an example of configurations of an identification core.

The identification core 10000 related to the present disclosure, as shown in FIG. 37 as an example, includes at least the identification device 600, the identification controller 880, the input-output controller 810, and the key generator 891. They are then equipped into the chip.

The input-output control module 810 may include the input-output controlling circuit and the buffer for input-output data but not the word line controlling circuit and the bit line controlling circuit. The identification controller 880 may include the word line controlling circuit, the bit line controlling circuit and the data buffer.

If an input code {a(i)} is input via the external input-output 50, the input-output controller 810 forwards the input code {a(i)} to the identification controller 880. The identification controller 880 has a command of the inner word line controlling circuit, the inner bit line controlling circuit, the inner data buffer and so forth to generate the output code {c(i)} in response to the random number code {d(i)} obtained from the identification device 600 and the input code {a(i)} according to the equation (1). The generated output code {c(i)} serves as a private key in the examples of FIG. 28. The output code {c(i)} is input to the key generator 891 to generate the public key. The input-output controller 810 exports the public key to the external of the identification core 10000 via the external input-output 50. On the other hand, the private key is able to be confined inside the chip.

Alternatively, in the case that an acquiring code of special mode is input as independent input via the external input-output 50, the input-output controller 810 forwards the acquiring code of special mode to the identification controller 880. The identification controller 880 has a command of the inner word line controlling circuit, the inner bit line controlling circuit, the inner data buffer and so forth so as to obtain the physical random number code {d(i)} from the identification device 600 according to the acquiring code of special mode. The obtained random number code {d(i)} is output as output code {c(i)}. In this case, the equation (1) is generally unnecessary. This output code {c(i)} serves as a private key in the examples of FIG. 28. The output code {c(i)} is input to the key generator 891 to generate the public key. The input-output controller 810 exports the public key to the external of the identification core 10000 via the external input-output 50. On the other hand, the private key is able to be confined inside the chip.

Alternatively, in the case that an acquiring code of special mode and an input code {a(i)} are input as independent input via the external input-output 50, the input-output controller 810 forwards the acquiring code of special mode and the input code {a(i)} to the identification controller 880. The identification controller 880 has a command of the inner word line controlling circuit, the inner bit line controlling circuit, the inner data buffer and so forth so as to obtain the physical random number code {d(i)} from the identification device 600 according to the acquiring code of special mode. An output code {c(i)} is generated from the obtained random number code {d(i)} and the input code {a(i)} according to the equation (1). The generated output code {c(i)} serves as a private key in the examples of FIG. 28. The output code {c(i)} is input to the key generator 891 to generate the public key. The input-output controller 810 exports the public key to the external of the identification core 10000 via the external input-output 50. On the other hand, the private key is able to be confined inside the chip.

Sixth Embodiment

Figure 38:
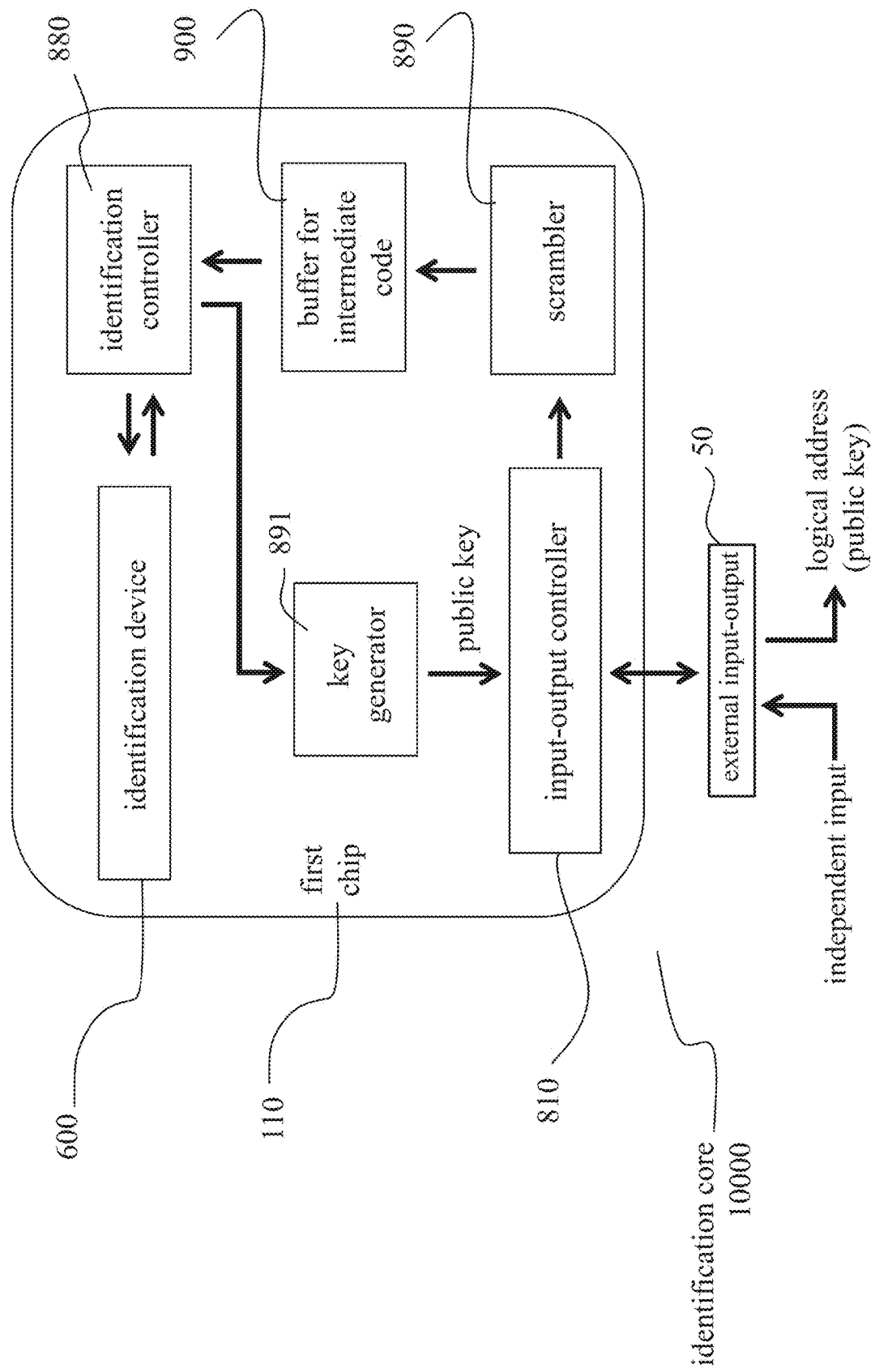
FIG. 38 shows an example of configurations of an identification core.

The identification core 10000 related to the present disclosure, as illustrated in FIG. 38 as an example, comprises at least the identification device 600, the identification controller 880, the input-output controller 810, the scrambler 890, the buffer 900 for intermediate code, and the key generator 891. They are then equipped into a chip.

This input-output controller 810 may include the input-output controlling circuit and the buffer for input-output data but not the word line controlling circuit and the bit line controlling circuit. The intermediate code generated by the scrambler 890 is stored in the buffer 900 for intermediate code, which is independent from the input-output controller 810. The intermediate code is not exported to the external of the identification core 10000 even though it is requested from the external. This is for confining the intermediate code within the internal of the identification core. Moreover, the identification controller 880 may include a word line controlling circuit, a bit line controlling circuit and a data buffer.

If an input code {a(i)} is input as an independent input via the external input-output 50, the input-output controller 810 forwards the input code {a(i)} to the scrambler 890. However, the scrambler 890, as shown in FIG. 34, includes at least the random number generator 605 and the code generator 606. Furthermore, it may include a word line controlling circuit, a bit line controlling circuit, and a data buffer.

The intermediate code {f(i)} that the scrambler 890 generates according to the equation (2) is temporarily stored in the buffer 900 for intermediate code and then forwarded to the identification controller 880. However, the {d(i+N)} in the equation (2) is a random number code to be generated by the random number generator 605 and differs from the random number code {d(i)} to be generated by the random number generator 601. In addition, the code generator 606 to generate the intermediate code {f(i)} according to the equation (2) is, in general, unnecessary to be equivalent to the code generator 602. However, in the case that the identification core 10000 is one-chip, as another example, the code generator 602 may take a place of the code generator 606. In this case, the chip area may be saved by the code generator 606.

Similar to FIG. 35, as an example, to generate an intermediate code {f(i)}, the residue operation mod (x,y) may be adopted. This provides the remainder of dividing x by y. FIG. 35 is the chart showing the relation among an input code {a(i)}, a physical random number code {d(i+N)}, and an intermediate code {f(i)} to be output according to the equation (2).

The identification controller 880 has a command of the inner word line controlling circuit, the inner bit line controlling circuit, the inner data buffer and so forth to generate the output code {c(i)} in response to the random number code {d(i)} obtained from the identification device 600 and the intermediate code {f(i)} taken from the buffer 900 for intermediate code according to the equation (3).

Similar to FIG. 36, as an example, to generate an output code {c(i)}, the residue operation mod (x, y) may be adopted. This provides the remainder of dividing x by y. FIG. 36 is the chart showing the relation among an intermediate code {f(i)}, a physical random number code {d(i)}, and an output code {c(i)} to be output according to the equation (3).

This output code {c(i)} is temporarily stored in the inner data buffer of the identification controller 880. The intermediate code {f(i)} and the physical random number codes {d(i)} and {d(i+N)} are confined inside the identification core 10000 and not output to the external.

Furthermore, not illustrated in drawings since it may be self-evident, the identification device 600 may include the scrambler 890 in the present disclosure. The detailed description of that is also self-evident and then may be omitted.

The generated output code {c(i)} serves as private key in the examples of FIG. 28. The output code {c(i)} is input to the key generator 891 to generate the public key. The input-output controller 810 outputs the public key to the external of the identification core 10000 via the external input-output 50. On the other hand, the private key is able to be confined inside the identification core.

Alternatively, if an acquiring code of special mode is input as an independent input via the external input-output 50, the input-output controller 810 forwards the acquiring code of special mode to the scrambler 890. The scrambler 890 has a command of the inner word line controlling circuit, the inner bit line controlling circuits, the inner data buffer and so forth, so as to output the random number code $\{d(i+N)\}$ to be acquired from the scrambler 890 according to the acquiring code of special mode as an intermediate code $\{f(i)\}$. This is temporarily stored in the buffer 900 for intermediate code. In this case, the conversion by the equation (2) is generally not necessary.

The intermediate code $\{f(i)\}$ is forwarded to the identification controller 880 together with the acquiring code of special mode. The identification controller 880 has a command of the inner word line controlling circuit, the inner bit line controlling circuit, the inner data buffer and so forth, so as to generate the output code $\{c(i)\}$ in response to the random number code $\{d(i)\}$ to be acquired from the identification device 600 according to the acquiring code of special mode and the intermediate code $\{f(i)\}$, according to the equation (3). The generated output code $\{c(i)\}$ serves as the private key in the example of FIG. 28.

Alternatively, if an acquiring code of special mode and an input code $\{a(i)\}$ are input as an independent input via the external input-output 50, the input-output controller 810 forwards the acquiring code of special mode and the input code $\{a(i)\}$ to the scrambler 890. The scrambler 890 has a command of the inner word line controlling circuit, the inner bit line controlling circuits, the inner data buffer and so forth, so as to generate the intermediate code $\{f(i)\}$ in response to the random number code $\{d(i+N)\}$ to be acquired from the scrambler 890 according to the acquiring code of special mode and the input code $\{a(i)\}$ according to the equation (2). This is temporarily stored in the buffer 900 for intermediate code.

The intermediate code $\{f(i)\}$ is forwarded to the identification controller 880 together with the acquiring code of special mode. The identification controller 880 has a command of the inner word line controlling circuit, the inner bit line controlling circuit, the inner data buffer and so forth; so as to generate the output code $\{c(i)\}$ in response to the random number code $\{d(i)\}$ to be acquired from the identification device 600 according to the acquiring code of special mode and the intermediate code $\{f(i)\}$, according to the equation (3). The generated output code $\{c(i)\}$ serves as the private key in the example of FIG. 28.

Anyway, the private key generated like this is input to the key generator 891 so as to generate the public key.

Figure 39:
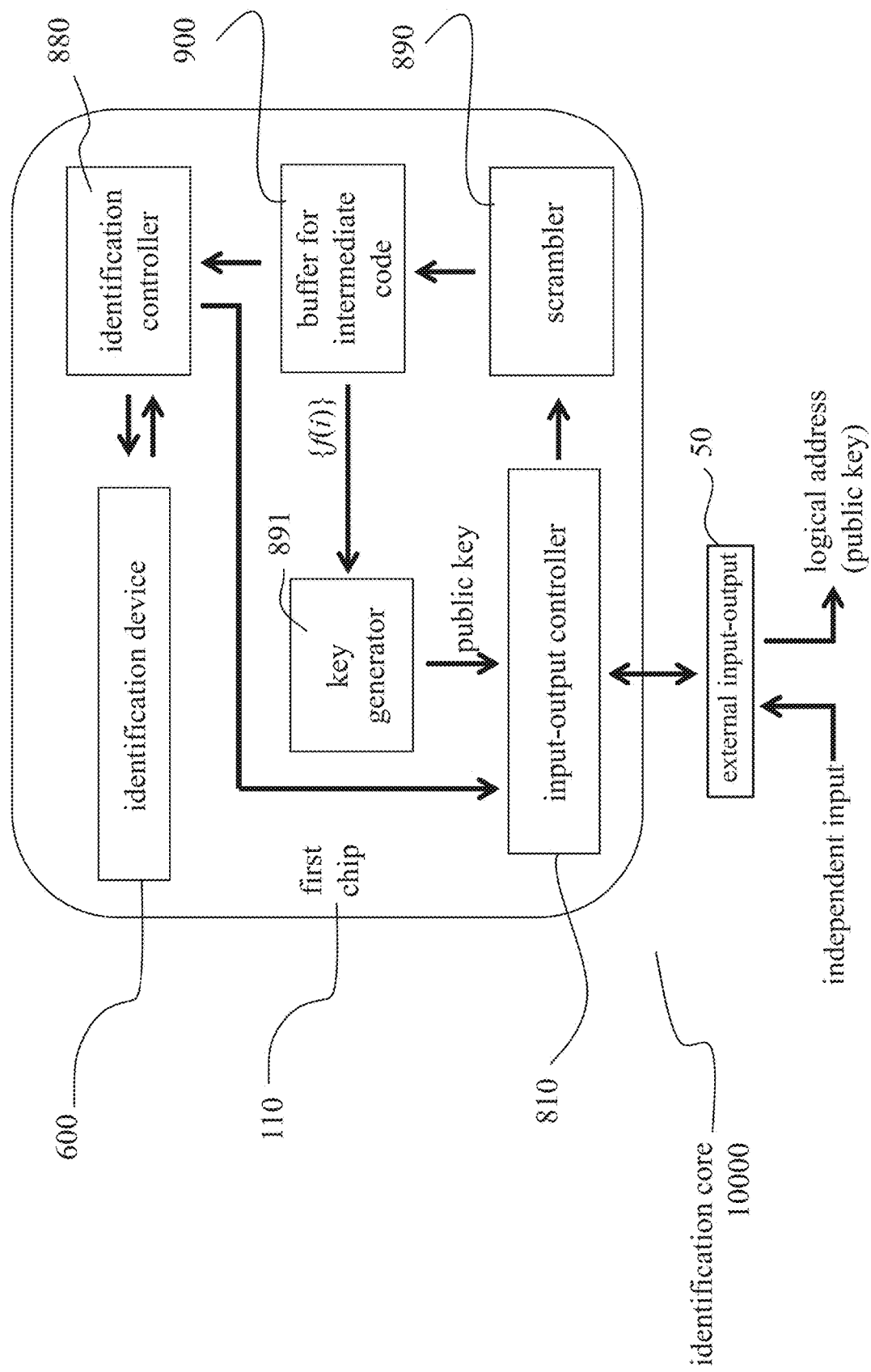
FIG. 39 shows an example of configurations of an identification core.

Alternatively, as shown in FIG. 39, the intermediate code $\{f(i)\}$ is input to the key generator as the private key of FIG. 28 so as to generate the public key.

The input-output controller 810 outputs the public key generated like this to the external of the identification core 10000. On the other hand, the private key may be confined in the identification core 10000.

Seventh Embodiment

Figure 40:
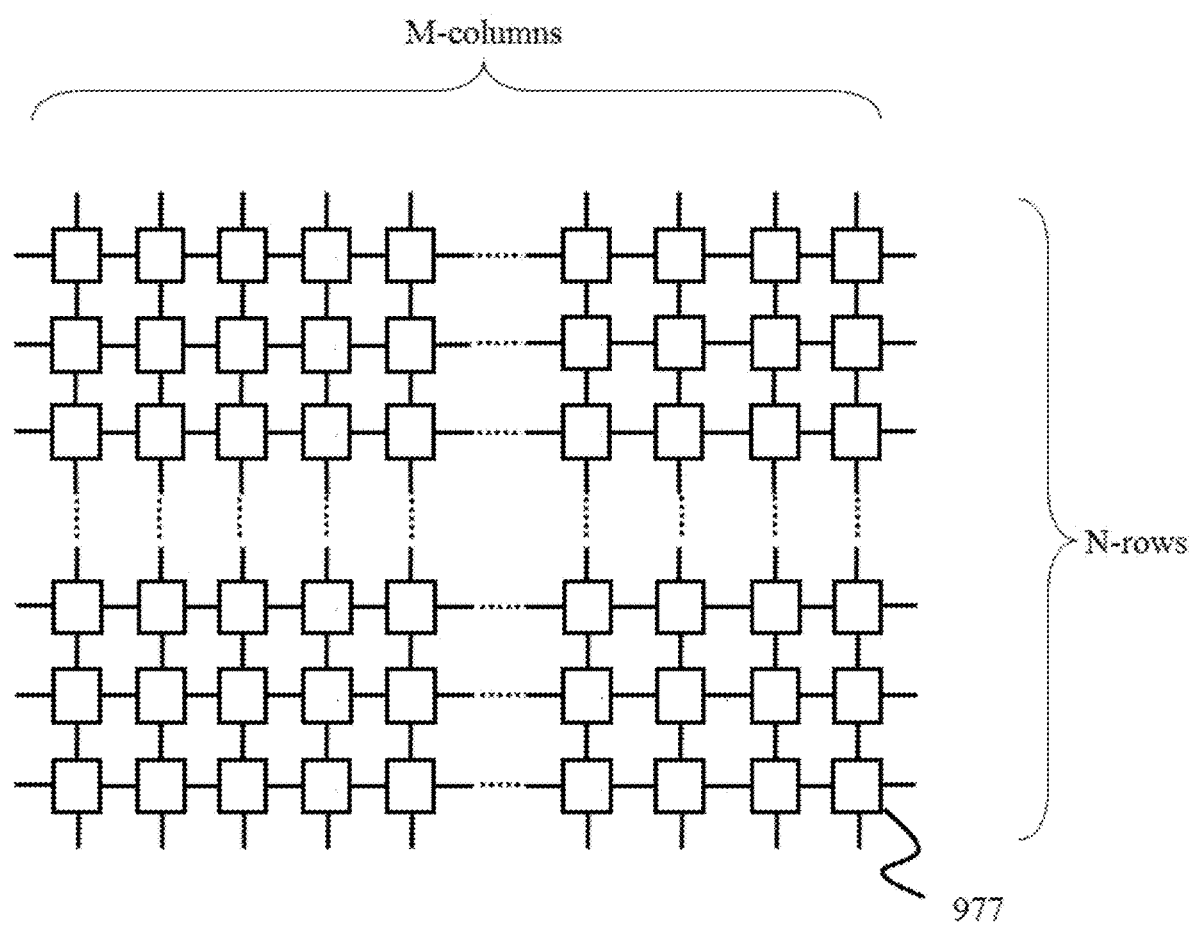
FIG. 40 shows an example of the cell array of an identification core.

FIG. 40 is a drawing of the whole or a part of the cell array for identification device, which configures identification device. The identification cells 977 are distributed at cross-points, at which the row number is N and the column number is M in this example. In general, L and M are natural numbers. In the case of memory chip, a batch of bit lines is arrayed along the row direction and a batch of word lines is arrayed along the column direction. Alternatively, on the contrary, a batch of word lines is arrayed along the row direction and a batch of bit lines is arrayed along the column direction.

Figure 41:
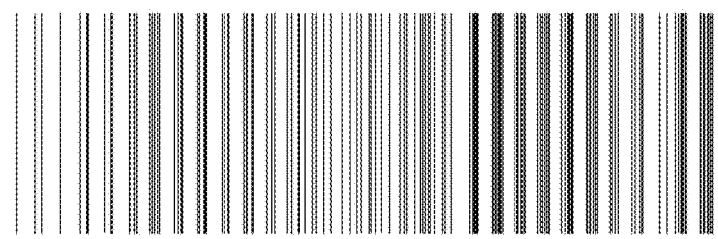
FIG. 41 shows an example of a barcode type random number code.

In response to certain physical properties related to a group of identification cells which line up on identical lines along the row direction (bit lines or word lines), a white or black horizontal line may be allocated to every row number of the corresponding lines. Thus, as shown in FIG. 41, a pattern like barcode is obtained. In the case that the allocation of white and black is determined physically random, this barcode pattern is physically random. Here, if the row number is $\{i\}$ (where i is a natural number), the barcode pattern corresponds to the physical random number code $\{d(i)\}$. The physical random number code $\{d(i)\}$ corresponds to the barcode of FIG. 31.

Figure 42:
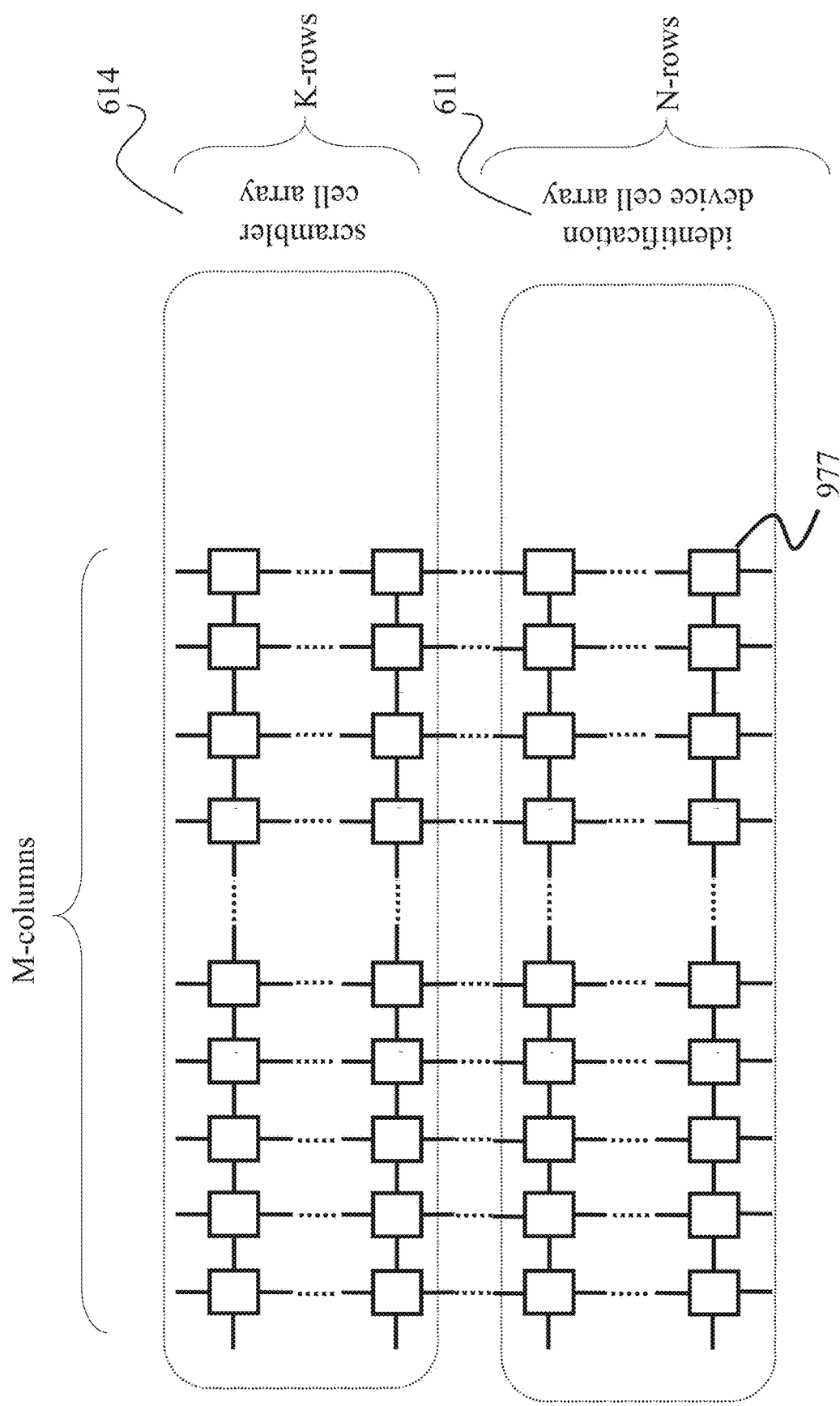
FIG. 42 shows an example of a distribution of the cell array for an identification device and the cell array for a scrambler.

In the case that the scrambler 890 is used together with the identification device 600, as shown in FIGS. 38 and 39, the scrambler cell array is necessary as well as the cell array for identification device of FIG. 40. FIG. 42 is a drawing showing an example of the layout of N-rows and M-columns identification device cell array 611 and K-rows and M-columns scrambler cell array 614. Here, the identification cells 977 are distributed in checker board pattern across the identification device cell array 611 and the scrambler cell array 614.

Figure 43:
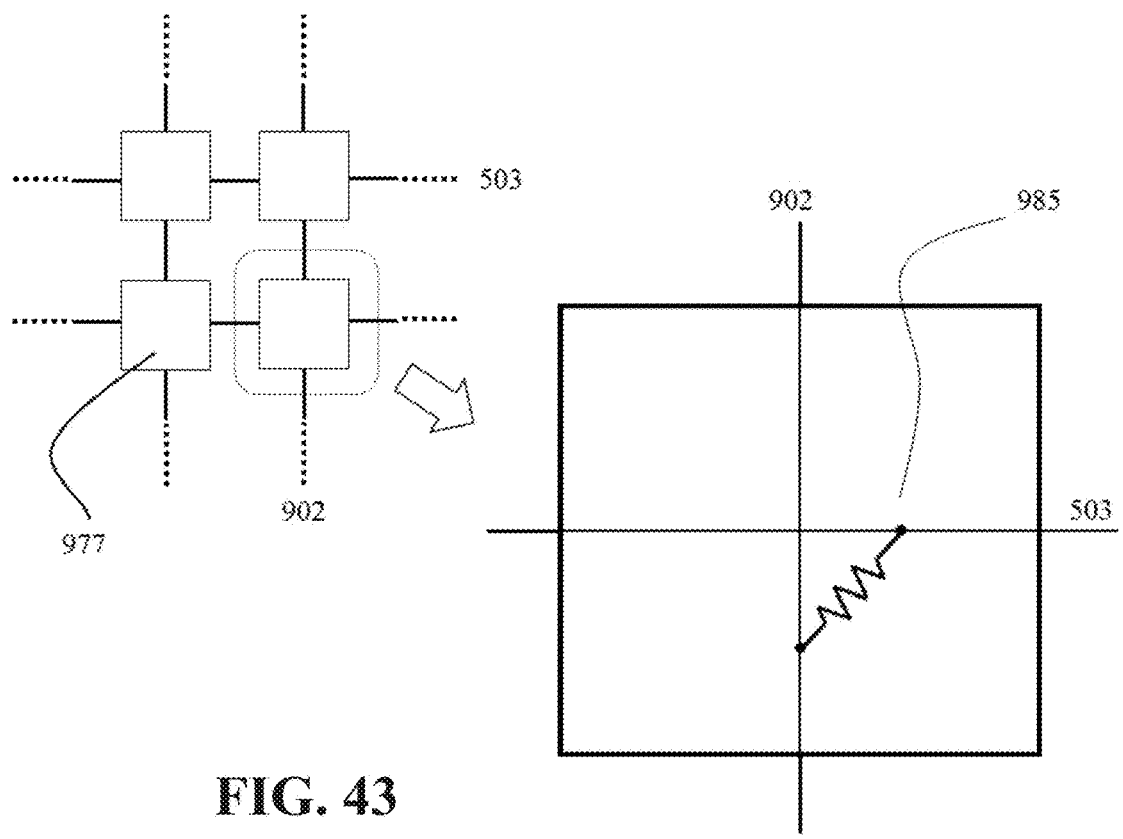
FIG. 43 shows an example in which an identification device is a resistor.

FIG. 43 is a drawing showing an example of the identification cell 977. A resistor 985 is distributed at the cross-point of word line 503 and bit line 902. In general, a resistor rarely becomes short if a high field is applied thereto and then electric current cannot flow therethrough. Such kind of short happens probabilistically. Then, it may be a fail bit as the identification cell.

Figure 44:
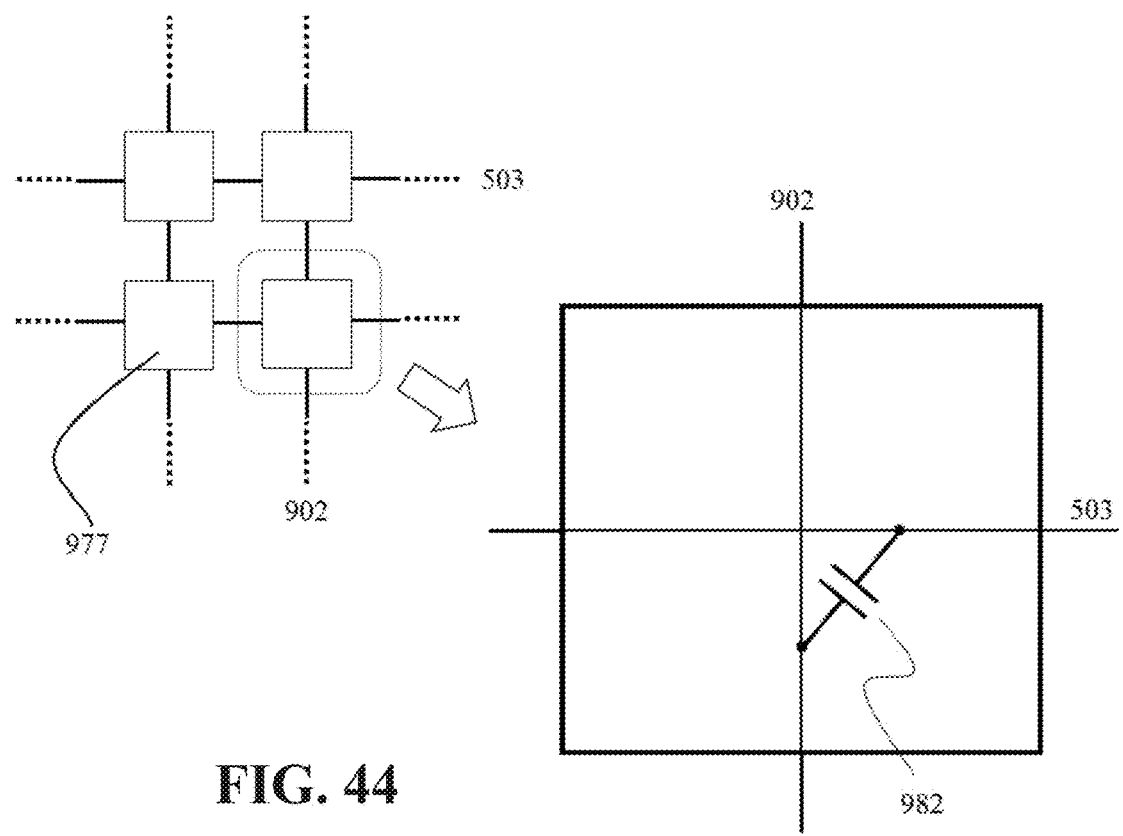
FIG. 44 shows an example in which an identification device is a capacitor.

If the resistor 985 of the identification cell 977 in FIG. 43 is replaced with a capacitor 982, FIG. 44 is obtained. In general, a capacitor rarely leads to dielectric breakdown if a high field is applied thereto and then DC electric current can flow therethrough. Such a dielectric breakdown happens probabilistically. Then, it may be a fail bit as the identification cell 977.

Figure 45:
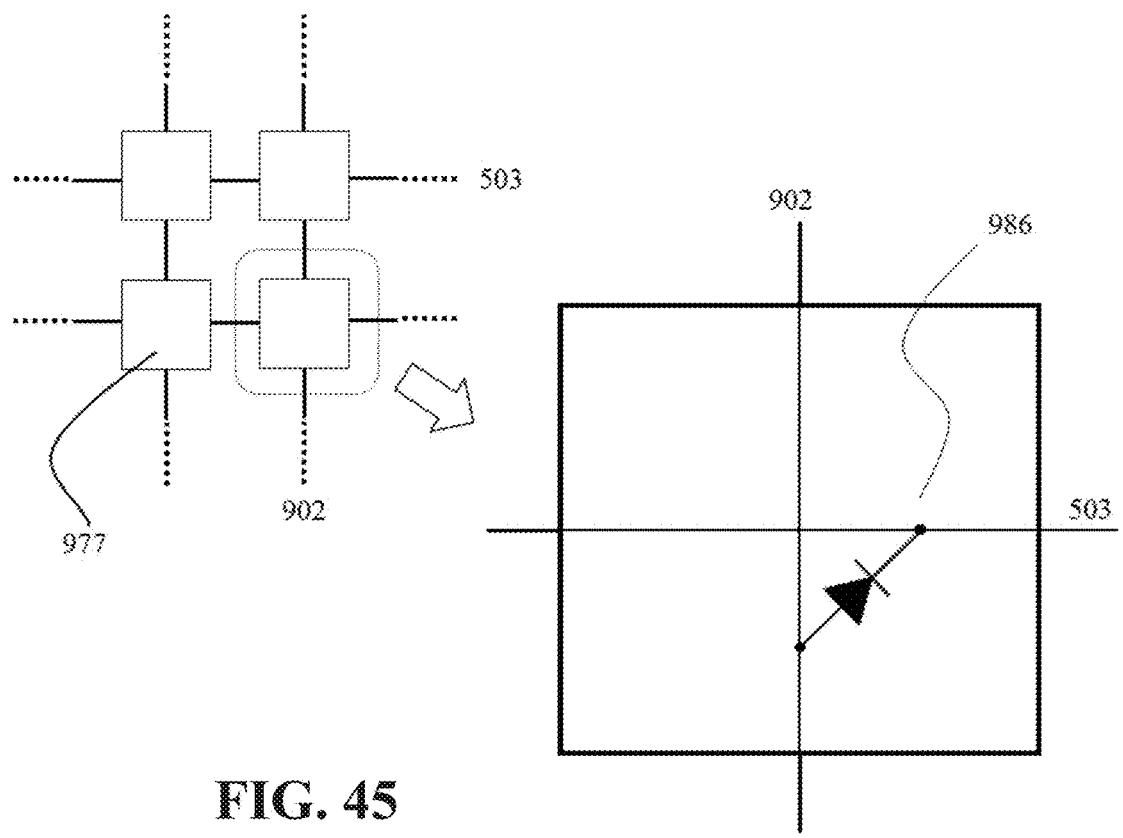
FIG. 45 shows an example in which an identification device is a PN junction.

If the resistor 985 of the identification cell 977 in FIG. 43 is replaced with a PN junction 986, FIG. 45 is obtained. In general, a PN junction rarely leads to junction breakdown if a high field is applied thereto and then reverse electric current can flow therethrough when reverse bias is applied thereto. Such a junction breakdown happens probabilistically. Then, it may be a fail bit as the identification cell 977.

Figure 46:
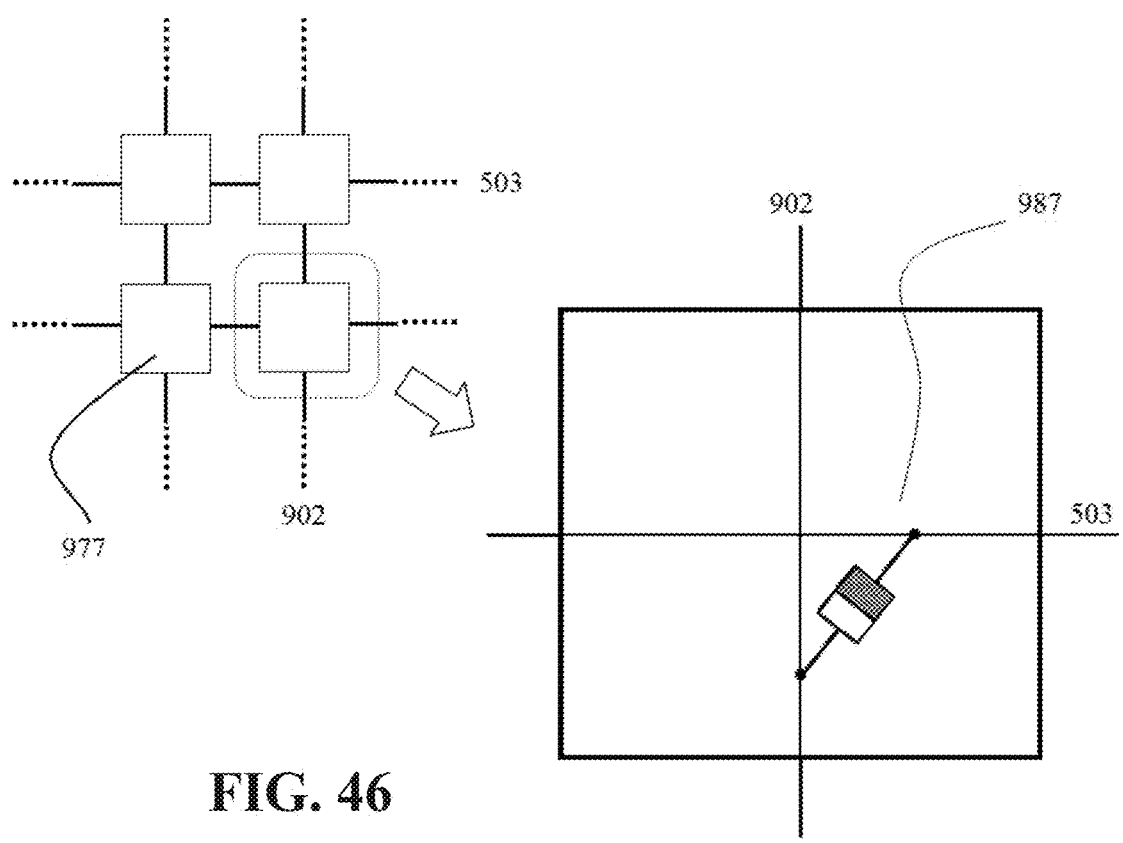
FIG. 46 shows an example in which an identification device is a Schottky junction

If the resistor 985 of the identification cell 977 in FIG. 43 is replaced with a Schottky junction 987, FIG. 46 is obtained. In general, a Schottky junction rarely leads to junction breakdown if a high field is applied thereto and then the rectification is lost. Such a junction breakdown happens probabilistically. Then, it may be a fail bit as the identification cell 977.

Figure 47:
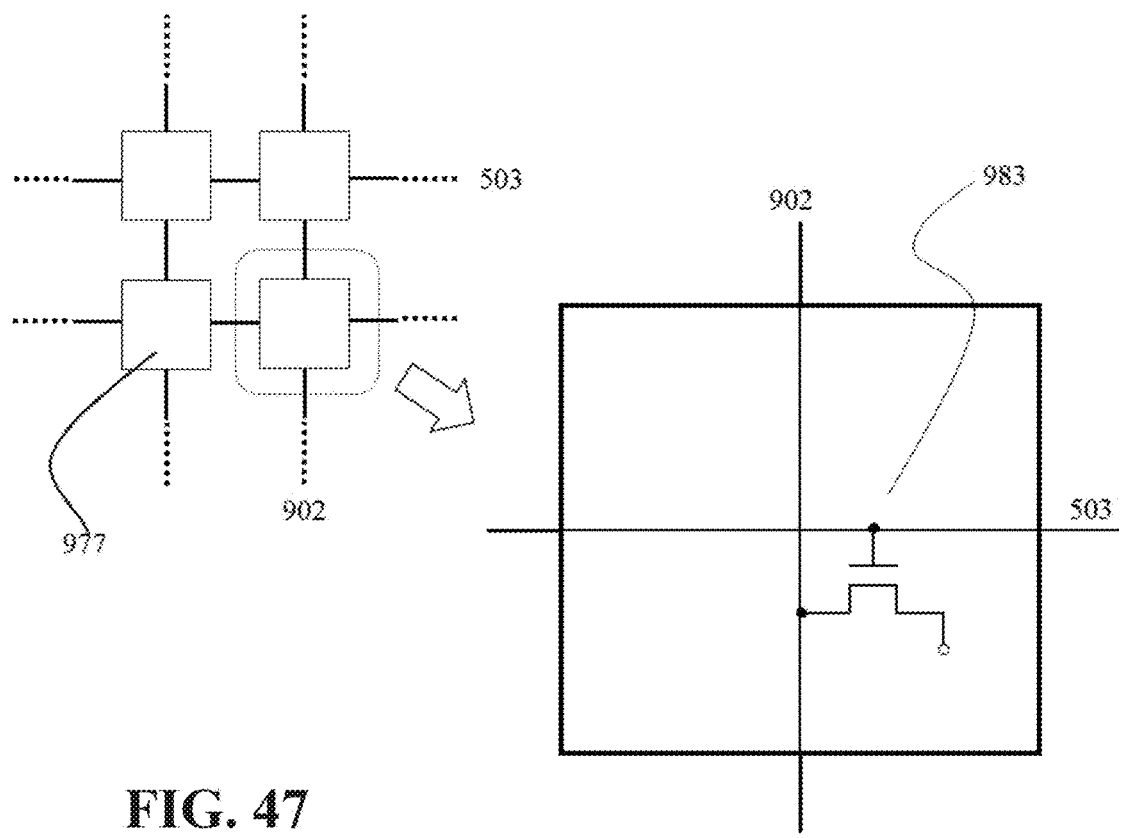
FIG. 47 shows an example in which an identification device is a transistor.

If the resistor 985 of the identification cell 977 in FIG. 43 is replaced with a transistor 983, FIG. 47 is obtained. In general, a gate insulating film rarely leads to dielectric breakdown if a high field is applied thereto and then electric current can flow therethrough. Such a dielectric breakdown happens probabilistically and then a transistor with dielectric breakdown is a fail. Alternatively, if a reverse high electric field is applied to source or drain edge of the gate, the PN junction rarely leads to junction breakdown there and then this transistor cannot be turned off. Otherwise, the threshold voltage is rarely out of range due to some other kind of reason. This is also regarded as fail. Anyway, such a transistor may be a fail bit as the identification cell 977.

The examples from FIGS. 43 to 47 are memory cells of mask-type read only memory (MASK-ROM or MROM). In the case that memory cells are distributed in checker board pattern as those examples, the cell array is called NOR-type. The property of NOR-type cell array is that every memory cell has bit line contact and word line contact. Accordingly, those examples are NOR-MROM or MROM.

Figure 48:
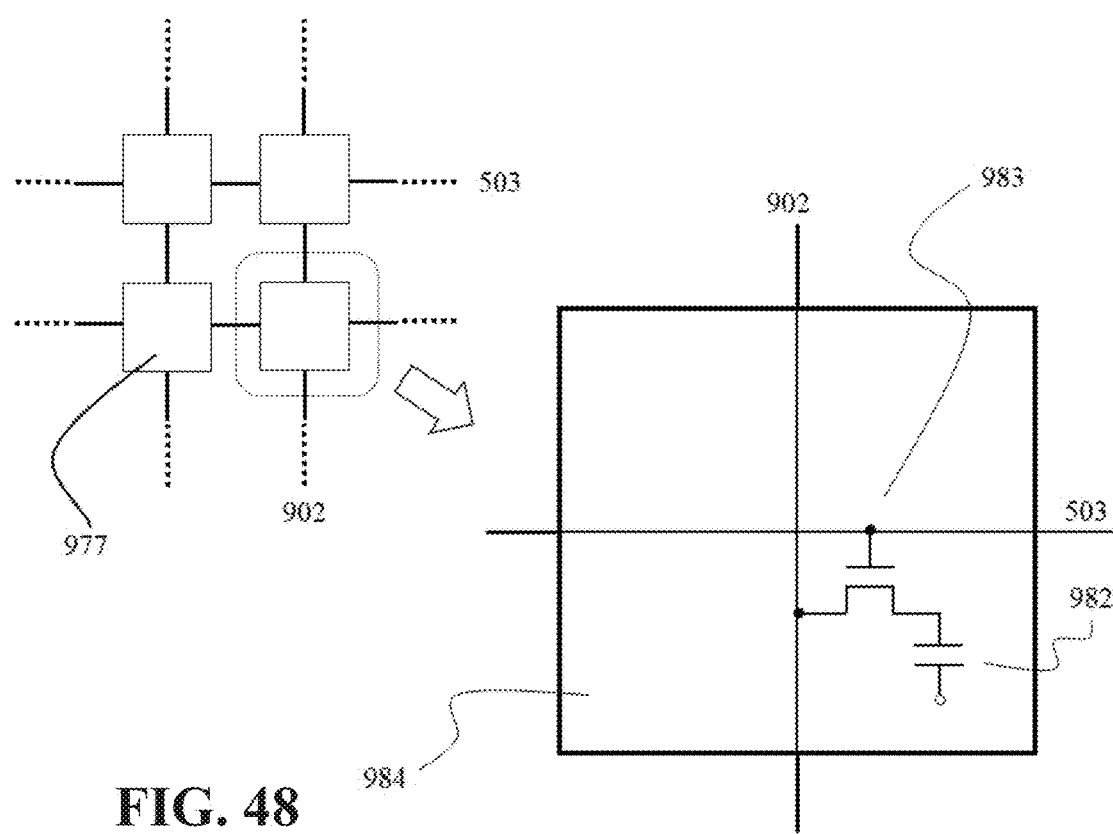
FIG. 48 shows an example in which an identification device is a DRAM cell.

If the resistor 985 of the identification cell 977 in FIG. 43 is replaced with Dynamic Random Access Memory (DRAM) cell 984 including transistor 983 and capacitor 982, FIG. 48 is obtained. In general, a gate insulating film of the transistor rarely leads to dielectric breakdown if a high field is applied thereto and then electric current can flow therethrough. Such a dielectric breakdown happens probabilistically and then a transistor with dielectric breakdown is a fail. Alternatively, if a reverse high electric field is applied to source or drain edge of the gate, the PN junction rarely leads to junction breakdown there and then the transistor cannot be turned off. Otherwise, the threshold voltage is rarely out of range due to some other kind of reason. This is also regarded as fail. Otherwise, if a high voltage is applied to the capacitor, it rarely leads to dielectric breakdown and the direct current can flow therethrough. Such a dielectric breakdown happens probabilistically and then it may be a fail as the capacitor. If either the transistor or the capacitor leads to a fail, the DRAM cell cannot work normally. Then, the corresponding memory cell may be a fail bit as the identification cell 977.

Figure 49:
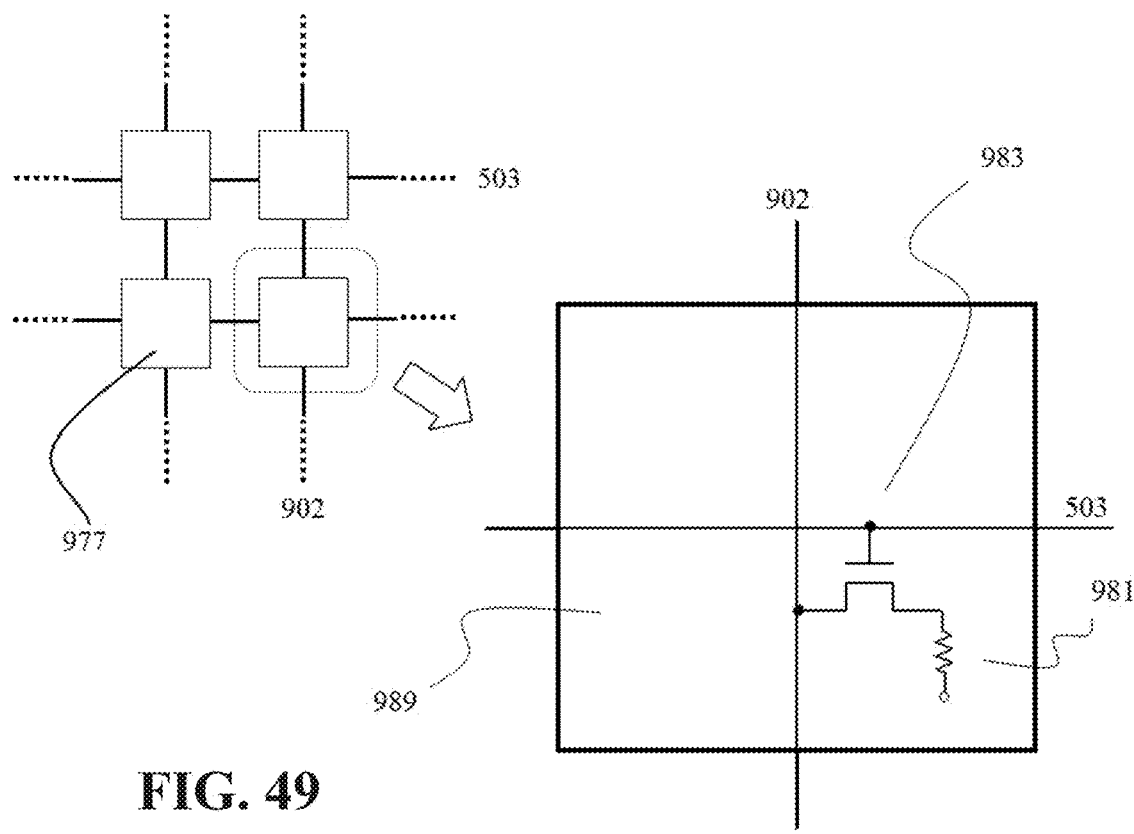
FIG. 49 shows an example in which an identification device is a transistor with resistive changeable (Re) RAM or phase change (PC) RAM.

If a capacitor 982 of DRAM cell 984 adopted as the identification cell 977 in FIG. 48 is replaced with a variable resistor 981, a variable resistive memory cell 989 is obtained as shown in FIG. 49. In the case that the resistivity of the variable resistor 981 is tunable with voltage application, the cell is a resistive change memory (ReRAM). In the case that the resistivity is tunable with heating, this cell is a phase change memory (PCRAM). Anyway, a gate insulating film of the transistor rarely leads to dielectric breakdown if a high field is applied thereto and then electric current can flow therethrough. Such a dielectric breakdown happens probabilistically and then a transistor with dielectric breakdown is a fail. Alternatively, if reverse high electric field is applied to source or drain edge of gate, the PN junction rarely leads to junction breakdown there and then this transistor cannot be turned off. Otherwise, the threshold voltage is rarely out of range due to some other kind of reason. This is also regarded as fail. Otherwise, if the high voltage is applied to the variable resistor, it rarely leads to short and then electric current cannot flow therethrough. Such a disconnection happens probabilistically and then it may be a fail as the variable resistor. Anyway, the corresponding memory cell is a fail bit as the identification cell 977.

Figure 50:
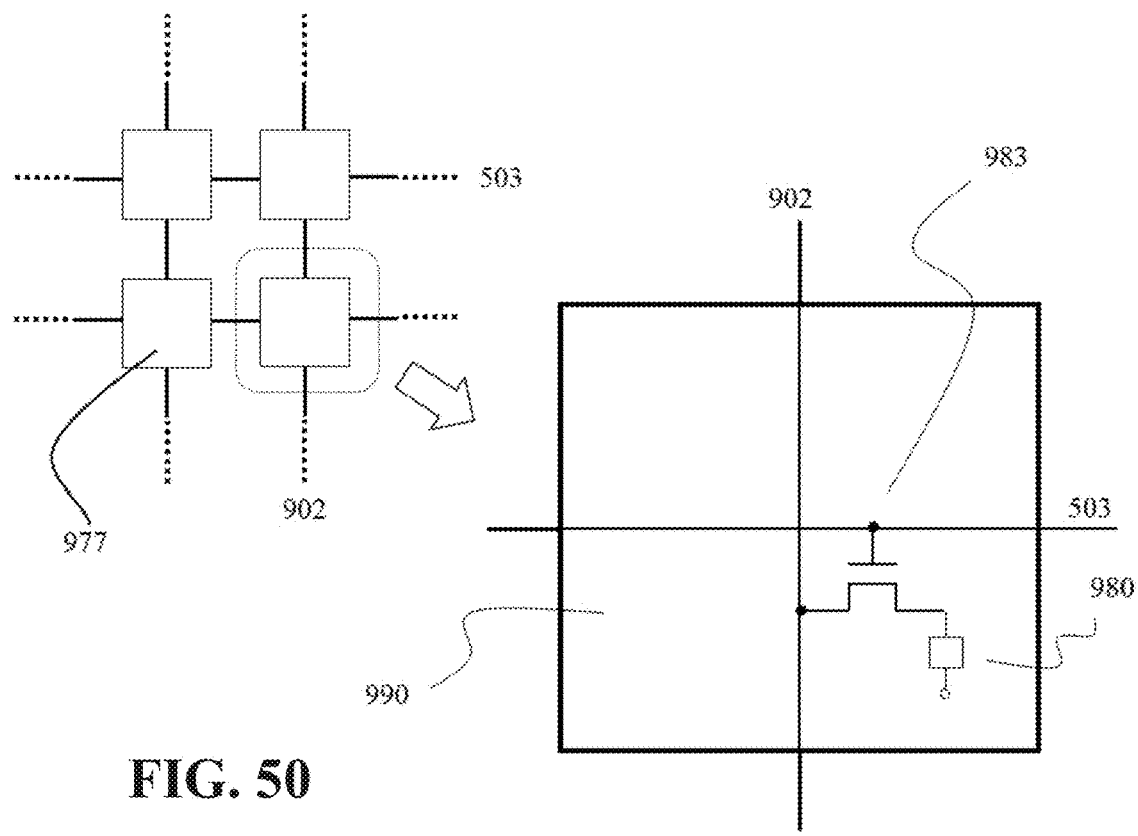
FIG. 50 shows an example in which an identification device is a magnetic resistive RAM.

If a capacitor 982 of DRAM cell 984 adopted as identification cell 977 in FIG. 48 is replaced with a magnetic resistor 980, a magnetic resistive memory cell 990 is obtained as shown in FIG. 50. In the case that the magnetic resistor is a giant magnetic resistive film, the cell is a magnetic resistive memory (MRAM). In the case that this magnetic resistor is a spin-torque transfer (STT) film, this cell is a STT-type magnetic resistive memory (STT-MRAM). Anyway, a gate insulating film of the transistor in the memory cell rarely leads to dielectric breakdown if a high field is applied thereto and then electric current can flow therethrough. Such a dielectric breakdown happens probabilistically and then a transistor with dielectric breakdown is a fail. Alternatively, if a reverse high electric field is applied to source or drain edge of the gate, the PN junction rarely leads to junction breakdown there and then this transistor cannot be turned off. Or, threshold voltage is rarely out of range due to some other kind of reason. This is also regarded as fail. Otherwise, if the high voltage is applied to the magnetic resistor, it rarely leads to short and then electric current cannot flow therethrough. Such a disconnection happens probabilistically and then it may be a fail as the magnetic resistor. Anyway, the corresponding memory cell is a fail bit as the identification cell 977.

Figure 51:
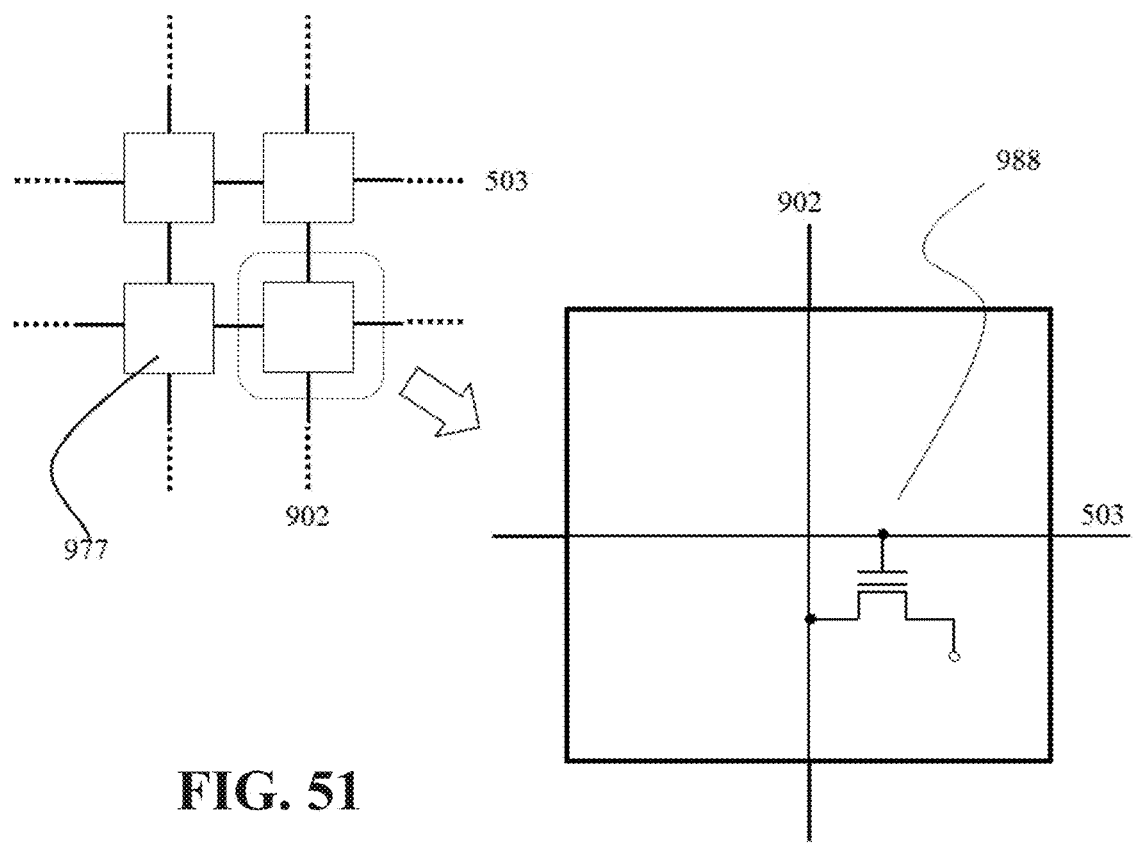
FIG. 51 shows an example in which an identification device is a floating gate transistor (NOR Flash).

If a transistor 983 adopted as identification cell 977 in FIG. 47 is replaced with a floating gate transistor 988, a NOR Flash memory cell is obtained as shown in FIG. 51. In general, if a high voltage is applied to a tunnel film of the floating gate transistor, the dielectric breakdown rarely happens and then electric current can flow therethrough. Such a dielectric breakdown happens probabilistically and then the floating gate transistor with dielectric breakdown may be a fail. Alternatively, if a reverse high electric field is applied to source or drain edge of the gate, the PN junction rarely leads to junction breakdown there and then the floating gate transistor cannot be turned off. Otherwise, the threshold voltage is rarely out of range due to some other kind of reason. This is also regarded as fail. Anyway, the corresponding memory cell is a fail bit as the identification cell 977.

In the examples from FIGS. 48 to 51, the cell array is NOR-type since there are a bit line contact and a word line contact in every memory cell.

Figure 52:
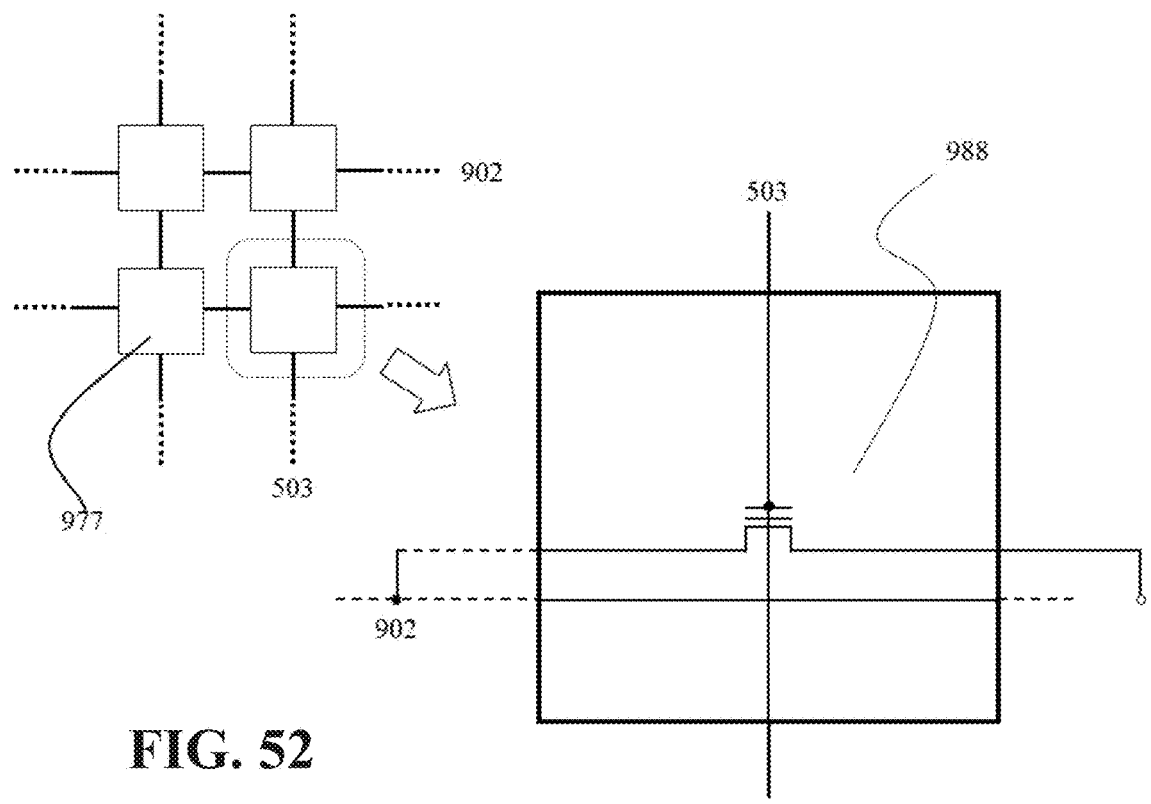
FIG. 52 shows an example of a NAND-type array in which identification device is a floating gate transistor (NAND Flash).

If the word lines 503 and the bit lines 902 are exchanged and then the bit line contact is removed from every identification cell 977 in FIG. 51, FIG. 52 is obtained. Similarly, the cell array in which the bit line contact is removed from every memory cell is called NAND-type cell array. This leads to floating gate transistors distributed in NAND-type cell array and then is called NAND Flash. In general, if a high voltage is applied to the tunnel film of the floating gate transistor, the dielectric breakdown rarely happens and then electric current can flow therethrough. Such a dielectric breakdown happens probabilistically and then the floating gate transistor with dielectric breakdown may be a fail. Alternatively, if a reverse high electric field is applied to source or drain edge of the gate, the PN junction rarely leads to junction breakdown there and then this transistor cannot be turned off. Otherwise, the threshold voltage is rarely out of range due to some other kind of reason. This is also regarded as fail. Anyway, the corresponding memory cell is a fail bit as the identification cell 977.

Figure 53:
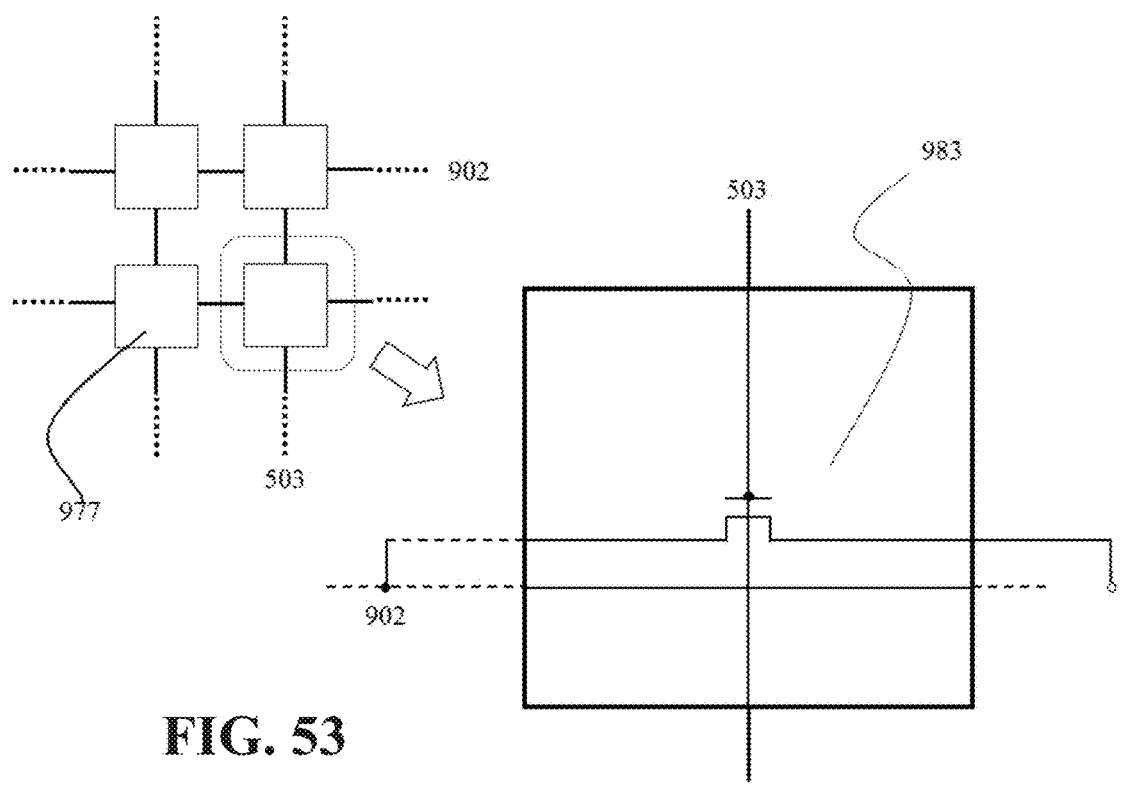
FIG. 53 shows an example of a NAND-type array in which identification device is a transistor (NAND-MROM).

If the floating gate transistor 988 adopted as the identification cell 977 in FIG. 52 is replaced with the transistor 983, FIG. 53 is obtained. This leads to transistors distributed in NAND-type cell array and then is called NAND-MROM. As mentioned above, MROM is an abbreviation of MASK-type read only memory. The memory cell may be anything to be manufactured by normal semiconductor fabrication process with MASK such as resistor, PN junction, transistor and so forth. In this example, the transistors 983 are distributed on NAND-type cell array arbitrarily. Without surpassing the concept of the present disclosure, the transistor 983 may be replaced with the resistor 985, the capacitor 982, the PN junction 986, the Schottky junction 987 and so forth to configure NAND-MROM. Furthermore, if a high voltage is applied, as mentioned above, a part or the whole of identification cell 977 is rarely broken.

Alternatively, even though the identification 977 adopts resistor, capacitor, PN junction, Schottky junction, transistor, floating gate transistor, DRAM cell, ReRAM cell, PCRAM cell, MRAM cell, STT-MRAM cell or any other memory cell, some identification cells may lead to fail due to unknown factor or reason in manufacturing process.

Anyway, by assigning black to rows including fail identification cells and white to the others, physical random number code is generated as shown in FIGS. 31 and 41. The physical random number code may be output from the random number generators 601 and 605 in the identification device 600 and the scrambler 890, respectively.

Eighth Embodiment

In the case that memory cells of memory products manufactured are adopted as the identification cells 977, it may be able to supply cheap identification devices in large quantities. Among all sorts of the identification cells from FIGS. 43 to 53, the cells of MROM in FIG. 47, DRAM in FIG. 48, NOR Flash in FIG. 51 and NAND Flash in FIG. 52 are the best-sellers. In particular, DRAM is an indispensable semiconductor memory device to operate CPU. Accordingly, like FIGS. 54 to 56, it may be bonded together with CPU to configure the identification core 10000.

Figure 54:
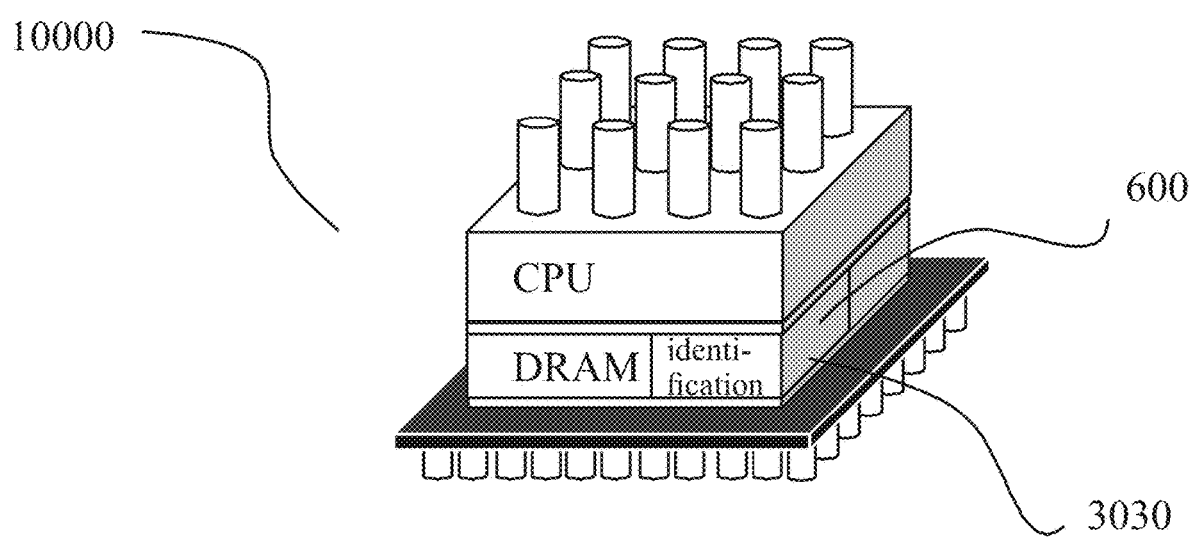
FIG. 54 shows an example of identification core in which a DRAM embedded type identification device and CPU are stacked together.

FIG. 54 shows an example in which a CPU chip is bonded and mounted together with a DRAM chip equipped with the identification device 600 and a set of identification controlling modules 3030 to configure the identification core 10000.

Figure 55:
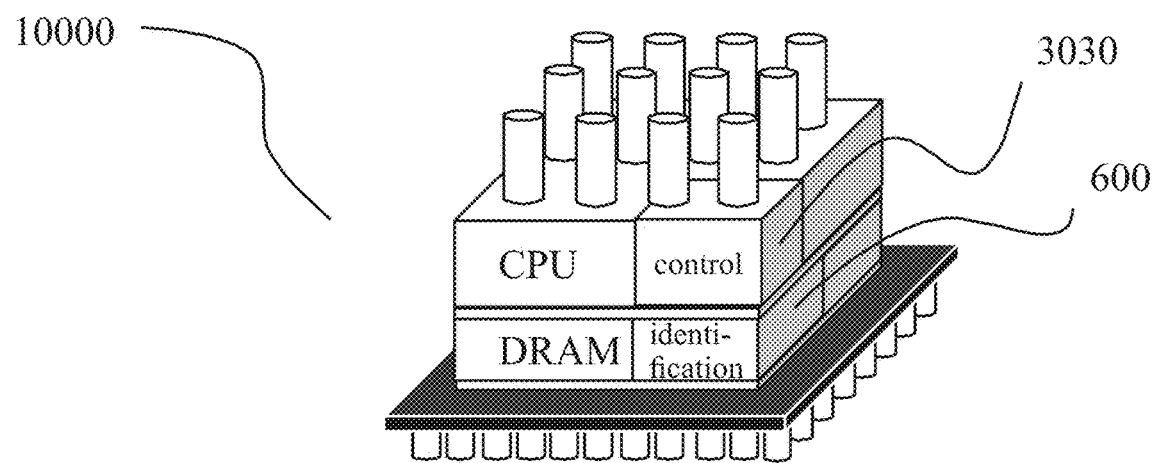
FIG. 55 shows an example of identification core in which a DRAM embedded type identification device and CPU are stacked together.

FIG. 55 shows an example in which a DRAM chip equipped with the identification device 600 and a CPU chip equipped with a set of identification controlling modules 3030 are bonded and mounted together to configure the identification core 10000.

Figure 56:
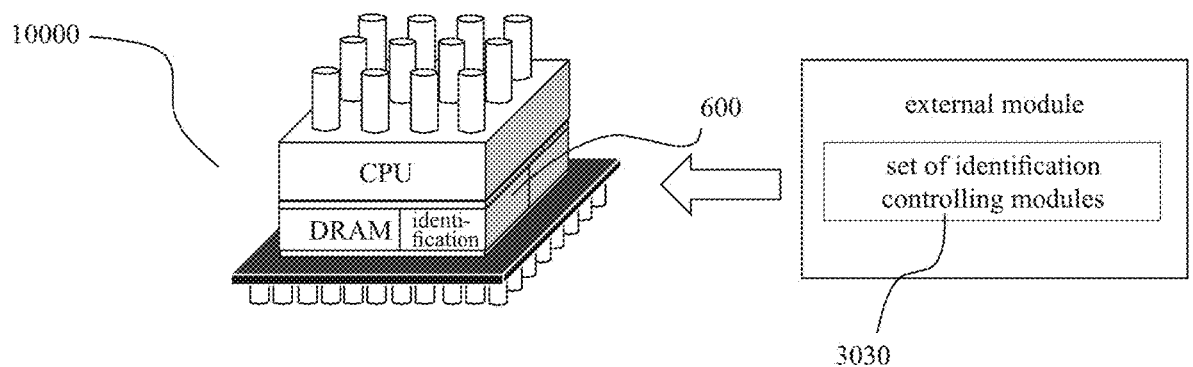
FIG. 56 shows an example of identification core in which a DRAM embedded type identification device and CPU are stacked together.

FIG. 56 shows an example in which a DRAM chip equipped with the identification device 600 and a CPU chip are bonded and mounted together and then they are linked to an external module including a set of identification controlling modules 3030, so as to configure the identification core 10000.

In FIGS. 54 to 56, a set of identification controlling modules 3030 may be a general term for a batch of various devices used together with the identification devices, as shown in FIGS. 30, 31, 33, 34, 37, 38, 39 and so forth. It may be preferred that the contents are optimized according to the embodiments.

The examples of FIGS. 54 to 56 exactly realize the One-CPU-One-Vote. However, it may merely be a part of what is related to the present embodiment. Without surpassing the concept having been illustrated with FIGS. 54 to 56, more various configurations may be possible.

Ninth Embodiment

Figure 57:
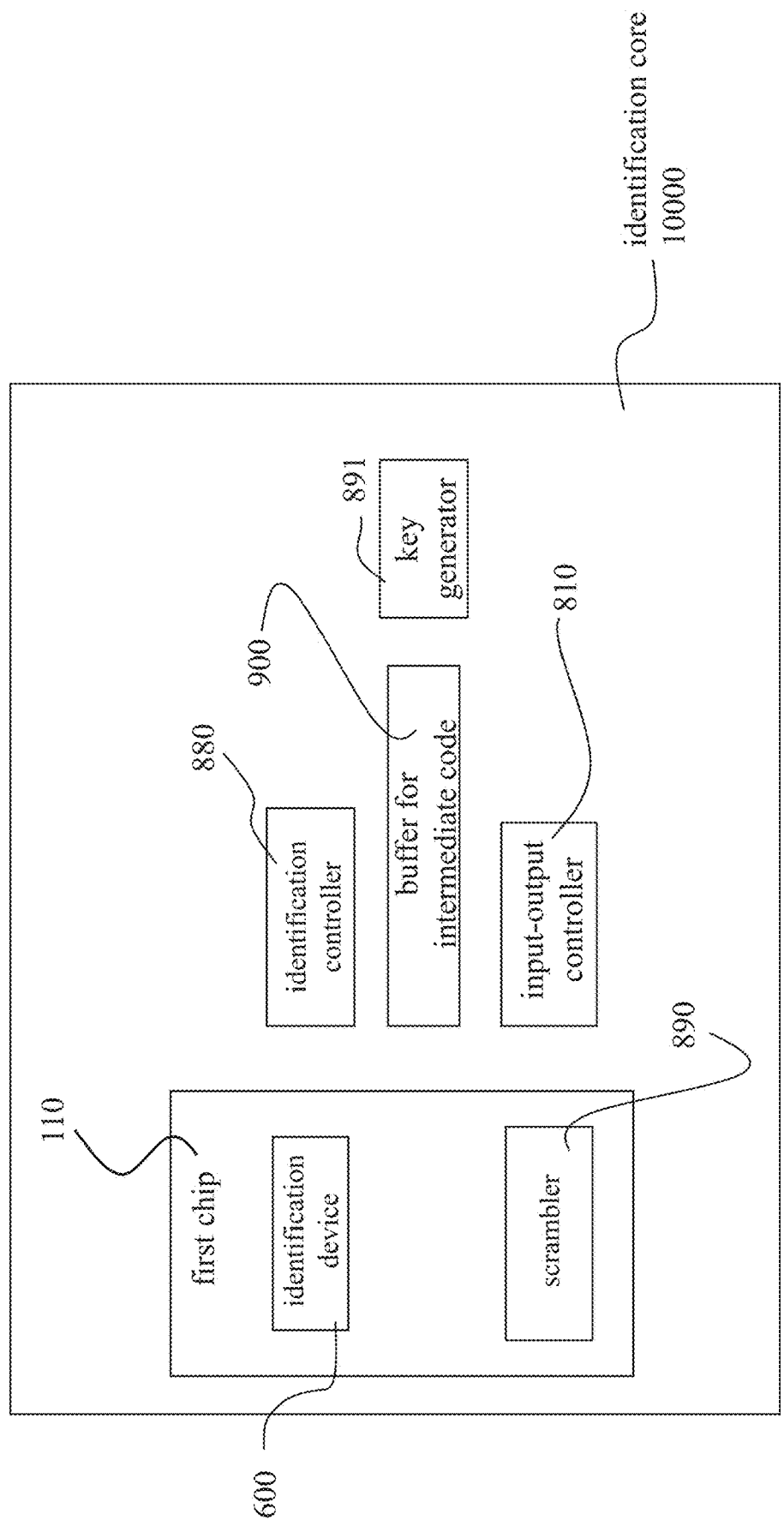
FIG. 57 shows an example of configurations of an identification core including an identification device and key generator.

As shown in FIG. 57, it may be able to integrate the identification device 600 and the scrambler 890 on an identical chip (the first chip 110 for example). It may also be possible to equip other devices, such as the identification controller 880, the buffer 900 for intermediate code, the input-output controller 810, the key generator 891 and so forth into the first chip 110, and also possible to equip them into different electric apparatuses and so forth, which configures the identification core 10000, other than the first chip 110.

Figure 58:
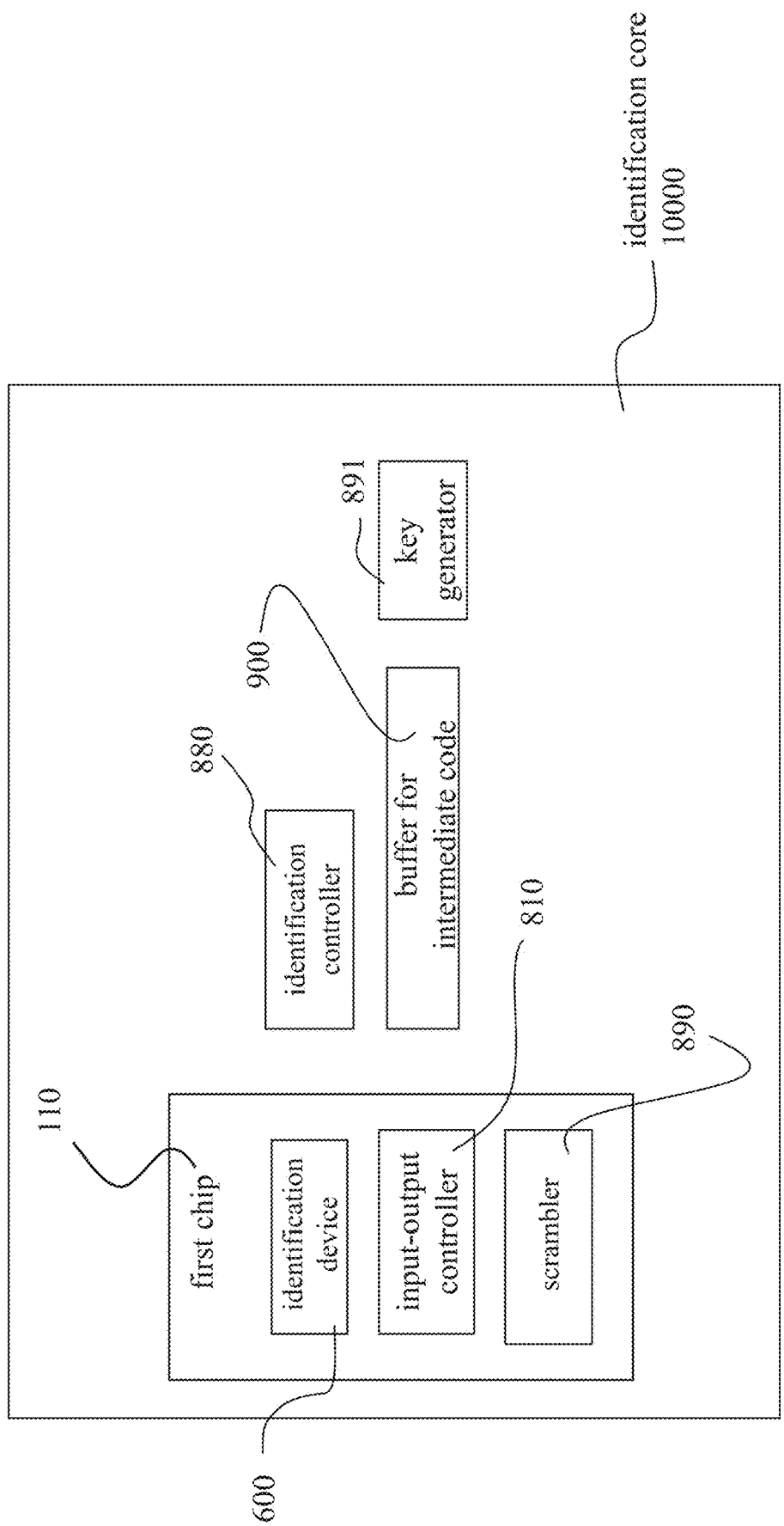
FIG. 58 shows an example of configurations of an identification core including an identification device and key generator.

FIG. 58 shows an example in which the input-output controller 810 is also equipped into the first chip 110.

Figure 59:
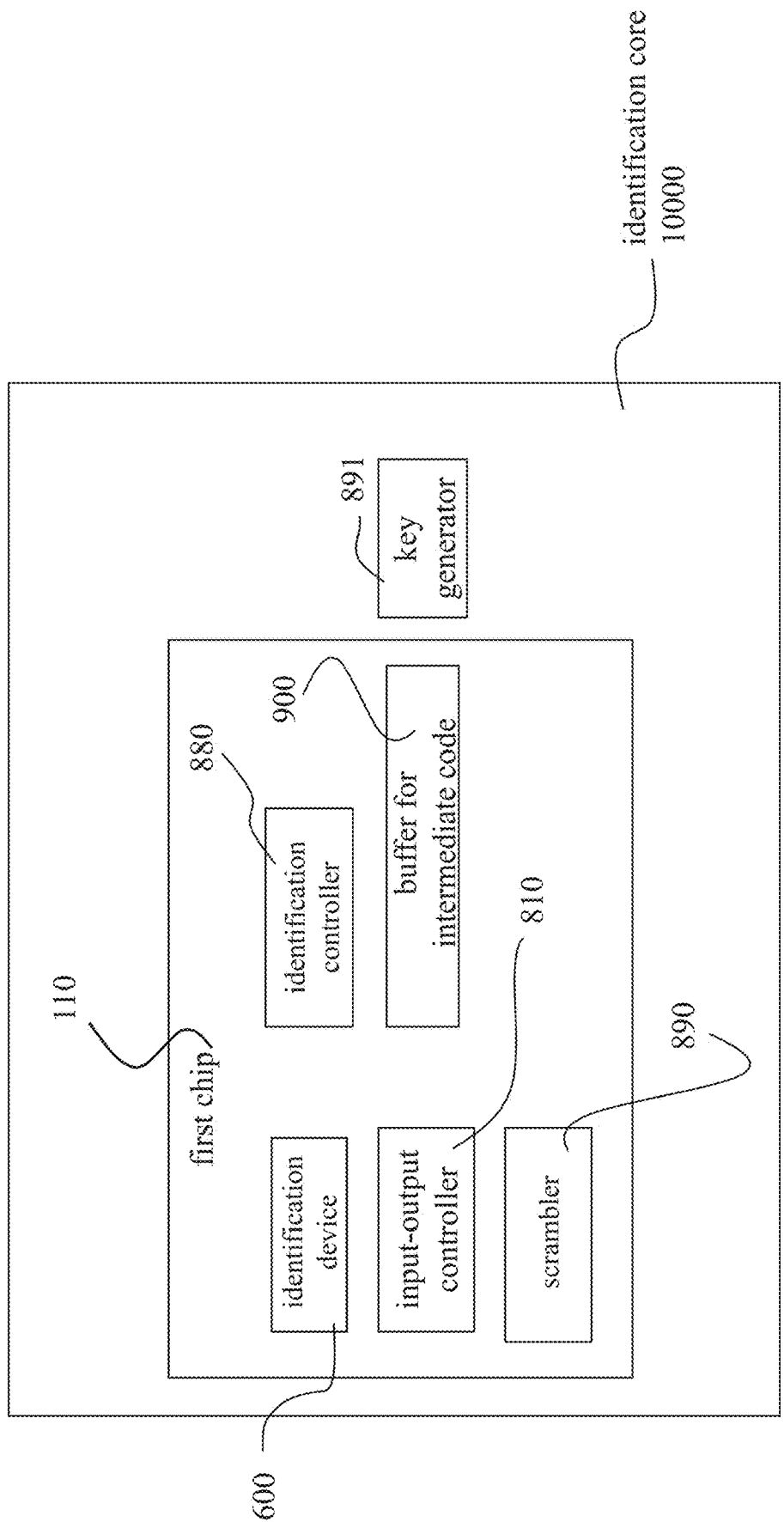
FIG. 59 shows an example of configurations of an identification core including an identification device and key generator.

FIG. 59 shows an example in which the identification controller 880 and the buffer 900 for intermediate code are also equipped into the first chip 110.

Figure 60:
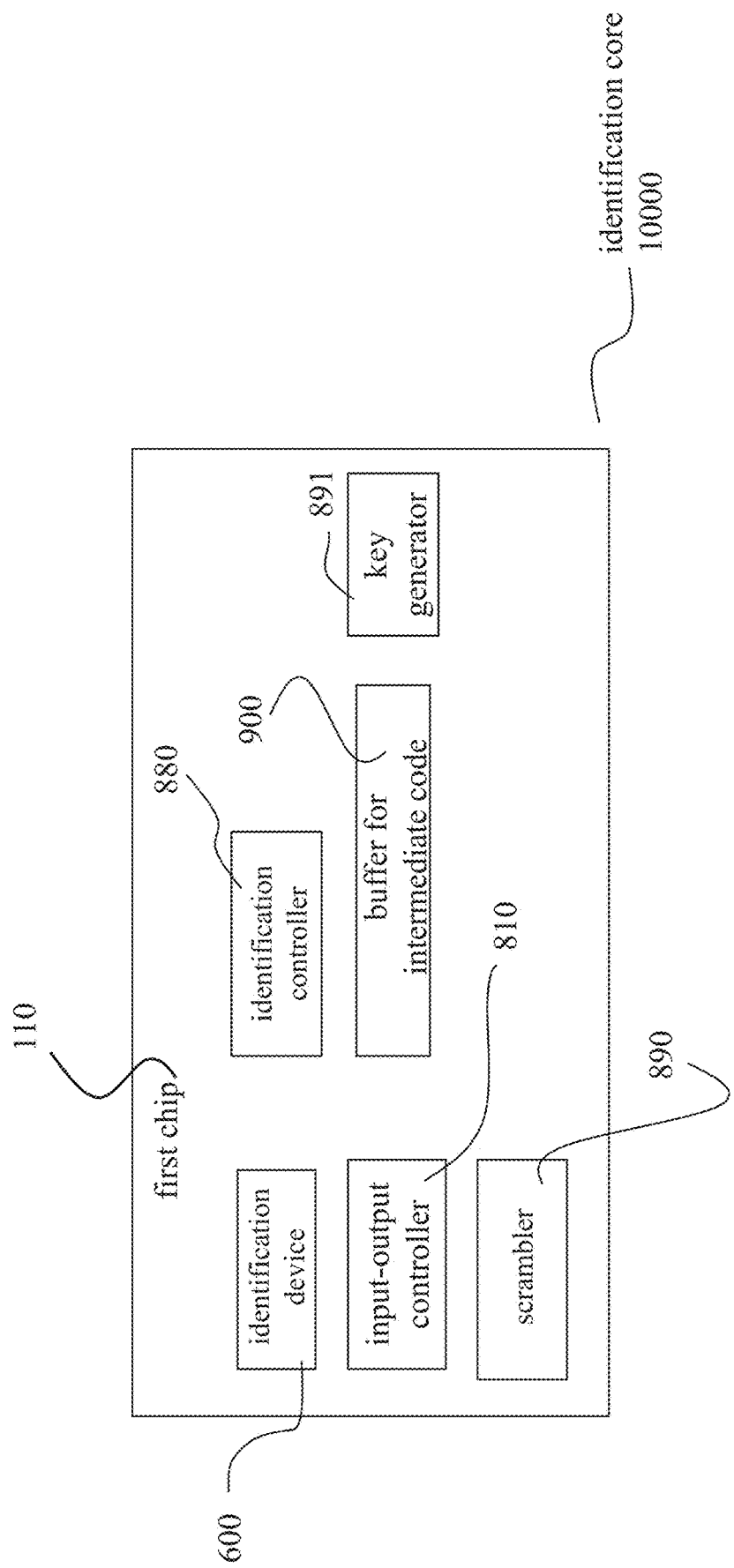
FIG. 60 shows an example of configurations of an identification core including an identification device and key generator.

FIG. 60 shows an example in which the key generator 891 is also equipped into the first chip 110. That is, it is one-chip identification core.

Figure 61:
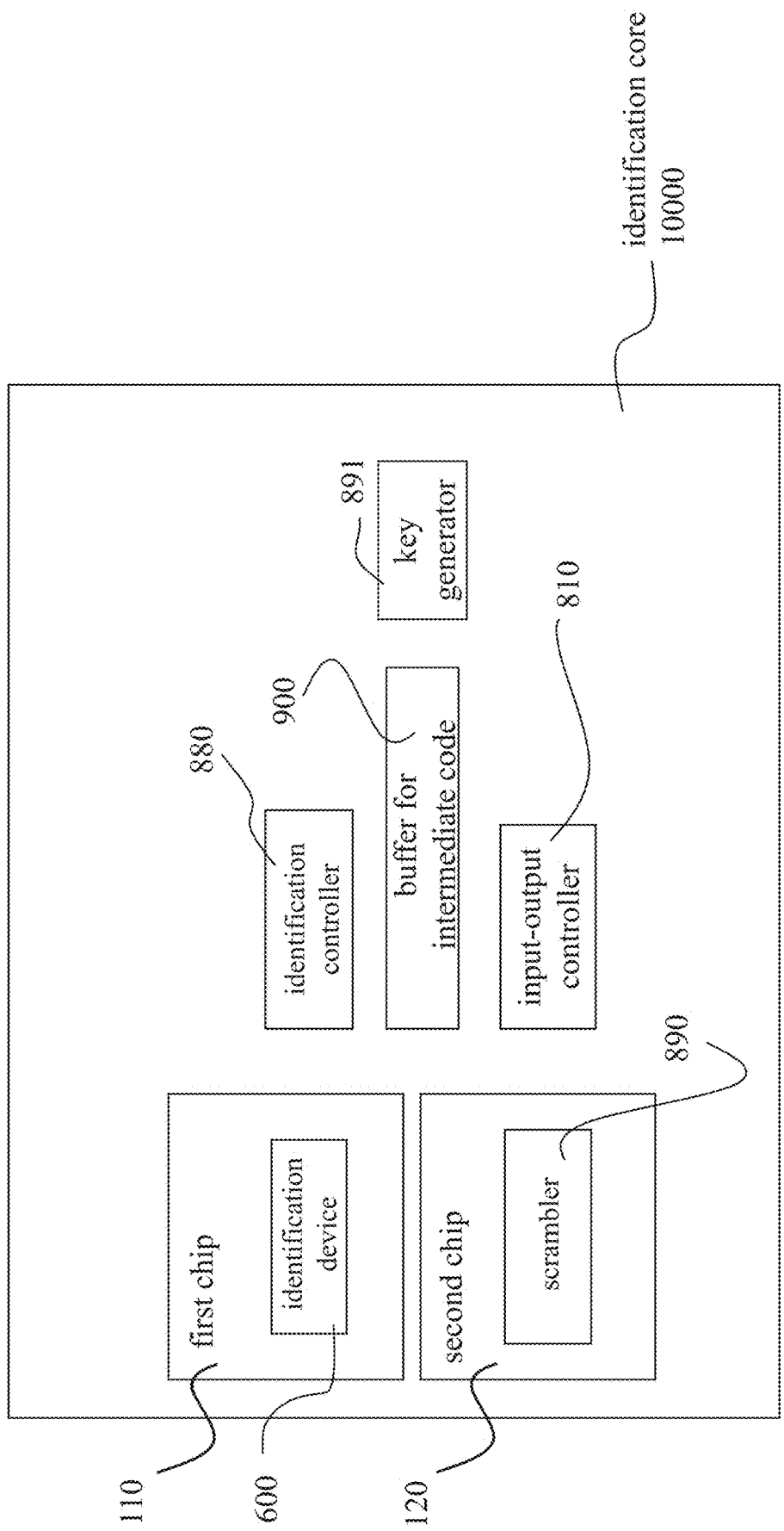
FIG. 61 shows an example of configurations of an identification core including an identification device and key generator.

As shown in FIG. 61, the identification device 600 and the scrambler 890 may be respectively integrated into two different chips (the first chip 110 and the second chip 120). The other modules, for example, the identification controller 880, the buffer 900 for intermediate code, the input-output controller 810, the key generator 891 and so forth may be equipped into the first chip 110 or the second chip 120, and also able to be equipped into different electric apparatuses and so forth, which configures the identification core 10000, other than the first chip 110 and the second chip 120.

Tenth Embodiment

Suppose that the identification cells 977 is a memory cell of mass-product of memory chip. However, it may be able to adopt as the identification cells 977 memory products to possibly sell well soon such as ReRAM, PCRAM, MRAM, STT-MRAM and so forth other than what has sold well such as DRAM, NOR Flash, NAND Flash, MROM and so forth.

The difference between NAND-type cell array and NOR-type cell array is, as mentioned above, whether or not the bit line contact is included in every memory cell. That is, in both cell arrays, the memory cells are distributed at the cross-points of the bit lines 902 and the word lines 503. Accordingly, the method to be described below in the present disclosure is applicable to both of NAND-type cell array and NOR-type cell array.

Figure 62:
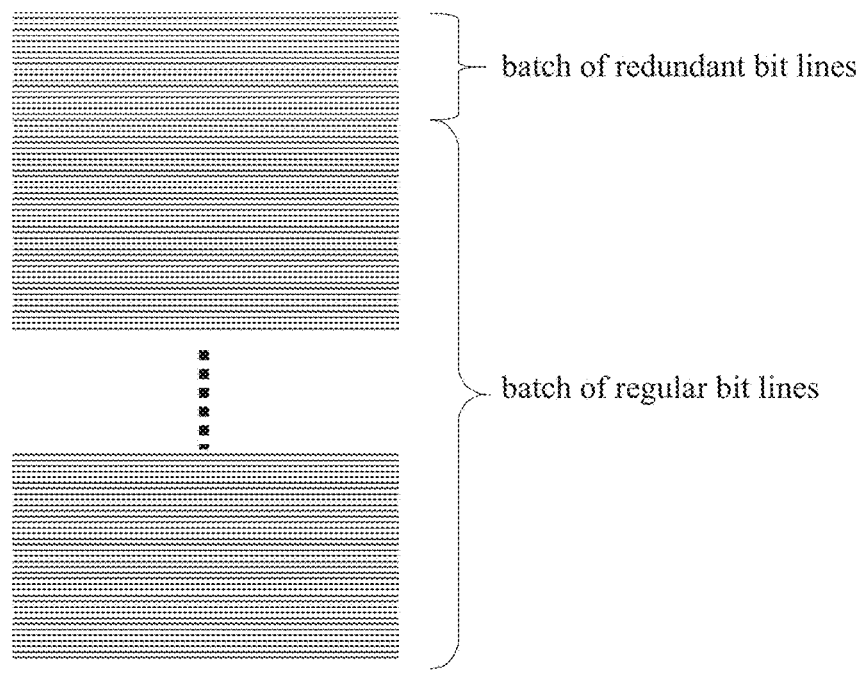
FIG. 62 shows an example of distributions of a batch of redundant bit lines and batch of regular bit lines.
Figure 63:
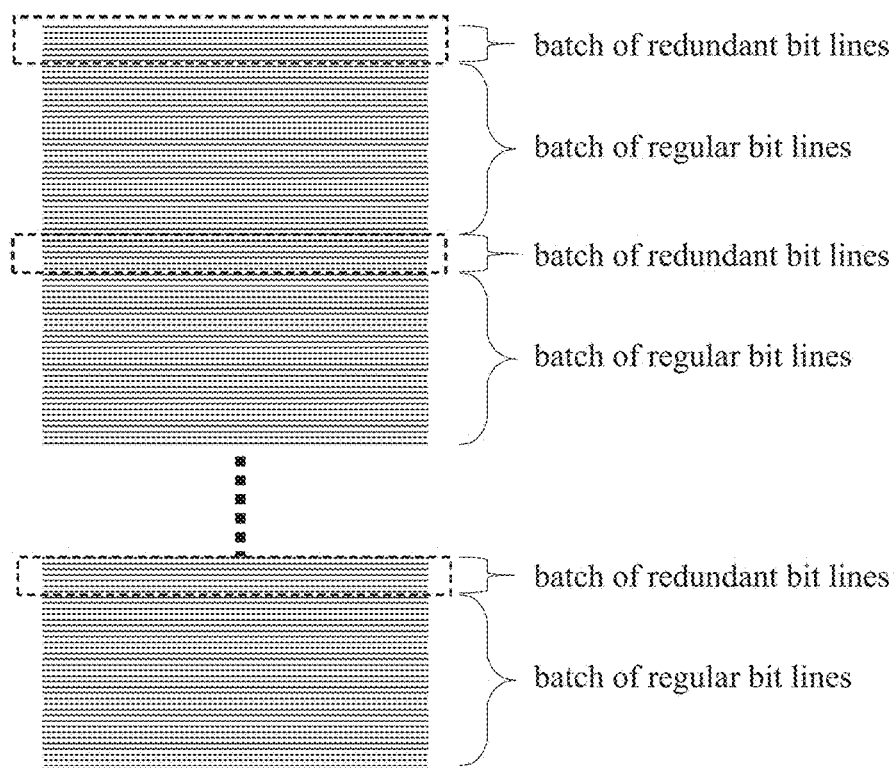
FIG. 63 shows an example of distributions of a batch of redundant bit lines and batch of regular bit lines.

For usual memory chip products, as shown in FIG. 62 or 63, the memory cell array is divided into a batch of redundant bit lines and a batch of regular bit lines. The bit capacity of the memory chip is defined by the number of the memory cells included into the batch of regular bit lines. The memory cells included into the batch of redundant bit lines are backups for fail bits to be found among the memory cells belonging to the batch of regular bit lines, and are not counted and added to the bit capacity.

FIG. 62 shows an example in which the batch of bit lines crossing the whole memory cell array is divided into the batches of redundant bit lines and regular bit lines. FIG. 63 shows another example in which the batch of bit lines crossing the whole memory cell array is divided into the batches of redundant bit lines and regular bit lines. In FIG. 62, the batches of redundant bit lines and regular bit lines are bundled to form two independent batches, respectively. In FIG. 63, a plurality of batches is distributed on the cell array.

Below, the example shown in FIG. 62 in which the batches of redundant bit lines and regular bit lines are bundled to form two independent batches, respectively, is used to continue the illustration. However, even in the case of FIG. 63, the illustration for the embodiments are almost identical and then omitted. Moreover, the illustration of the embodiments is unchangeable even when exchanging the bit lines and the word lines. Then, the detailed illustration of those embodiments is also omitted.

Figure 64:
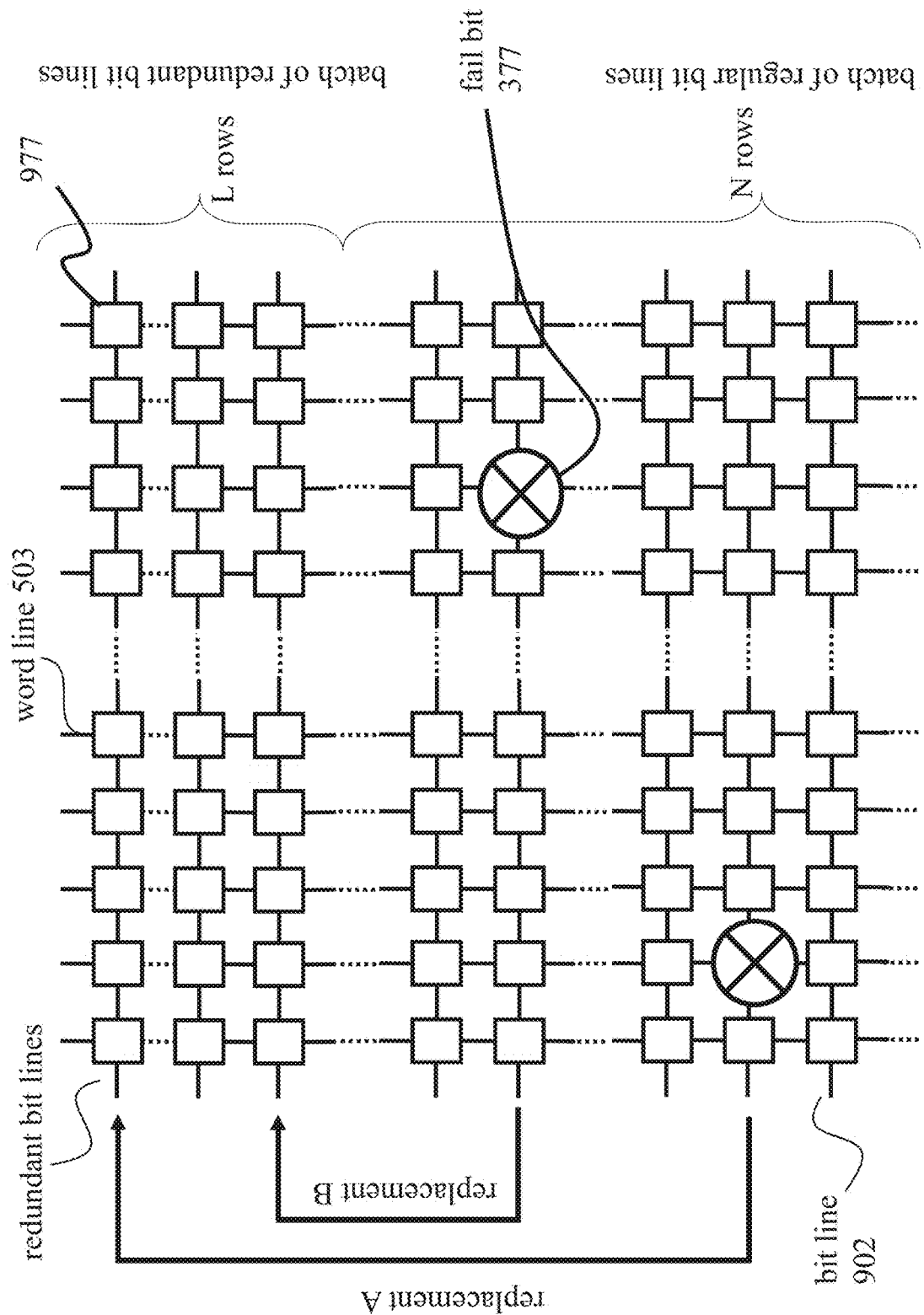
FIG. 64 shows an example of methods to replace a bit line including fail bits with a redundant bit line.

In FIG. 64, the cell array for identification cells in FIG. 40 corresponds to the batch of regular bit lines. There is the batch of redundant bit lines below the top margin of the sheet. The row number of the batch of regular bit lines is N and the row number of redundant bit lines is L. Suppose that fail bits occur in m bit lines in the batch of regular bit lines, where L, M and m are natural numbers, N is larger than L and L is larger than m.

The mass-product memory chip should be examined before the shipping to inspect whether or not fail bits are found among memory cells belonging to the batch of regular bit lines. If they are able to be easily fixed, they may be fixed. The addresses of the other fail bits are recorded and then the access to those addresses is prohibited. Simultaneously, in order to replace the access-prohibited memory cells with those in the batch of redundant bit lines, the execution of the address re-allocation is coded and then stored in a small non-volatile memory (fuse memory as an example) set up in the peripheral region inside the memory chip. After that, the memory chip is assembled to be shipped.

More specifically, as shown in FIG. 64, the access to all memory cells in the bit lines including fail bits 377 with certain of failure is prohibited. The bit lines are replaced with different bit lines in the batch of redundant bit lines. That is, the address re-allocation is not executed cell-by-cell. The address re-allocation is executed line-by-line along bit line or word line.

Here, the replacements A and B shown in FIG. 64 may be considered. It is decided which bit line is used for the replacement A and which bit line is used for the replacement B among the batch of redundant bit lines before the shipping. The number of cases that m bit lines are re-allocated for the replacement among L redundant bit lines is given with the permutation P(L, m), where m is the number of bit lines to be executed with the access prohibition. The corresponding number of cases is the combination C(N, m).

The fail bits to be found during the pre-shipment inspection may occur due to certain reason in the manufacturing process. Otherwise, those fail bits may be caused probabilistically by applying high electric field purposely at the inspection. Anyway, the occurrence of such failures is free from any algorithm and then construed as physically random. Thus, it is turned out to be able to generate physical random number code from mass-product memory chip. The freedom of the randomness is at least C(N, m). If considering which bit lines in the batch of redundant bit lines are used for the re-allocation, the number of cases is C(N, m)×P(L, m).

Figure 65:
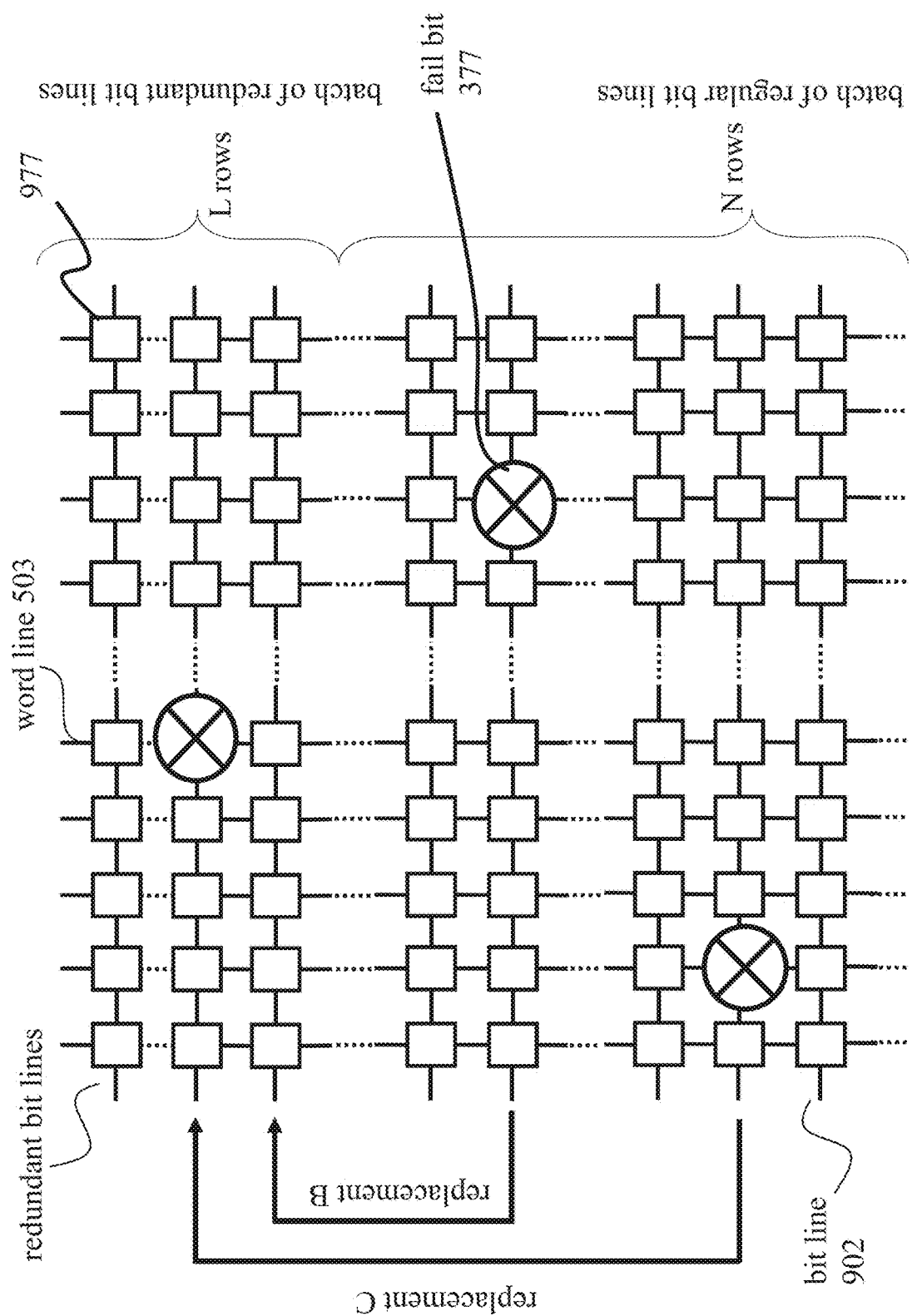
FIG. 65 shows an example in which a redundant bit line to take a place of a bit line including a fail bit also includes another fail bit.

Meanwhile, as shown in FIG. 65, it may be possible that a fail bit occurs even at redundant bit line selected for the re-allocation. If the number of such bit lines is n, the number of cases is C(N, m)×P (L−n, m). However, as long as L is a natural number which is much smaller than N, it may be expected that n is a natural number which is much smaller than m. In particular, n is much smaller than L in the case of mass-product memory chip. Accordingly, L−n can be roughly estimated as extremely approaching to L. Otherwise, the memory chip cannot be a mass-product.

The DRAM can be considered as an example of mass-product memory chip satisfying the above-mentioned condition. Thus, the identification cell 977 is DRAM cell as shown in FIG. 48. In the case of a typical DRAM products with 4 Gbits, for example, the number of redundant bit lines may be 153,000 while the number of the whole bit lines is 6,550,000. That is, at most 153,000 bit lines including fail bits due to certain reason may be acceptable in the batch of regular bit lines. Thus, the number of cases of the re-allocation to the redundant bit lines may be identical to the combination number of selecting 153,000 among 6,550,000. By the calculation, it can be turned out to be 10 to the power of 315,289.

In the case that word lines are distributed along the row direction for bit lines, the number of case of selecting 3,044 word lines among 4,400,000. This is estimated about 2.9 times 10 to the power of 10,938. It is smaller than in the former case but is still an extremely large number.

As mentioned above, the freedom of MAC address is 70 trillion, which is 7 times 10 to the power of 13. If more than 100 trillion authentication IDs are saved even for the coming IoT, at most 10 to the power of 14 IDs is good enough. Accordingly, the number of cases of the re-allocation of redundant bit lines or redundant word lines may be regarded as actually infinity.

Thus, even though not saving a new different area for identification device 600 on the chip, it may be able to acquire actually infinite physical randomness by using an inner memory to record special codes for the access prohibition and re-allocation, i.e., a small non-volatile memory equipped in the peripheral area inside memory chip (such as fuse memory, etc.), which is in advance set up for the product control of mass-product memory chip. It is thus turned out to be able to satisfy (Actual limitlessness of output).

This means that it is able to provide the identification device 600 related to the present disclosure with neither adding any new process to the manufacturing process of mass-product memory chip nor loosing chip area.

Meanwhile, the memory to recode the special code for the execution of the above-mentioned access prohibition and re-allocation (special inner memory hereinafter) is not equipped with any contact to connect to the external of the memory chip after assembling. Accordingly, it is impossible to access information recorded in the special inner memory in normal access mode.

Below, an example of taking a physical random number code from information recorded in a special inner memory is briefly described.

Figure 66:
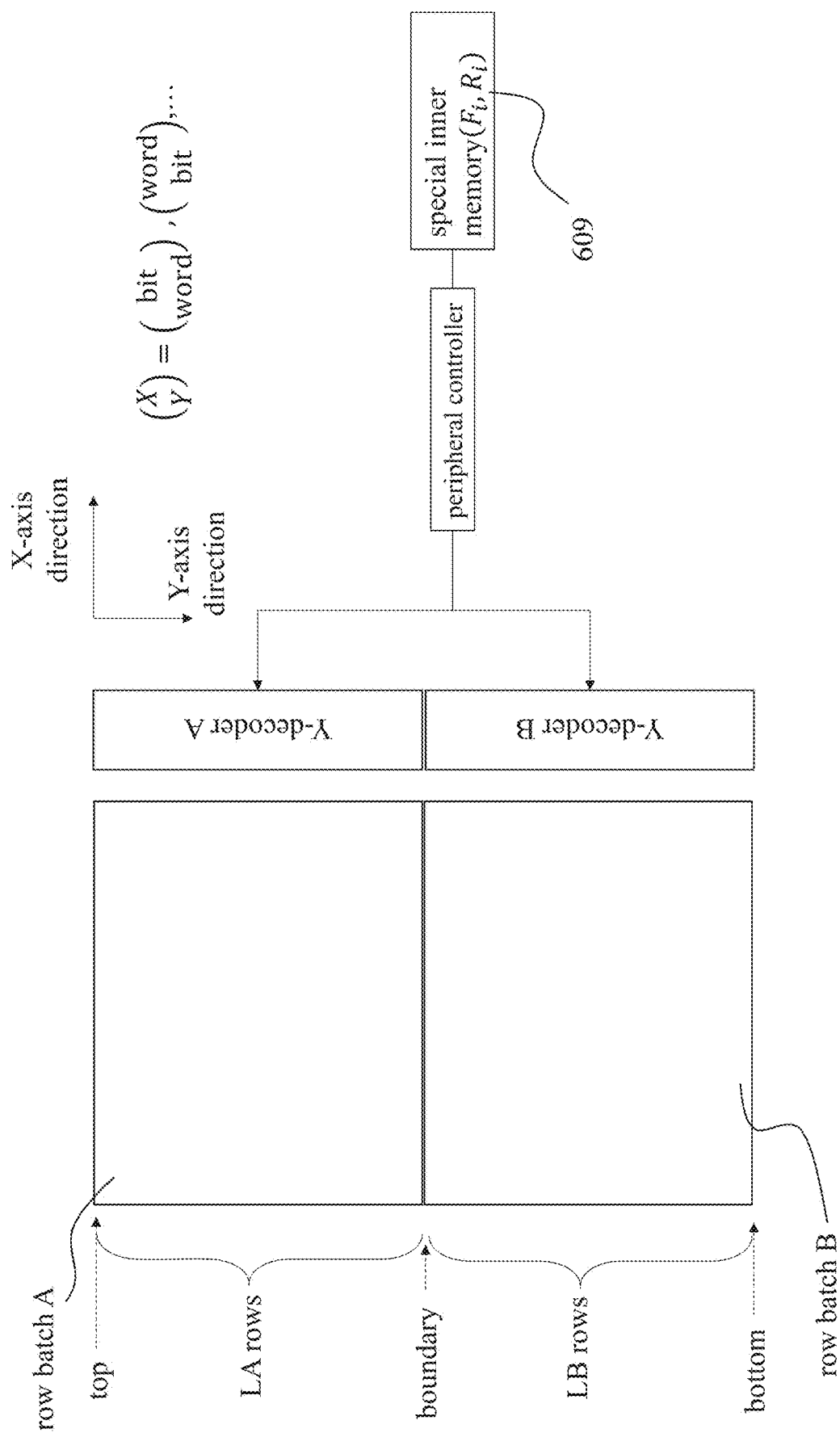
FIG. 66 shows an example of the cell array for identification cells, which is divided into two parts: row batch A and row batch B.

FIG. 66 shows an example in which the identification cells 977 are distributed along the row direction (X-axis direction) and along the column direction (Y-axis direction). The wiring lines along the X-axis are X-lines or just row and the batch of such is called X-lines batch or row batch. The wiring lines along the Y-axis are Y-lines or just column and the batch of such is called Y-lines batch or column batch. In one case, the X-line is the bit line and the Y-line is the word line. In another case, the X-line is the word line and the Y-line is the bit line.

The cell array of FIG. 66 is divided into the row batch A including the upper LA rows and the row batch B including the bottom LB rows and access to them are controlled by a Y-decoder A and a Y-decoder B, respectively.

Figure 15:
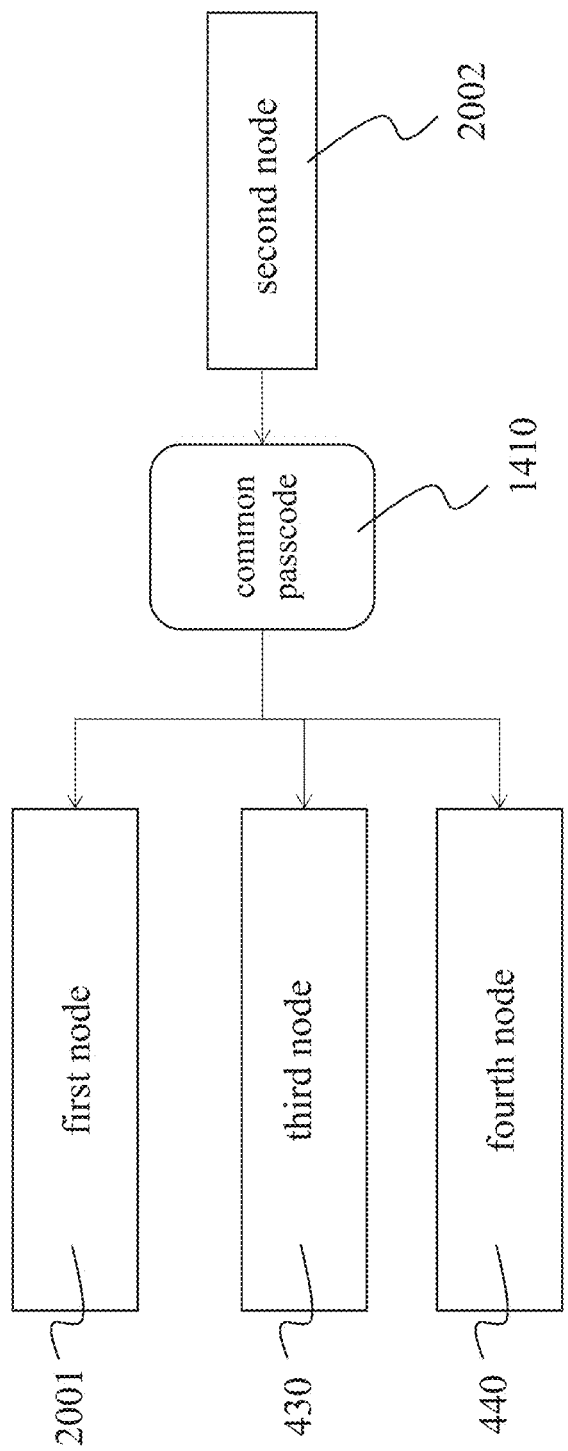
FIG. 15 shows an example of communication methods with the utilization of an identification device.
Figure 16:
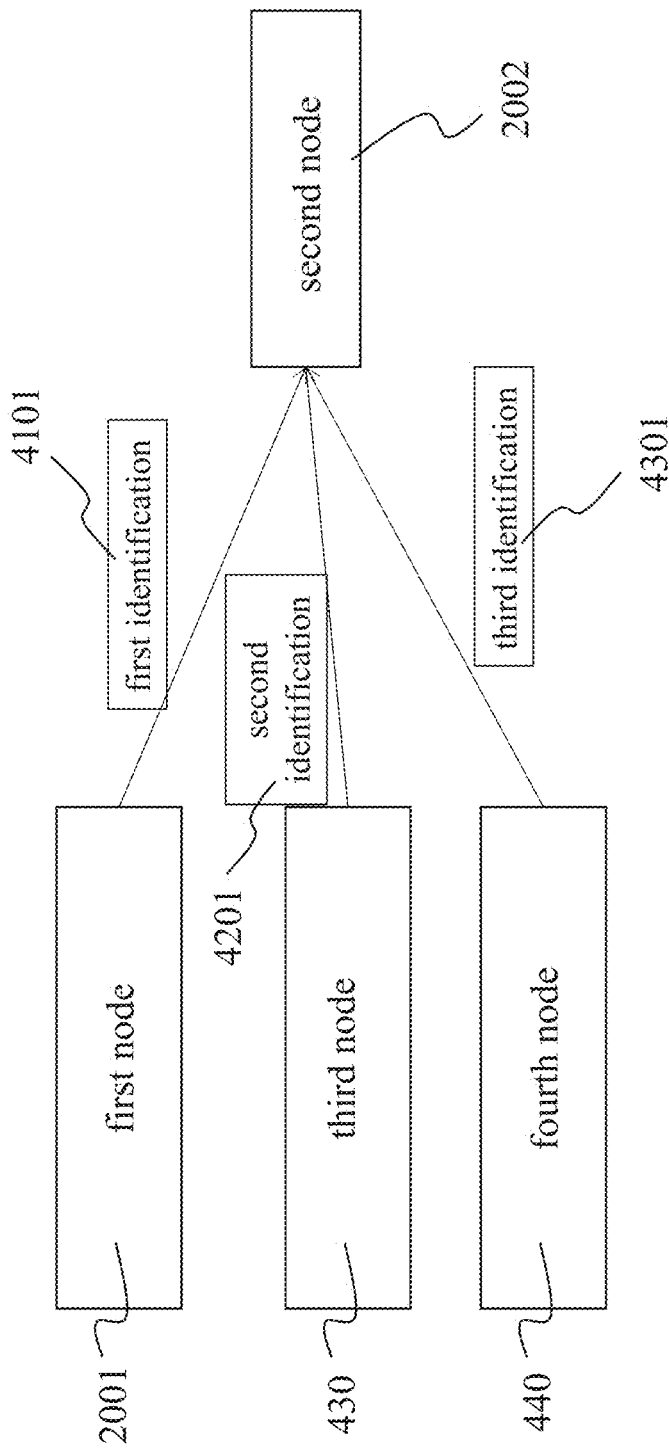
FIG. 16 shows an example of communication methods with the utilization of an identification device.
Figure 17:
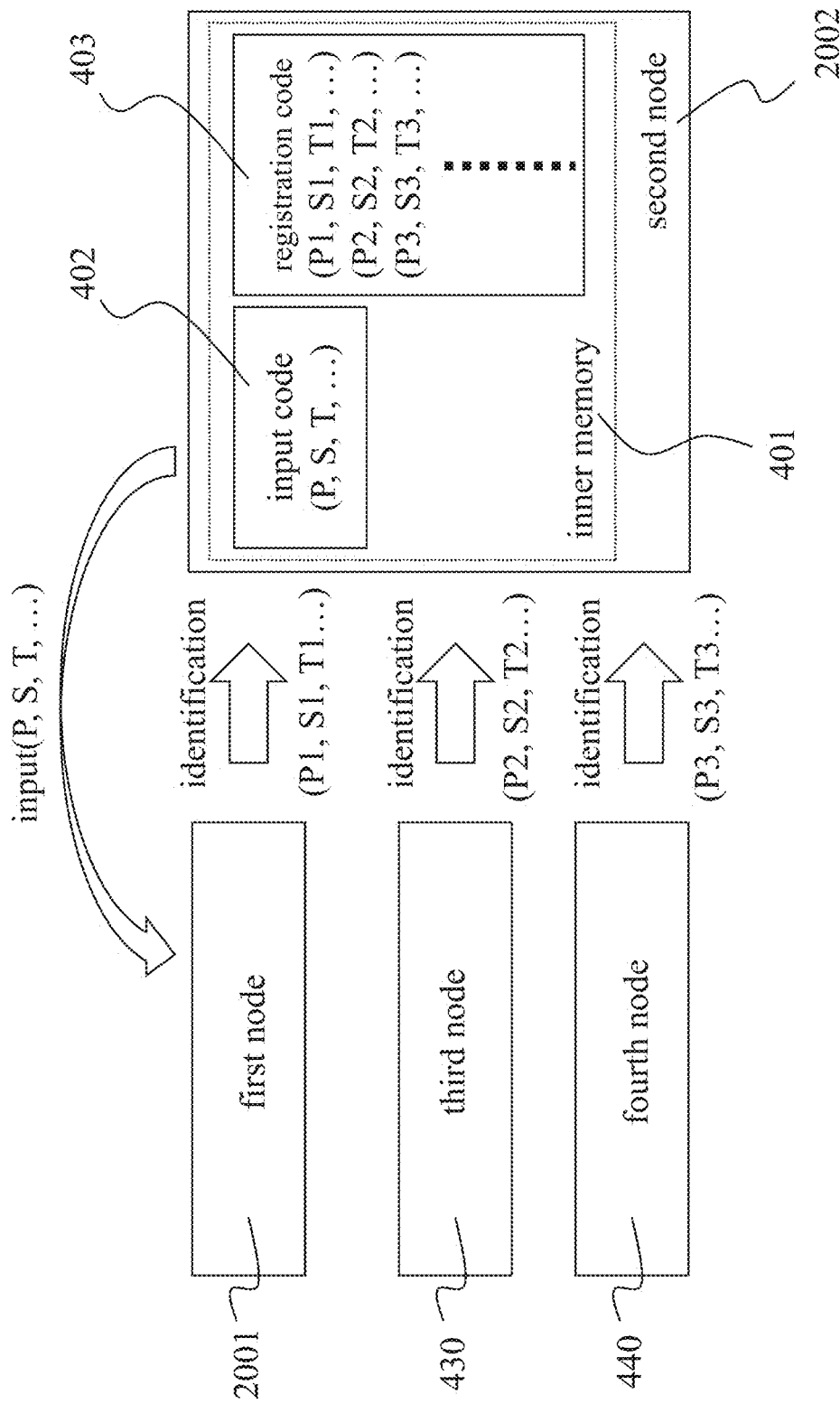
FIG. 17 shows a communication method with the utilization of an identification device.
Figure 19:
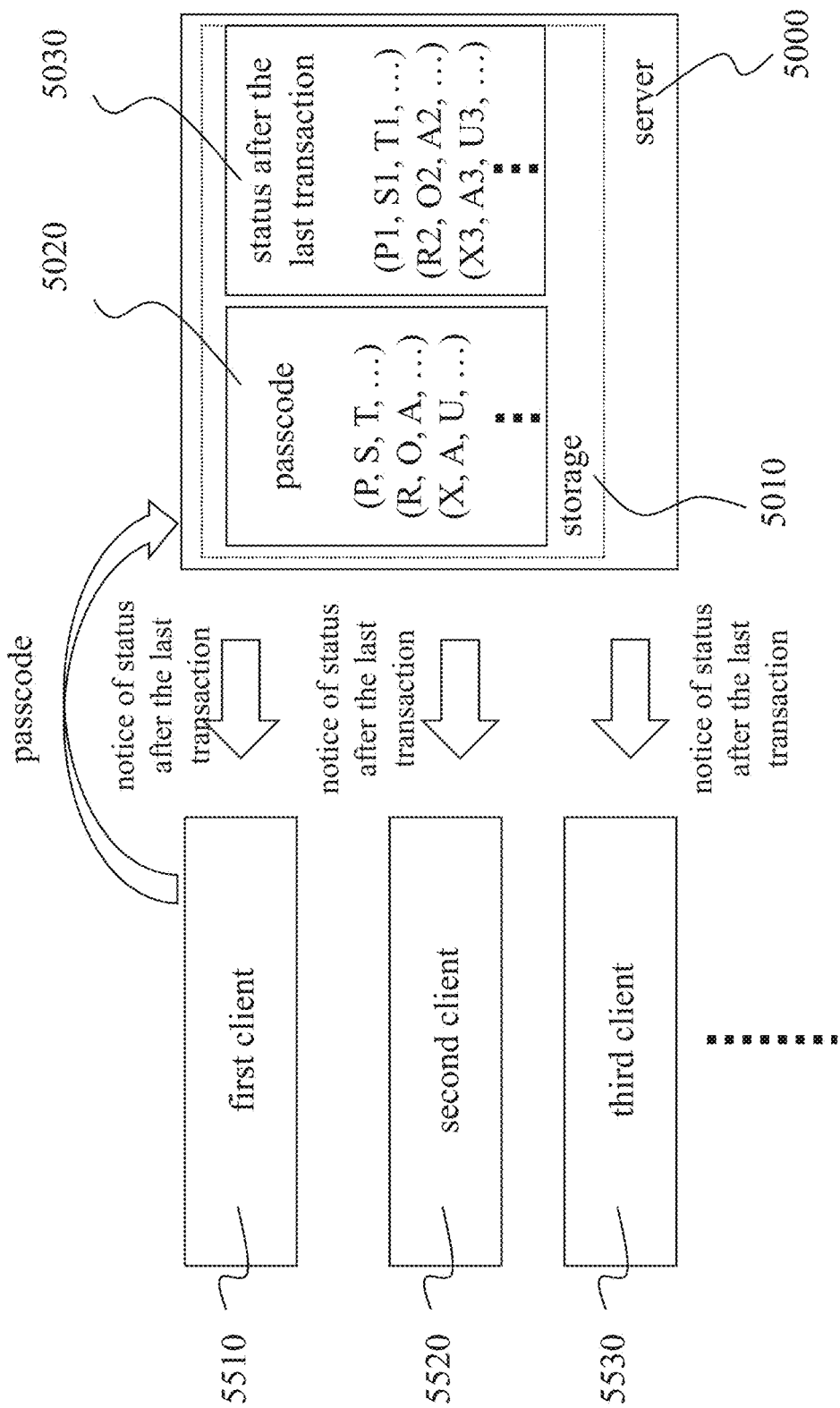
FIG. 19 is a diagrammatic view of the configuration of a client-server type network.
Figure 20:
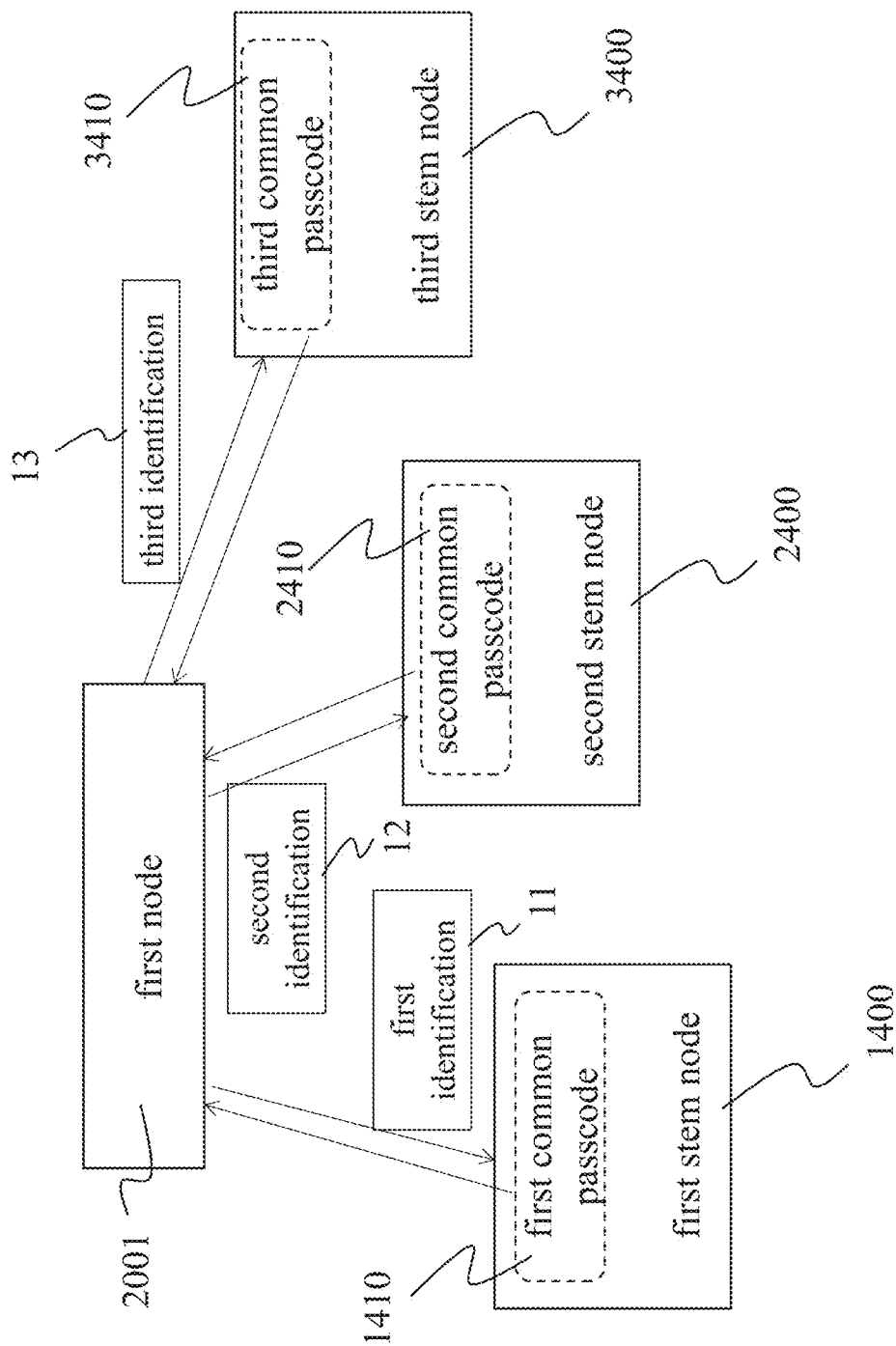
FIG. 20 shows an example of communication methods with the utilization of an identification device.
Figure 21:
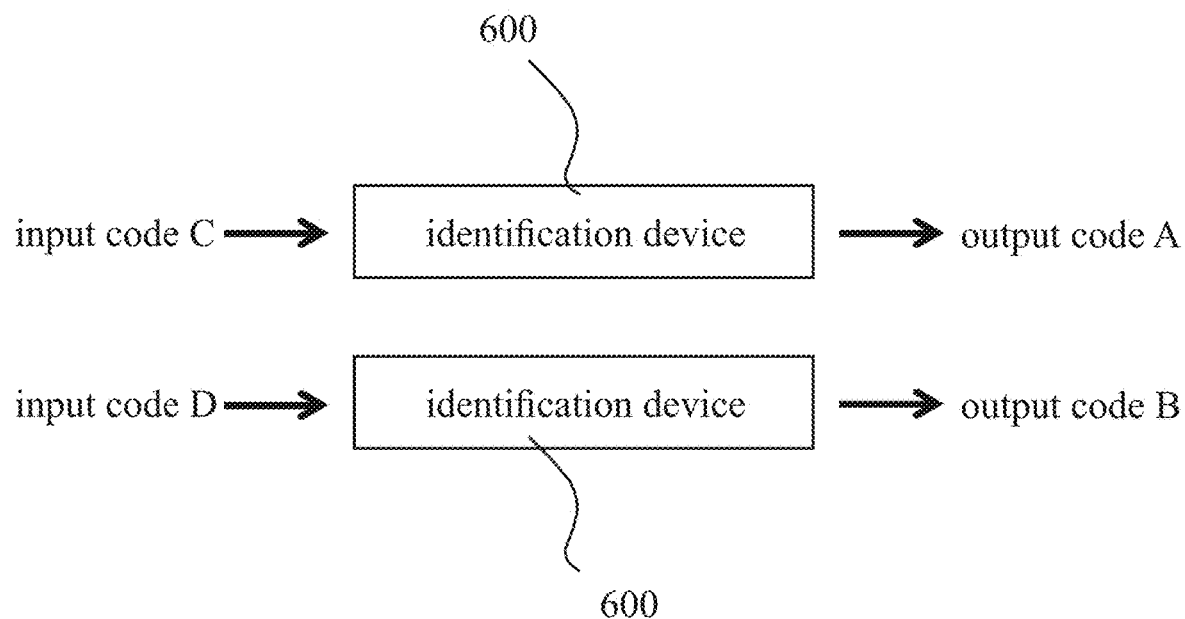
FIG. 21 shows an example of functions of an identification device.
Figure 22:
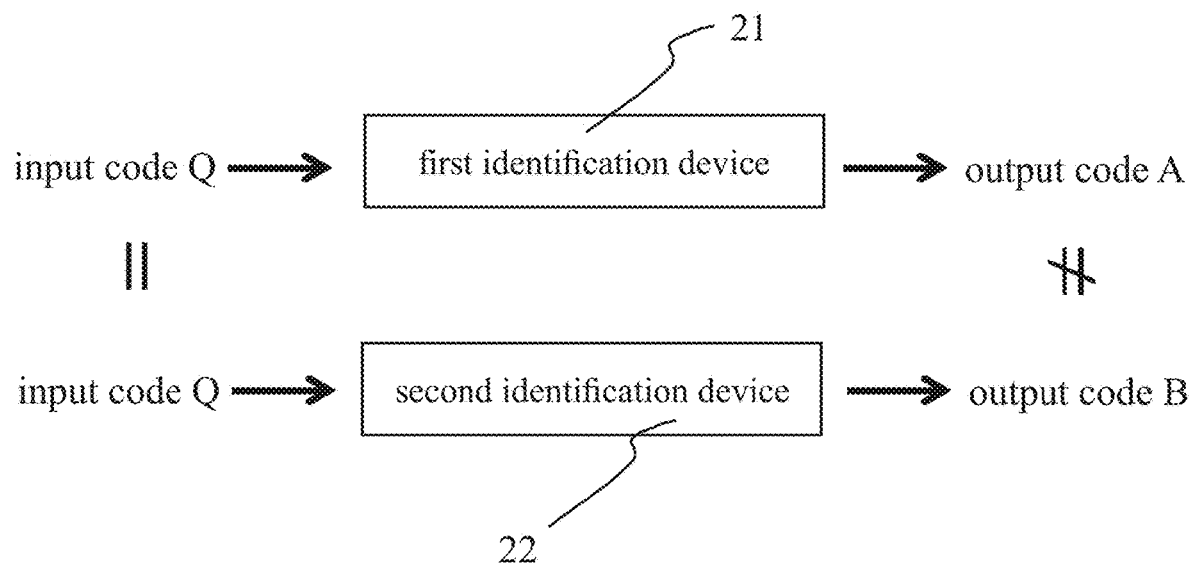
FIG. 22 shows an example of functions of an identification device.
Figure 23:
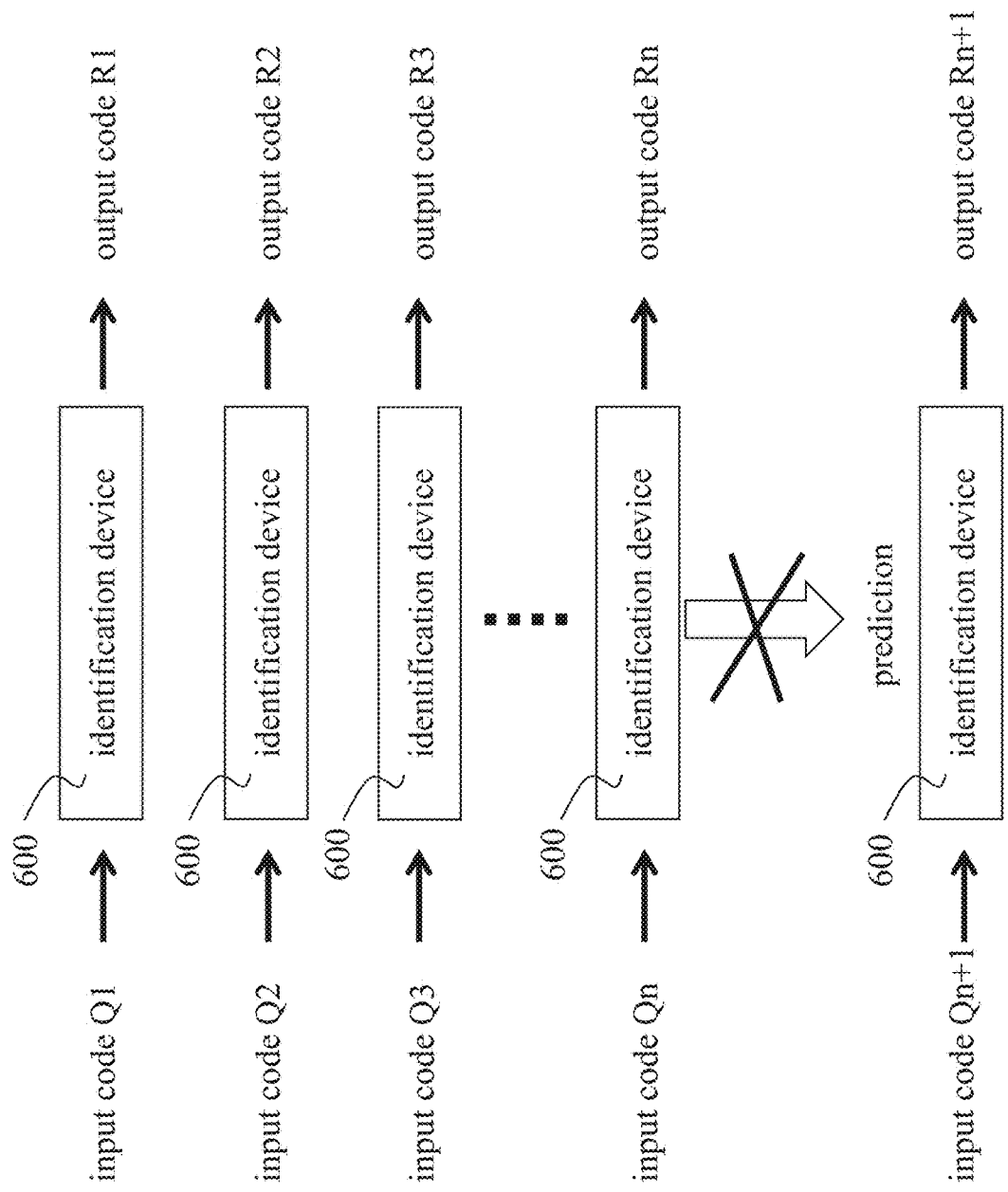
FIG. 23 shows an example of functions of an identification device.
Figure 24:
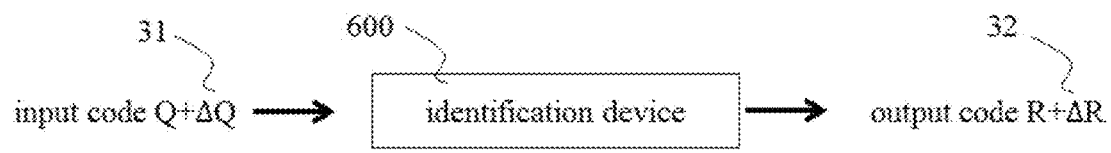
FIG. 24 shows an example of functions of an identification device.
Figure 82:
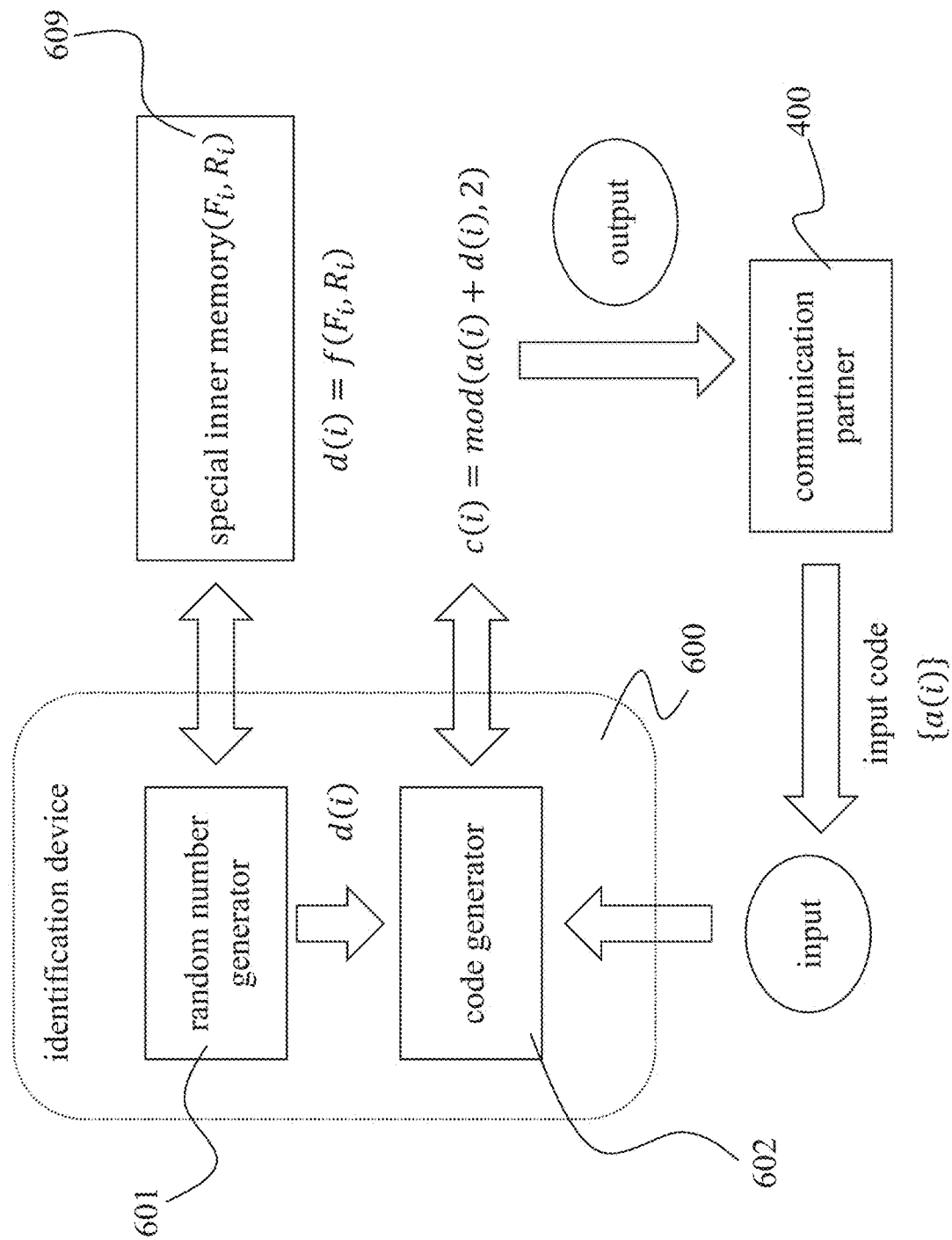
FIG. 82 shows an example in which a code to be generated from the redundant data (Fi, Ri) recorded in the special inner memory included in the peripheral circuit is utilized as output from the random number generator for the communication authorization.
Figure 83:
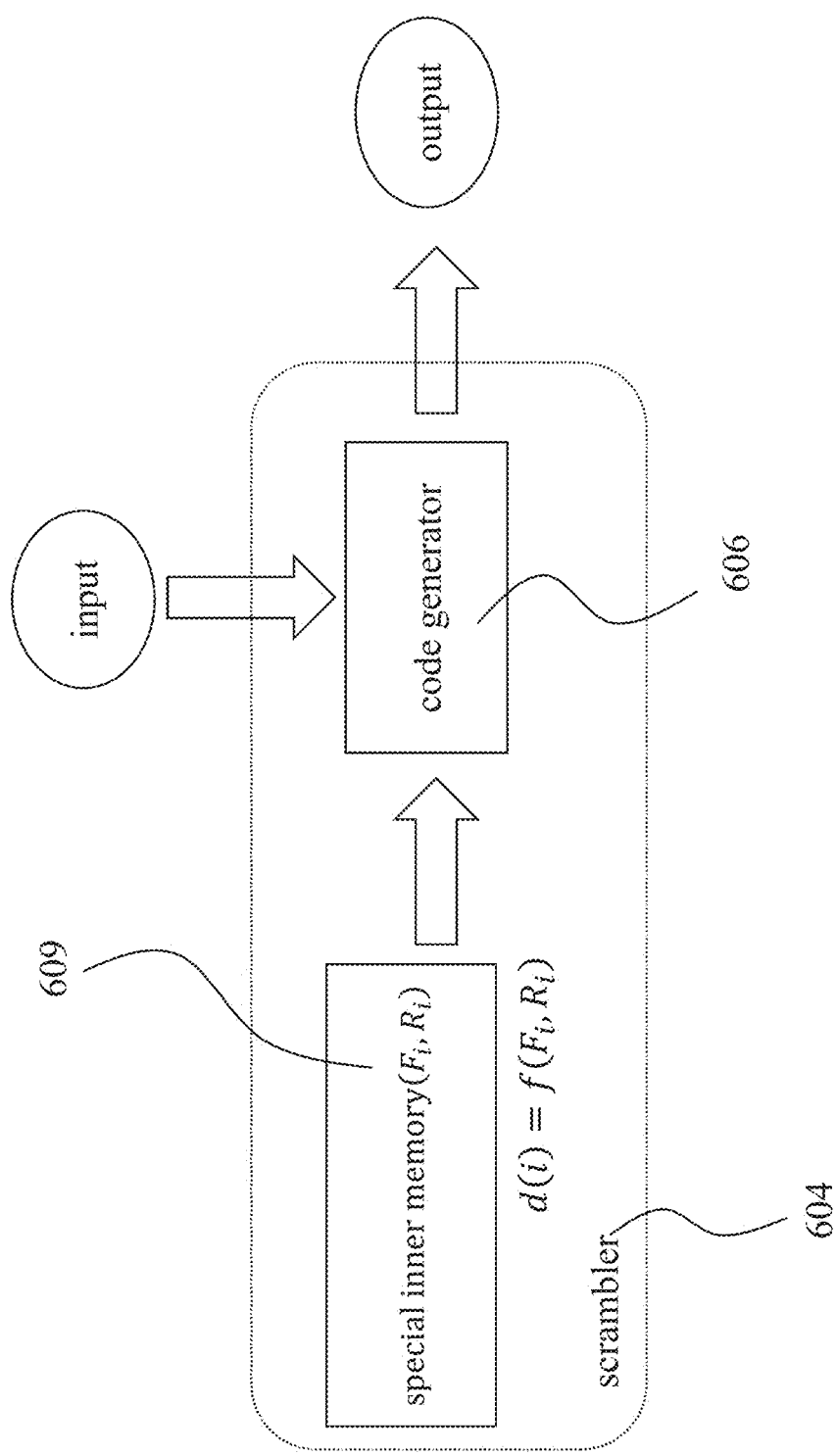
FIG. 83 shows an example in which the redundant data (Fi, Ri) recoded in the special inner memory included in the peripheral circuit is utilized for the scrambler.

The external input is input to an identification core 10000 via the external input-output 50 of FIGS. 30, 33, 37, 38 and 39. The external input is input from the second node 2002 to the first node 2001 via the signal transmission pathway 1000 in FIG. 14 as an example. Alternatively, in another example, the external input is mutually input between the first node 2001 and the second node 2002 via the signal transmission pathway 1000 in FIG. 25. Alternatively, in another example, the external input is the common passcode in FIG. 15. Alternatively, in another example, the external input is the common passcode 1410, the common passcode 2410 and the common passcode 3410 in FIG. 20. Alternatively, in another example, the external input is the input (P, S, T . . . ) in FIG. 17. Alternatively, in another example, the external input is the input code 402 in FIG. 18. Alternatively, in another example, the external input is input codes C, D, Q, Q1, Q2, Q3 . . . Qn, Qn+1 in FIGS. 21 to 24. Alternatively, in another example, the external input is the input code {a(i)} that the communication partner 400 inputs in FIG. 31, or the input code {a(i)} in FIGS. 32 and 35. Alternatively, in another example, the external input is the input in FIG. 34. Alternatively, in another example, the external input is the independent input in FIG. 28 and FIGS. 37 to 39. Alternatively, in another example, the external input is the input code {a(i)} in FIGS. 82 and 83 to be mentioned below.

Figure 67:
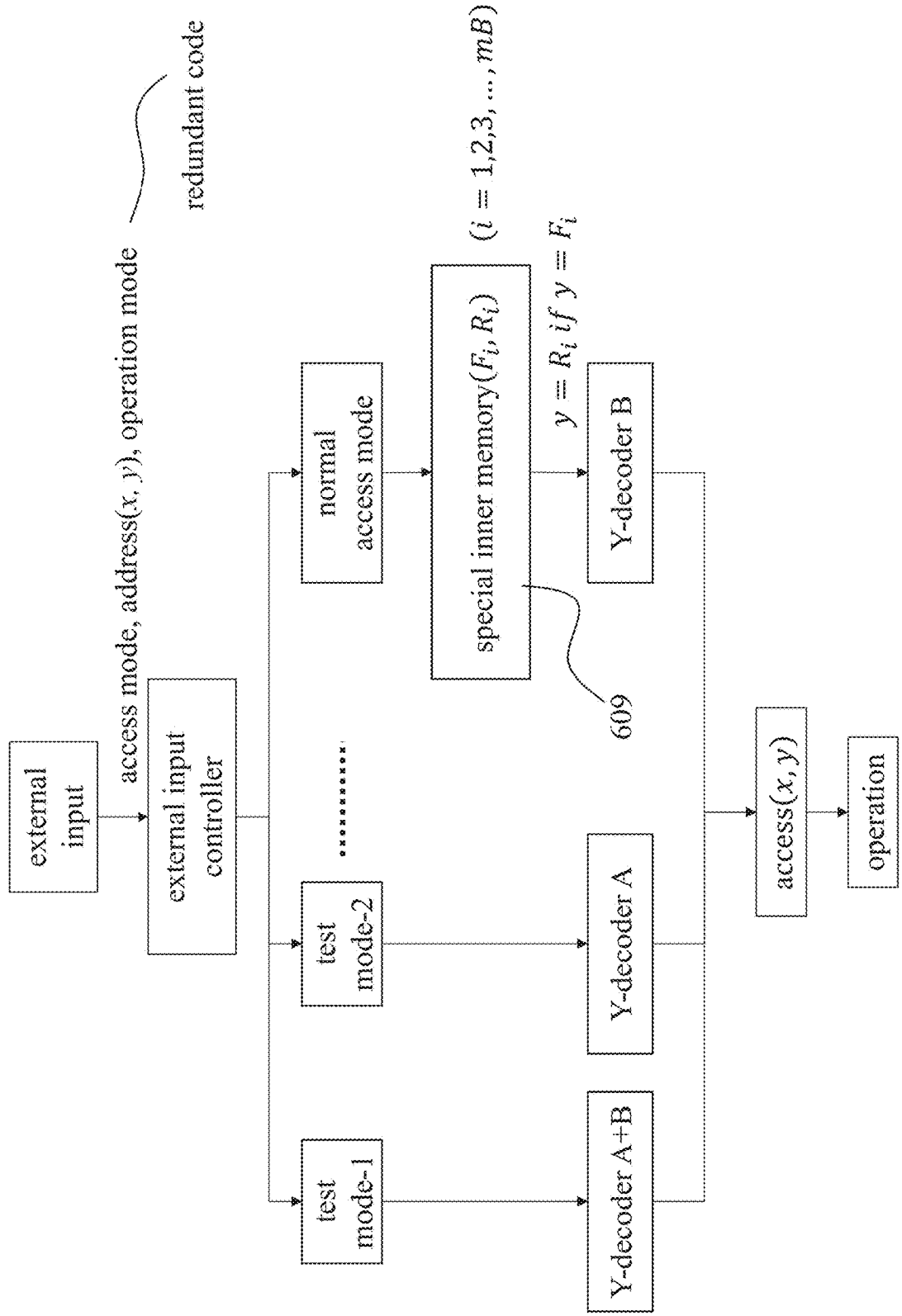
FIG. 67 shows the concept of redundant codes.

The code to be input as the external input may include information related to the above-mentioned redundant bit lines or redundant word lines (redundant row information). They are called redundant code, in particular. In FIG. 67, as an example of the redundant code, a set of access mode, address (x, y) and operation mode may be considered. As access mode, a test mode-1, a test mode-2, a test mode-3 . . . and a normal access mode may be considered.

The test mode-1 is the access mode to directly access the Y-decoder A and the Y-decoder B. The test mode-2 is the access mode to directly access only the Y-decoder A. The normal access mode is the access mode to directly access the Y-decoder B essentially and also to partly access the Y-decoder A according to information stored in the special inner memory 609 (Fi, Ri). However, Fi is the row number having fail bits among the regular row batch, and Ri is the row number to replace Fi among the redundant row batch, where i is a natural number ranging from 1 to mB, where mB is the number of rows with fail bits among the row batch B. The access method is thus selected and then the memory cell at the selected address (x, y) is accessed. After accessing it, the operation designed by the operation mode is executed thereon. More specifically, it is an essential operation of semiconductor memory such as read, erase and write.

Figure 68:
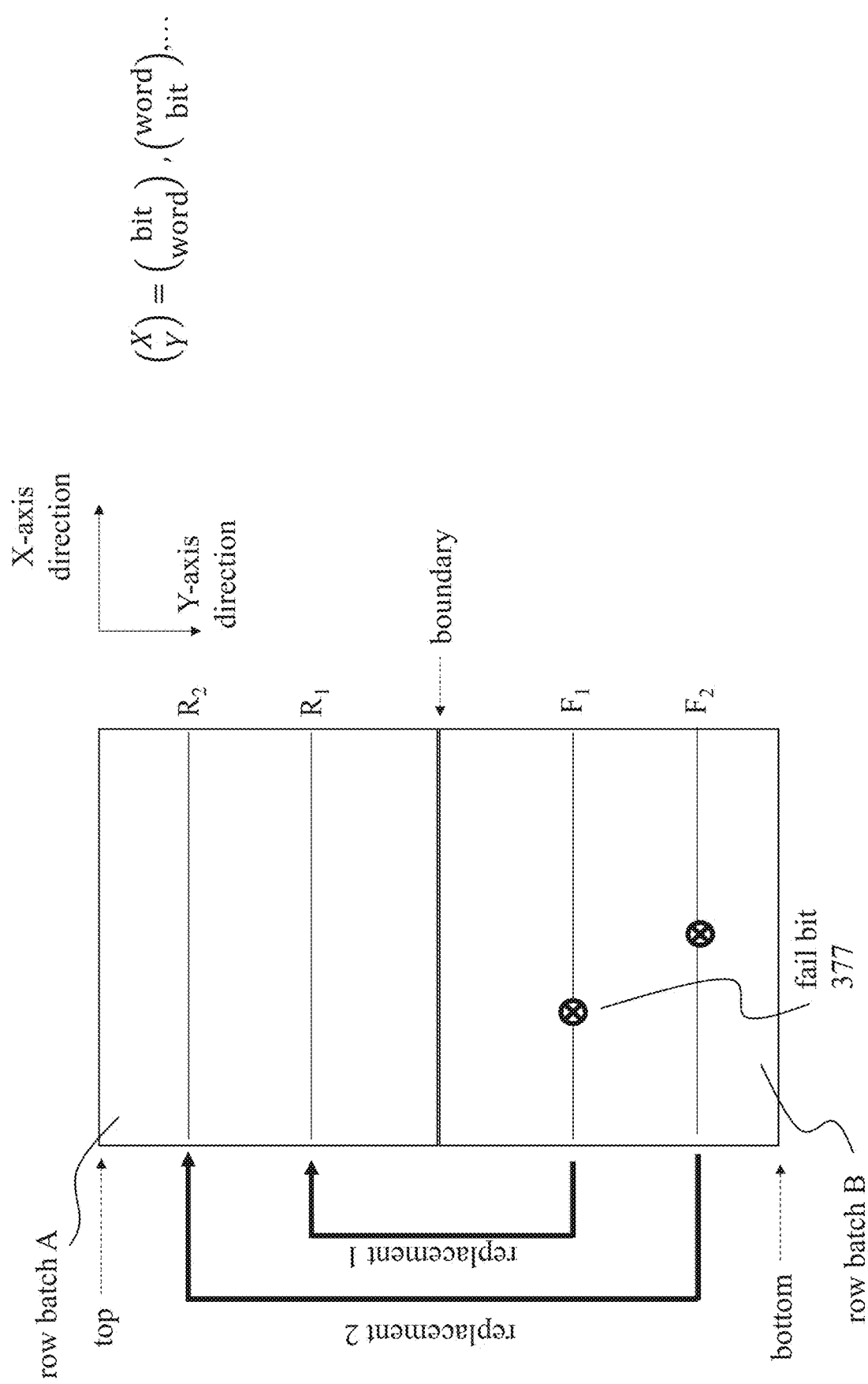
FIG. 68 shows a utilizing example of the utilization of redundant codes.

FIG. 68 shows an example in which two fail bits having certain failure are found among the row batch B. They are re-allocated to rows in the row batch A by the replacement 1 and 2, respectively. Here, if the row batch A and the row batch B are regarded as the batch of redundant bit lines and the batch of regular bit lines, respectively, then the execution of the replacement 1 and 2 are identical to the replacements A and B in FIGS. 64 and 65, respectively.

If the number of rows with fail bits among the rows batch A is mA and the number of rows with fail bits among the row batch B is mB, the freedom of physical random number code to be generated from the row batch B is the combination C(LB, mB). Considering the freedom of the row batch A, the total freedom is turned out to be P(LA−mA, mB)×C(LB, mB). However, LB is larger than LA. The LA is larger than the larger one of mA and mB.

Figure 69:
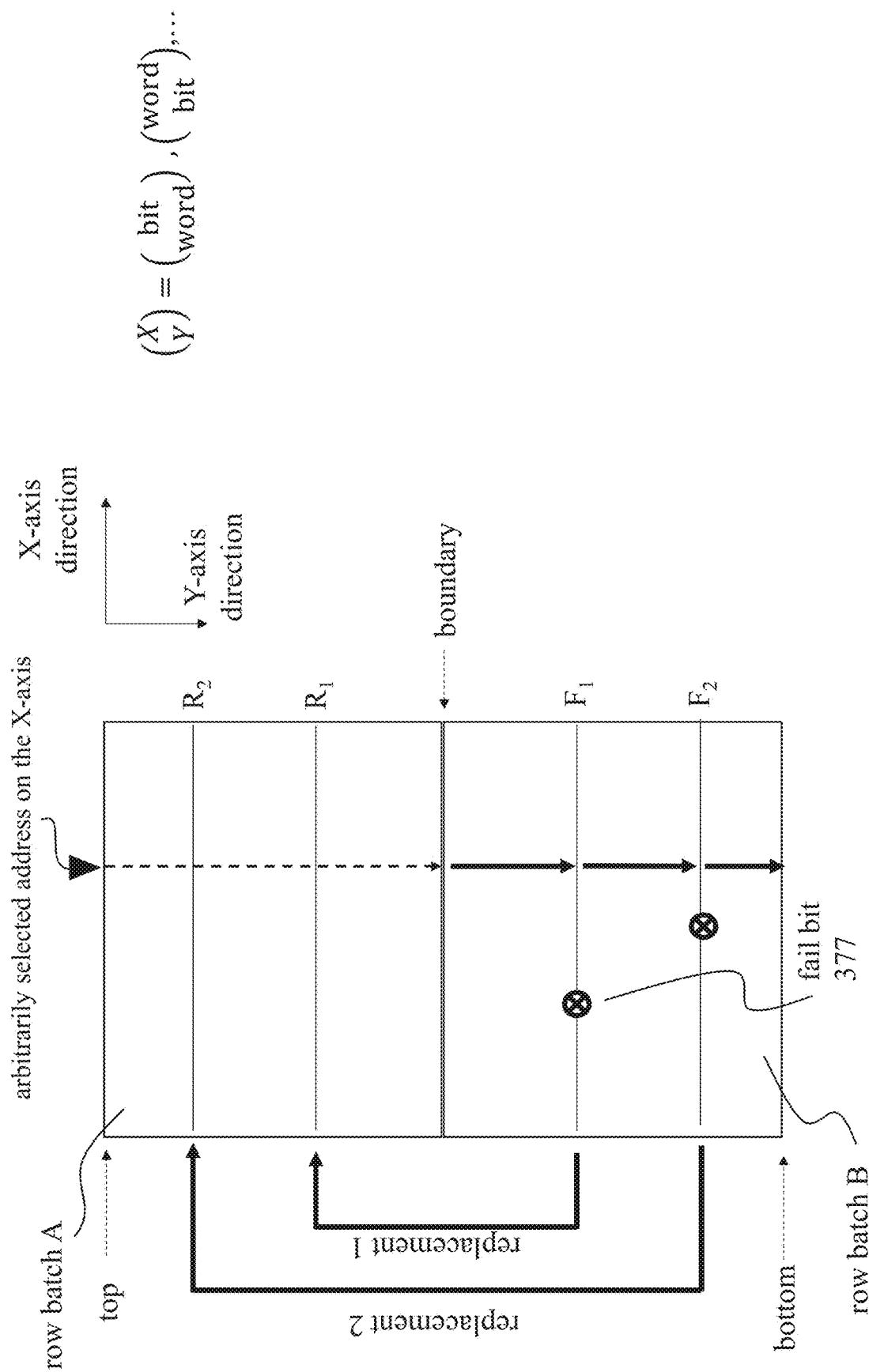
FIG. 69 shows an example of the access method with the normal access mode.

FIG. 69 shows the method to access memory cells in the row batch in FIG. 68 by normal access mode. This is to access the rows with no fail bit and to re-allocate the others (F1, F2 . . . ) in the row batch B to rows (R1, R2 . . . ) in the row batch A by a predetermined method in response to an arbitrarily selected address on the X-axis.

Figure 70:
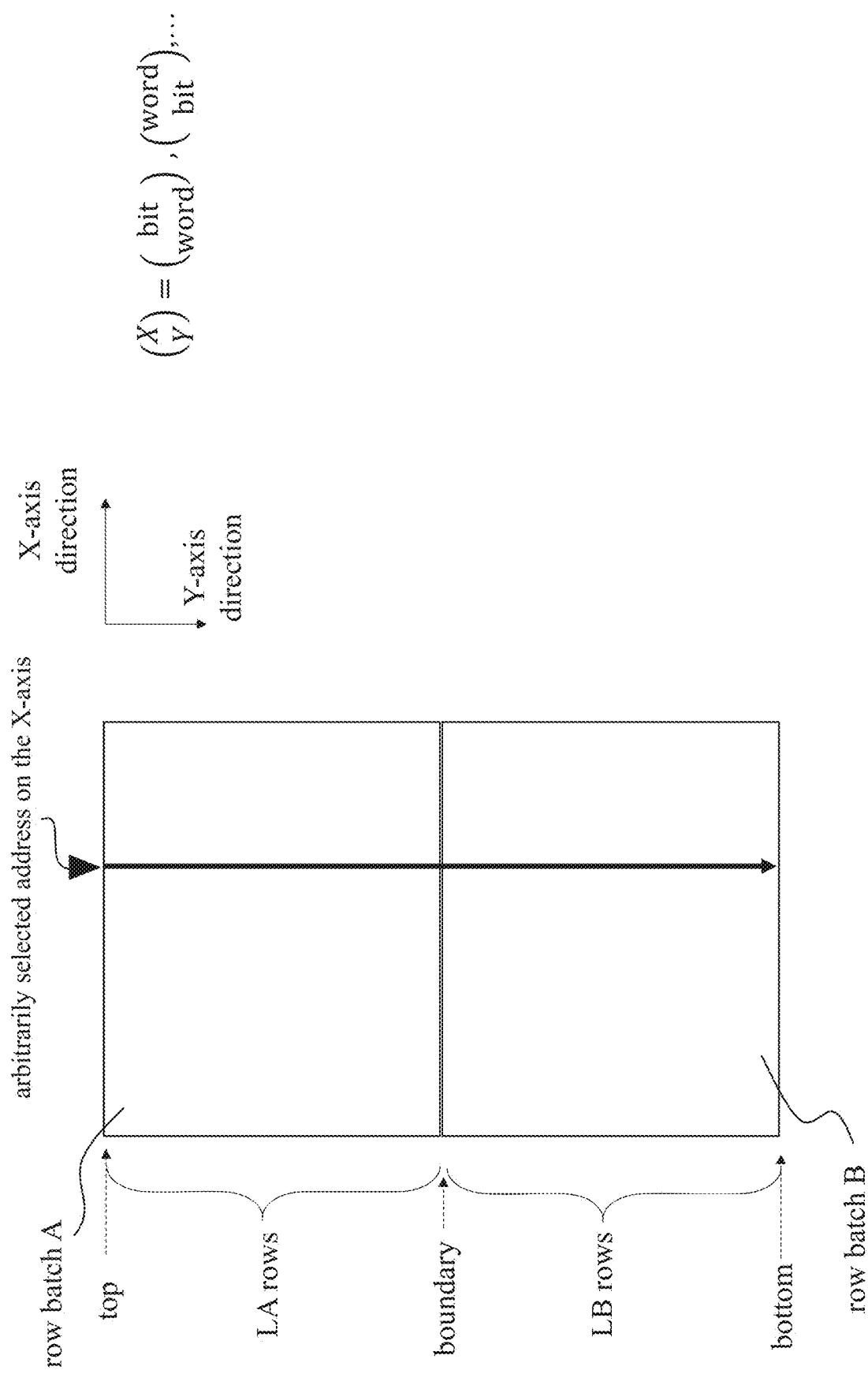
FIG. 70 shows an example of the access method with test mode-1.

FIG. 70 shows the test mode-1. This is to access all of the memory cells along the Y-axis across the row batch A and the row batch B in response to an arbitrarily selected address on the X-axis.

Figure 71:
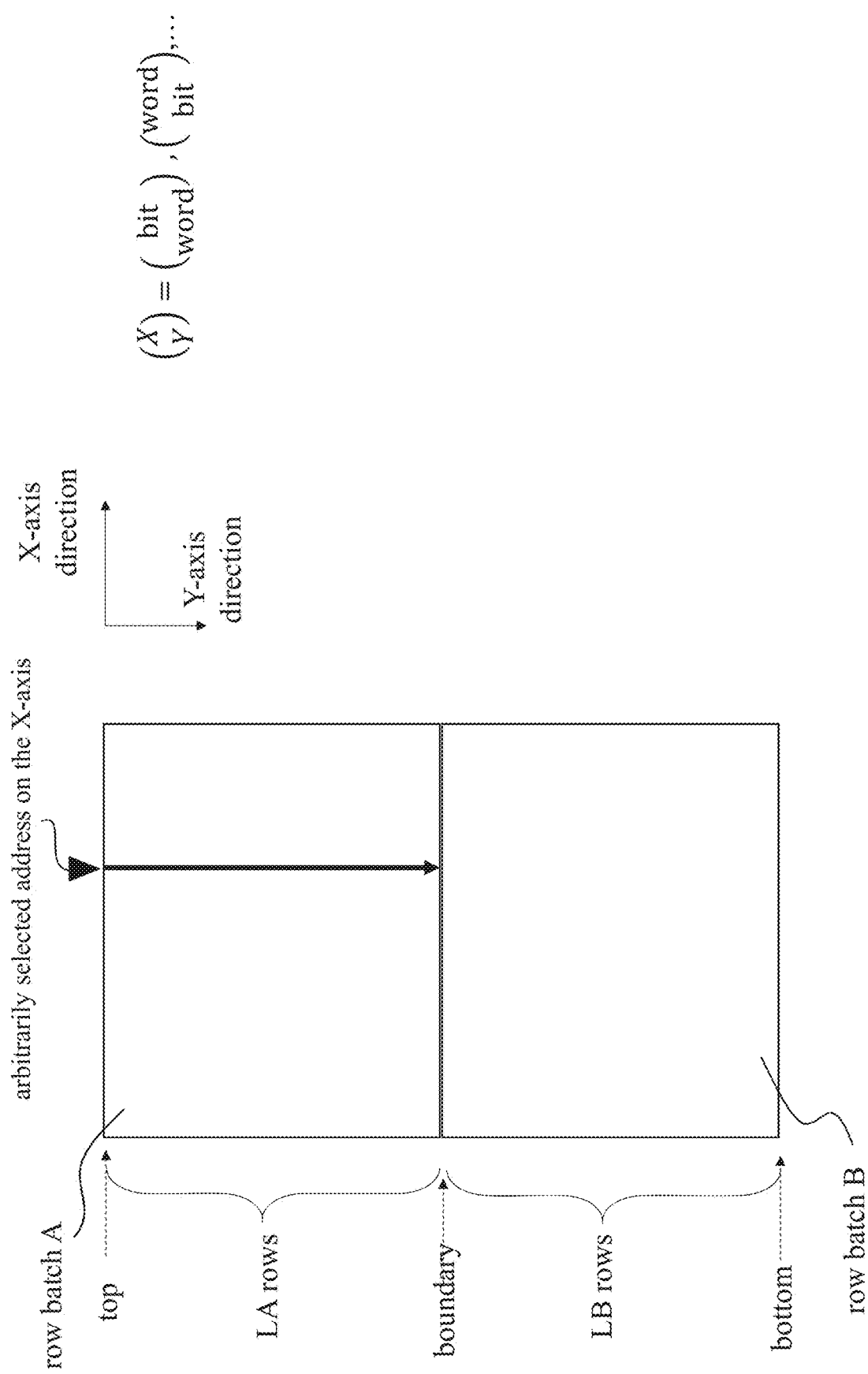
FIG. 71 shows an example of the access method with test mode-2.

FIG. 71 shows the test mode-2. This is to access all of the memory cells along the Y-axis across the row batch A in response to an arbitrarily selected address on the X-axis.

Meanwhile, the method to extract information (Fi, Ri) related to the replacement, which is stored in the special inner memory, by using the test mode-1, the test mode-2, and the normal access mode is briefly explained.

Figure 72:
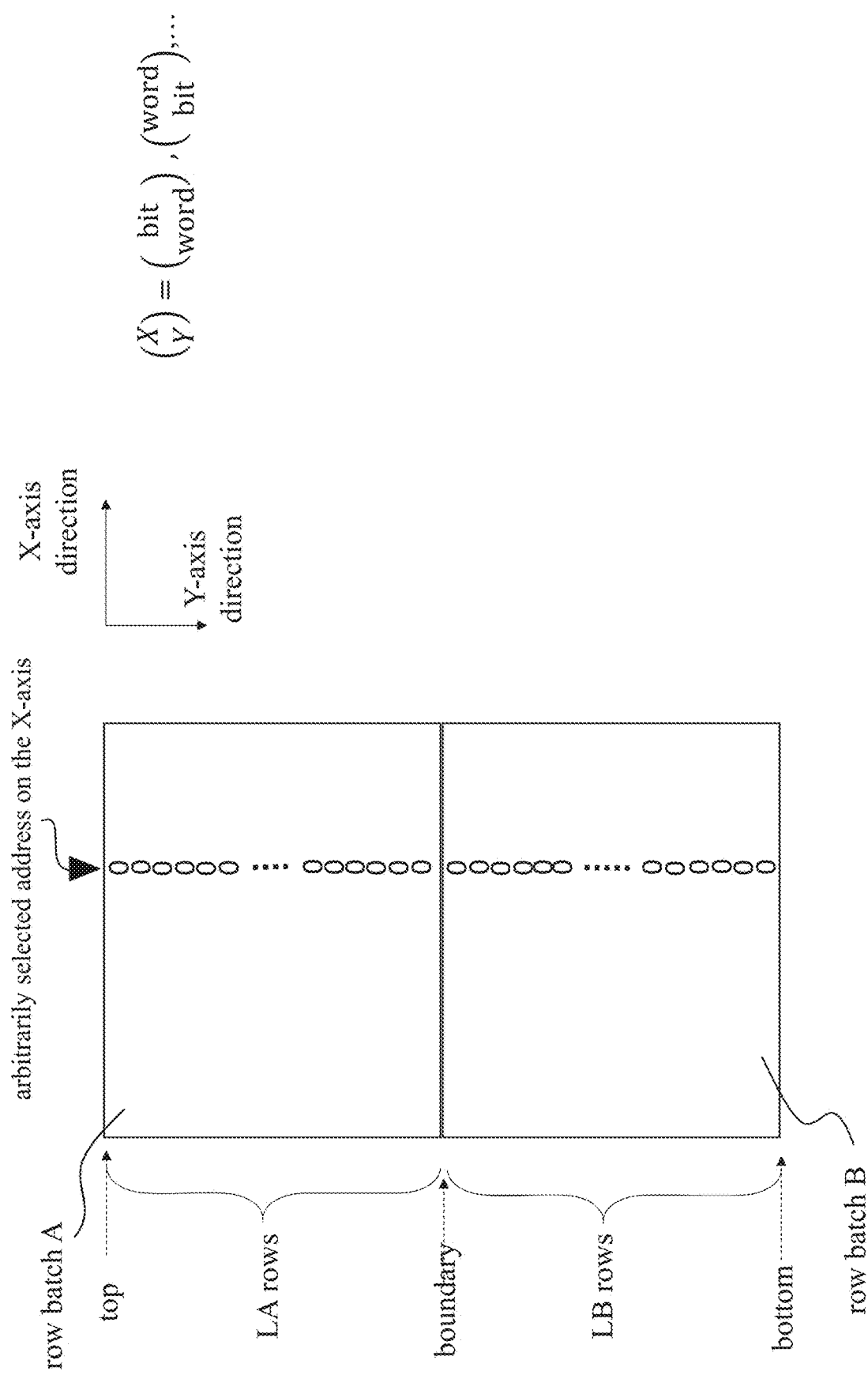
FIG. 72 shows an example in which all cells accessed with the test mode-1 are written with 0.
Figure 73:
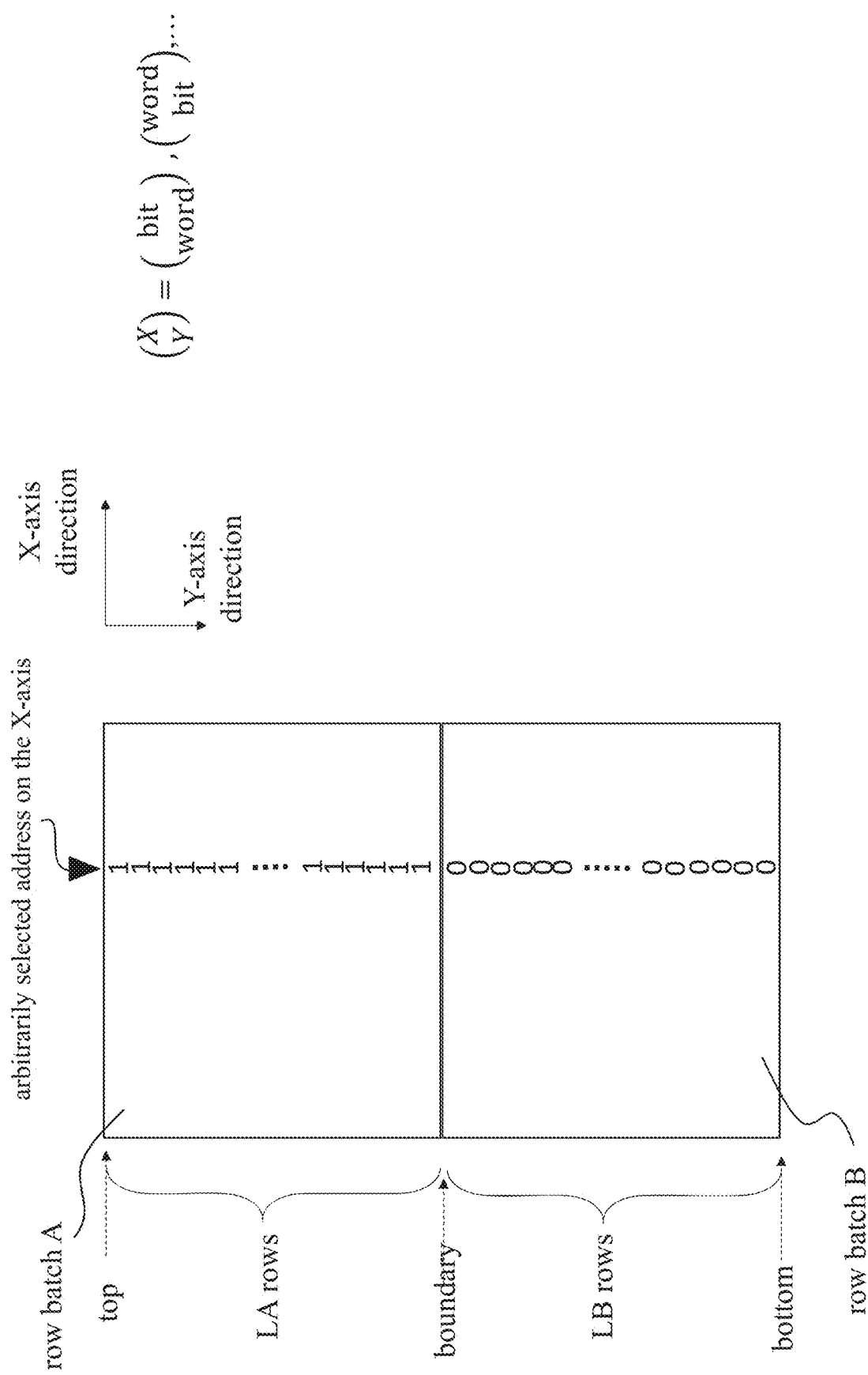
FIG. 73 shows an example in which all cells accessed with the test mode-1 are written with 1.

Firstly, as shown in FIG. 72, entering into the test mode-1, all of the memory cells to be linked along the Y-axis to an arbitrarily selected address on the X-axis (selected X) are written to be D (D=0 as an example of this figure). Subsequently as shown in FIG. 73, entering the test mode-2, all of the memory cells linked along the Y-axis to the selected X is written to be /D (/D=1 as an example of this figure).

Figure 74:
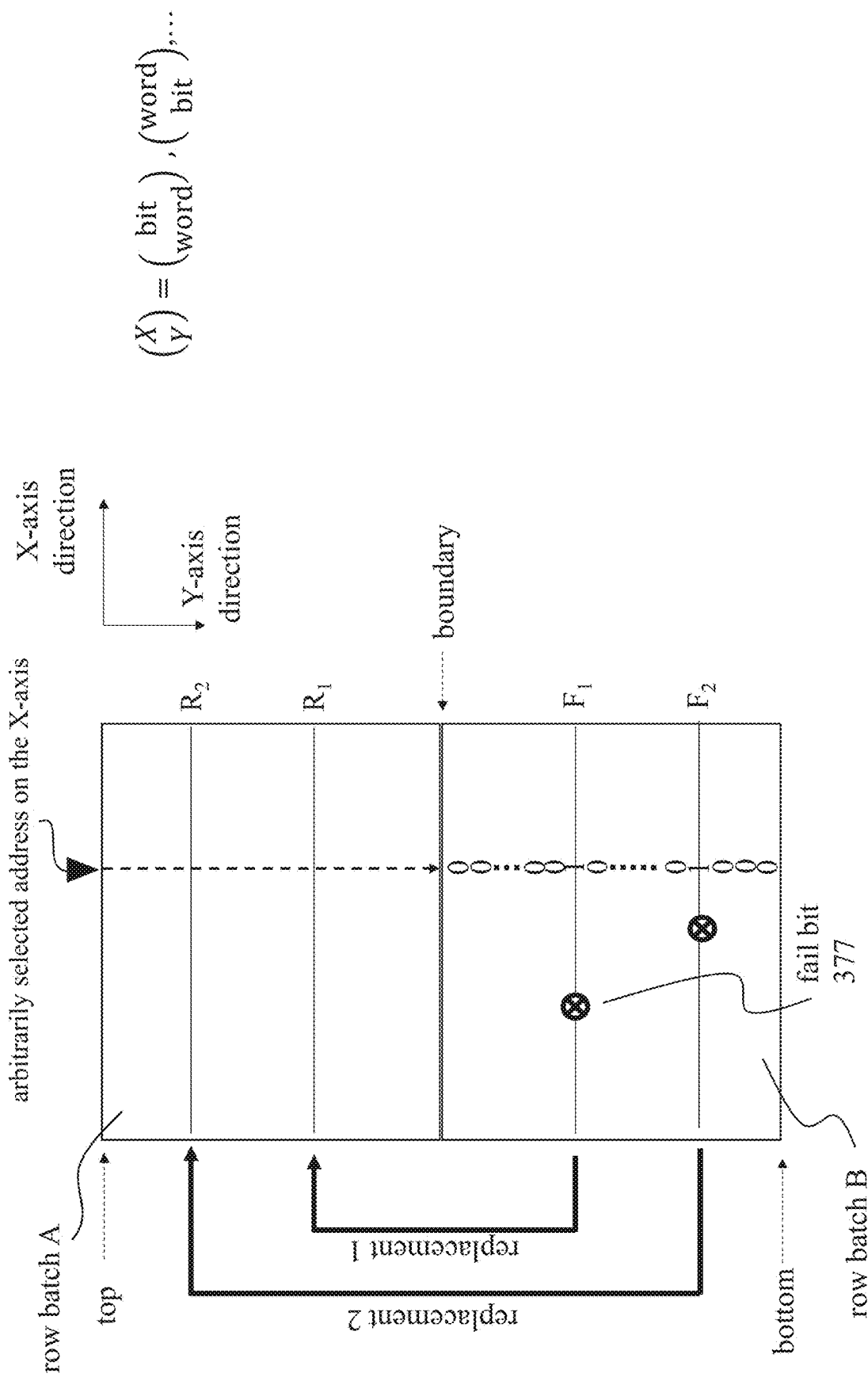
FIG. 74 shows an example in which the cells accessed with the normal access mode are read out.
Figure 75:
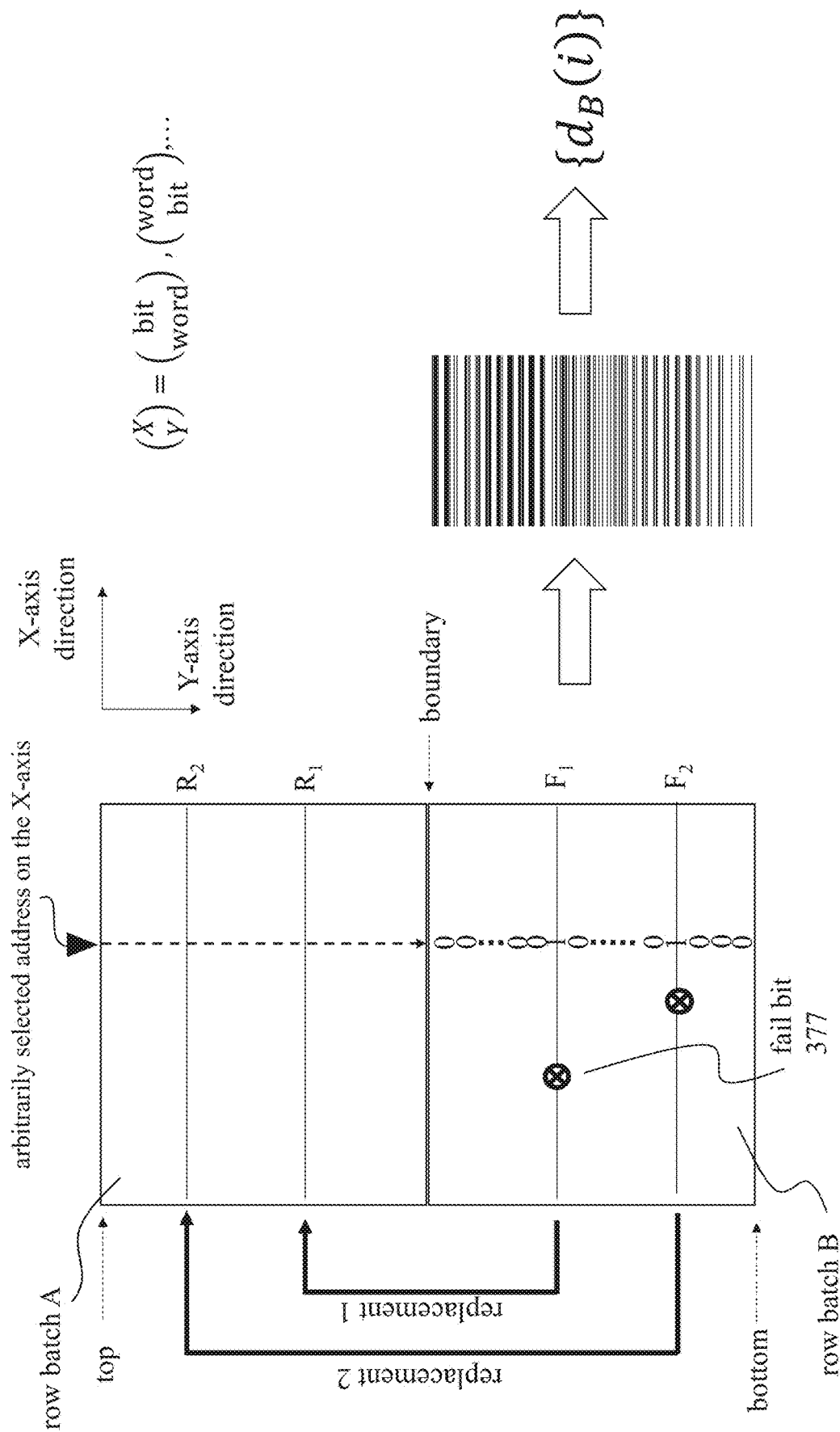
FIG. 75 shows an example in which data read and generated from the cells accessed with the normal access mode forms an output code.

Lastly, as shown in FIG. 74, entering the normal access mode, all of the memory cells linked to the selected X are read. Thus, the read result is /D (/D=1 in the example of this figure) only when accessing the memory cells with fail (the fail bits 377). Otherwise, the read result is D (D=0 in the example of this figure). It is noted that Y-axis address of cell with /D is Fi. Moreover, not shown in the drawings since it may be self-evident, it may be possible that D=1 and /D=0 in the above-mentioned example. Furthermore, not shown in the drawings since it may be self-evident, firstly, entering into the normal access mode, all of the memory cells linked along the Y-axis to the selected X is written to be D. Next, entering the test mode-2, all of the memory cells linked along the Y-axis to the selected X is written to be /D. Subsequently, returning back to the normal access mode and then searching all of the memory cells linked along the Y-axis to the selected X across the row batch B. The Y-axis addresses of those cells with /D is turned out to be Fi. Anyway, at last, by arranging D and /D according to those row numbers, the barcode type physical random number code {dB(i)} is obtained as shown in FIG. 75, where i is ranging from 1 to LB. The freedom of {dB(i)} is turned out to be the combination C(LB, m).

Subsequently, as pointed out in FIG. 65, the method dealing with the fail bits in the batch of redundant bit lines is described.

Figure 76:
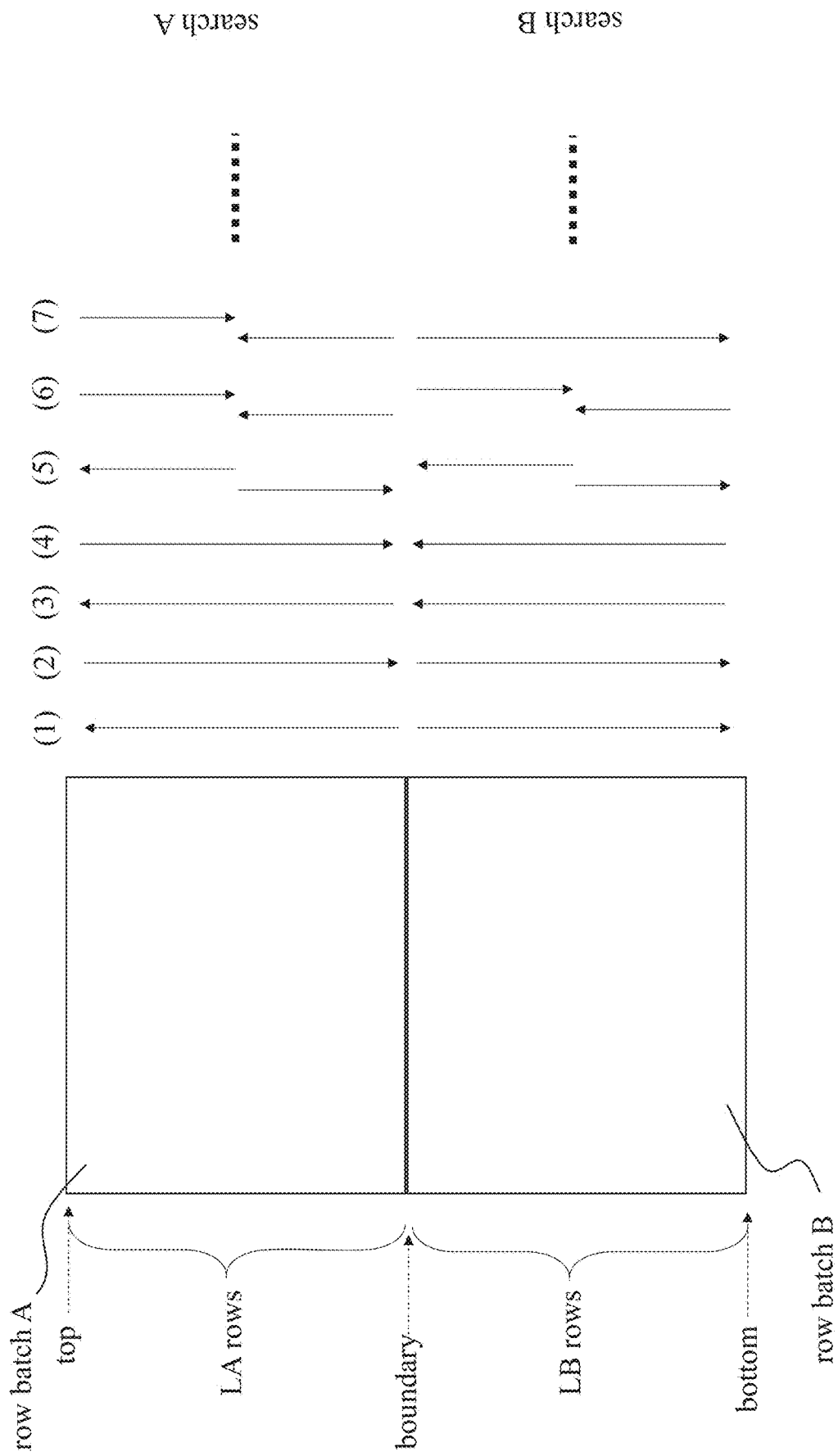
FIG. 76 shows a plurality of procedures to search the row batch A and the row batch B along the Y-axis direction.

FIG. 76 shows several examples of a search A and a search B to search the memory cells across the row batch A and the row batch B along the Y-axis. In the searching order (1), the row batch A and the row batch B are searched from the boundary therebetween to top and bottom, respectively. In the searching order (2), the both are searched from top to bottom, respectively. In the searching order (3), the both are searched from bottom to top, respectively. In the searching order (4), the both are searched from bottom and top to the boundary, respectively. In the searching order (5), the both are searched from the center to bottom and then from the center to top. The other description is omitted since they may be according to the figure.

Figure 77:
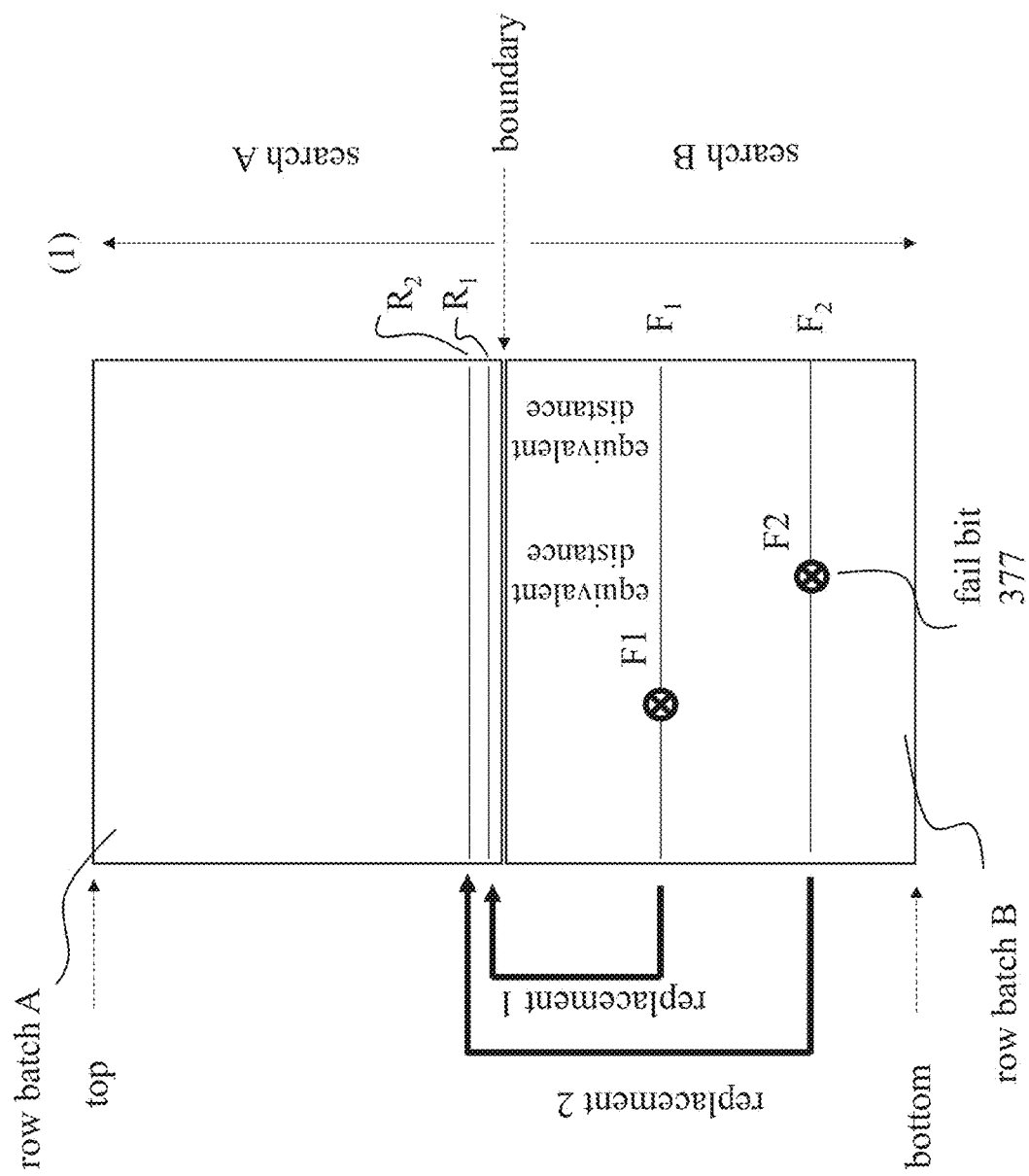
FIG. 77 shows an example of methods to replace a row line including a fail bit in the row batch B with a certain row line in the row batch A.

As an example, firstly, the searching order (1) is selected like FIG. 77. Thus, the row batch B is searched from the boundary to bottom according to the search B. The first row number including the first hit fail bit is F1. Subsequently, searching the row batch A from the boundary to top according to the search A and then corresponding to the row number of the first row from the boundary, R1, to F1, the set (F1, R1) is generated. Subsequently, returning back to the row batch B, the search B is continued from the row number F1. Suppose that a second fail bit is hit at the row number F2. Corresponding to the second row number in the row batch A according to the search A, R2, to F2, the set (F2, R2) is generated. By repeating this procedure, a plurality of sets of (Fi, Ri) is generated, where i is a natural number ranging from 1 to mB.

Figure 78:
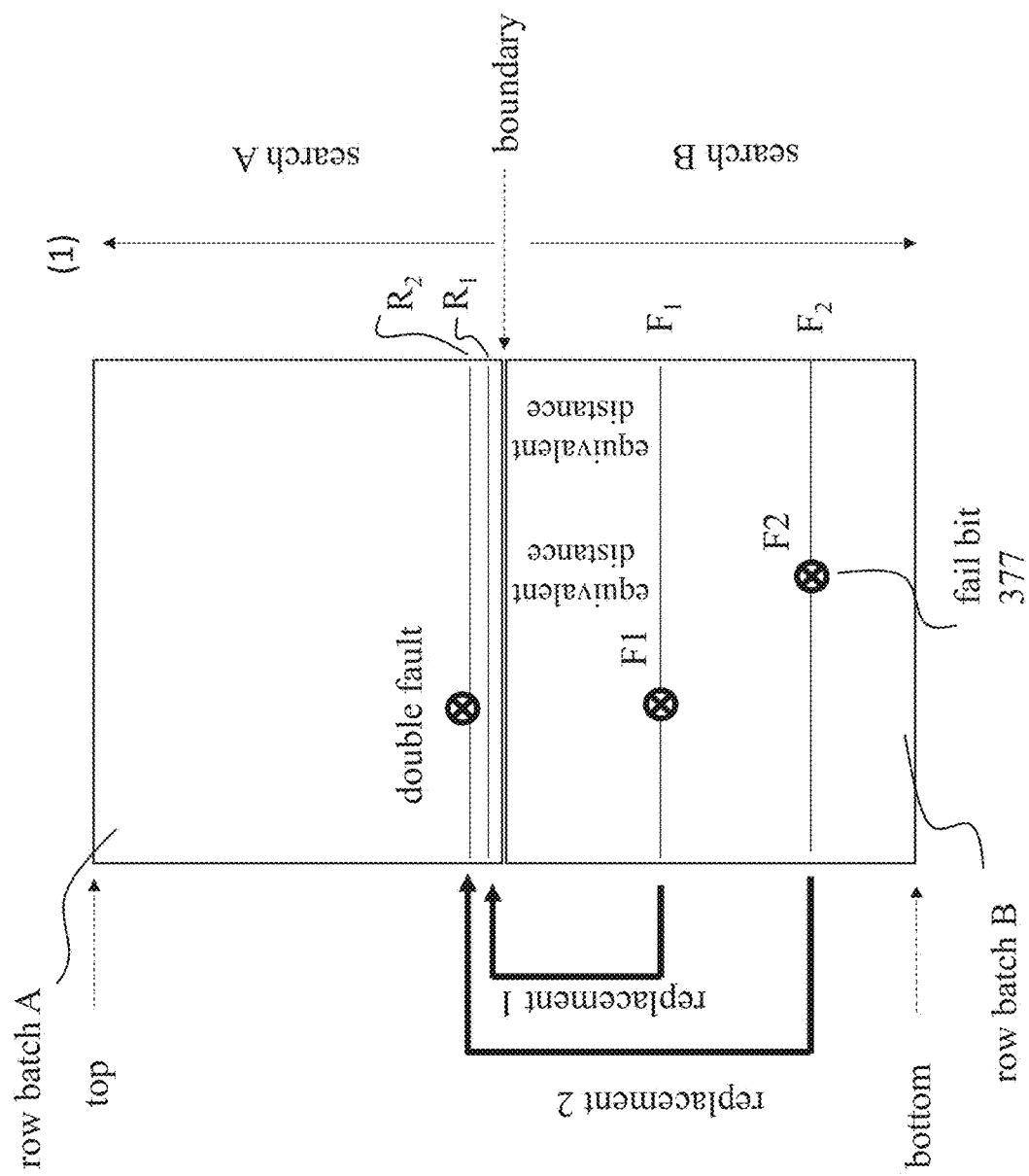
FIG. 78 shows an example in which the row to replace a row including a fail bit in the row batch B accidentally also include another fail bit in the row batch A.
Figure 79:
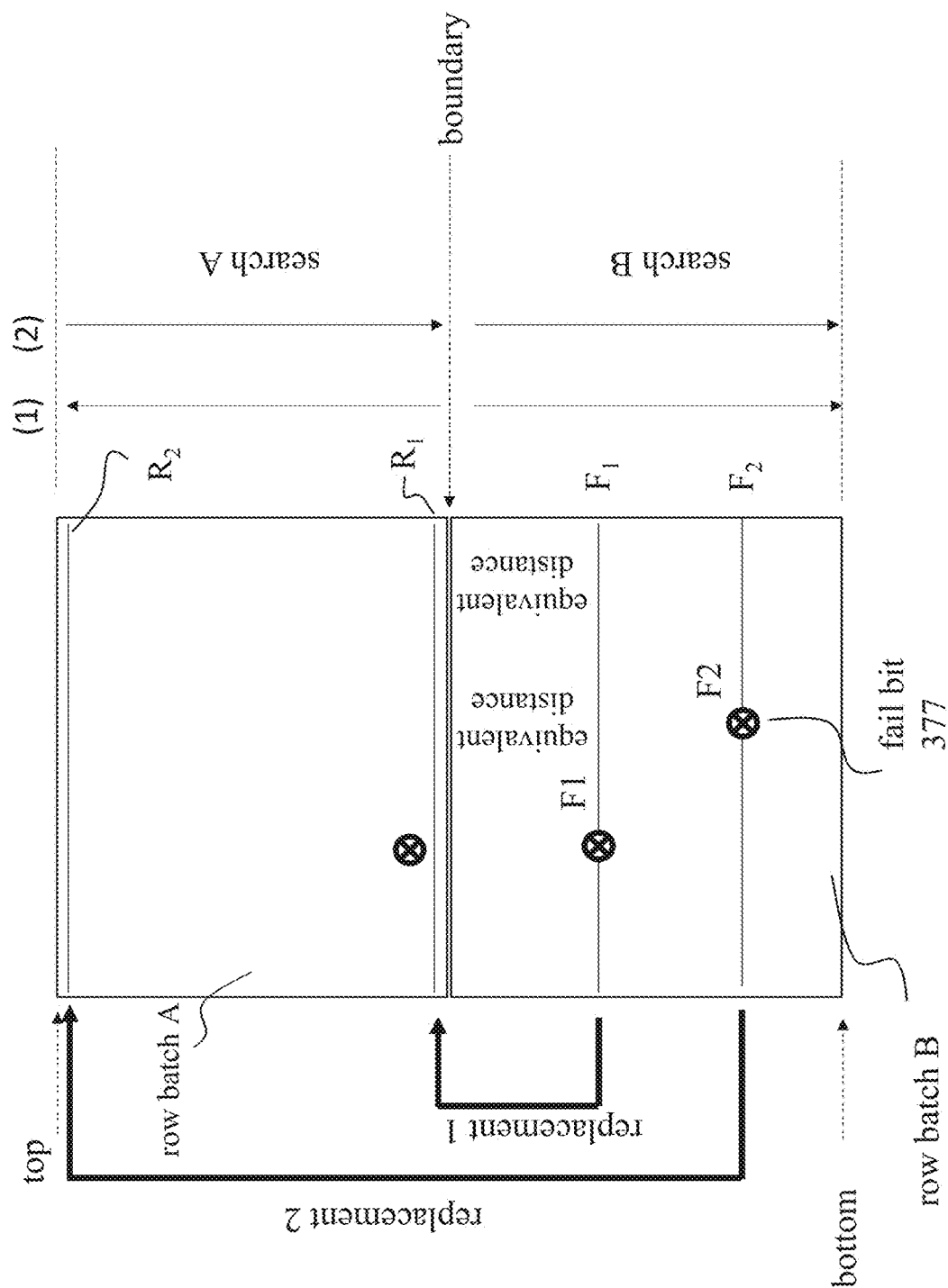
FIG. 79 shows an example of methods to avoid the replacement of a row line including a fail bit in the row batch B with a row line including another fail bit in the row batch A while changing the procedure to search the row batches A and B along the Y-axis direction.

However, the rows selected according to the searching order (1) in the row batch A may also involve fail bits. As an example in FIG. 78, suppose that a fail bit occurs on the row at the row number R2. Thus, as shown in FIG. 79, the R2 can be searched from the top if the searching order is changed from (1) to (2). If the corresponding row has no fail bit, this may be regarded as a new R2. Otherwise, the searching order is revised again to (5), for example. Otherwise, another searching order may be further selected such as (6), (7) . . . . However, a searching order includes a different search A from the search A including the searching orders (1) and (2).

If the plurality of (Fi, Ri) is finally defined, it may be recorded as a special code in the special inner memory 609. However, this execution should be completed in the process of inspection before the assembly.

Figure 80:
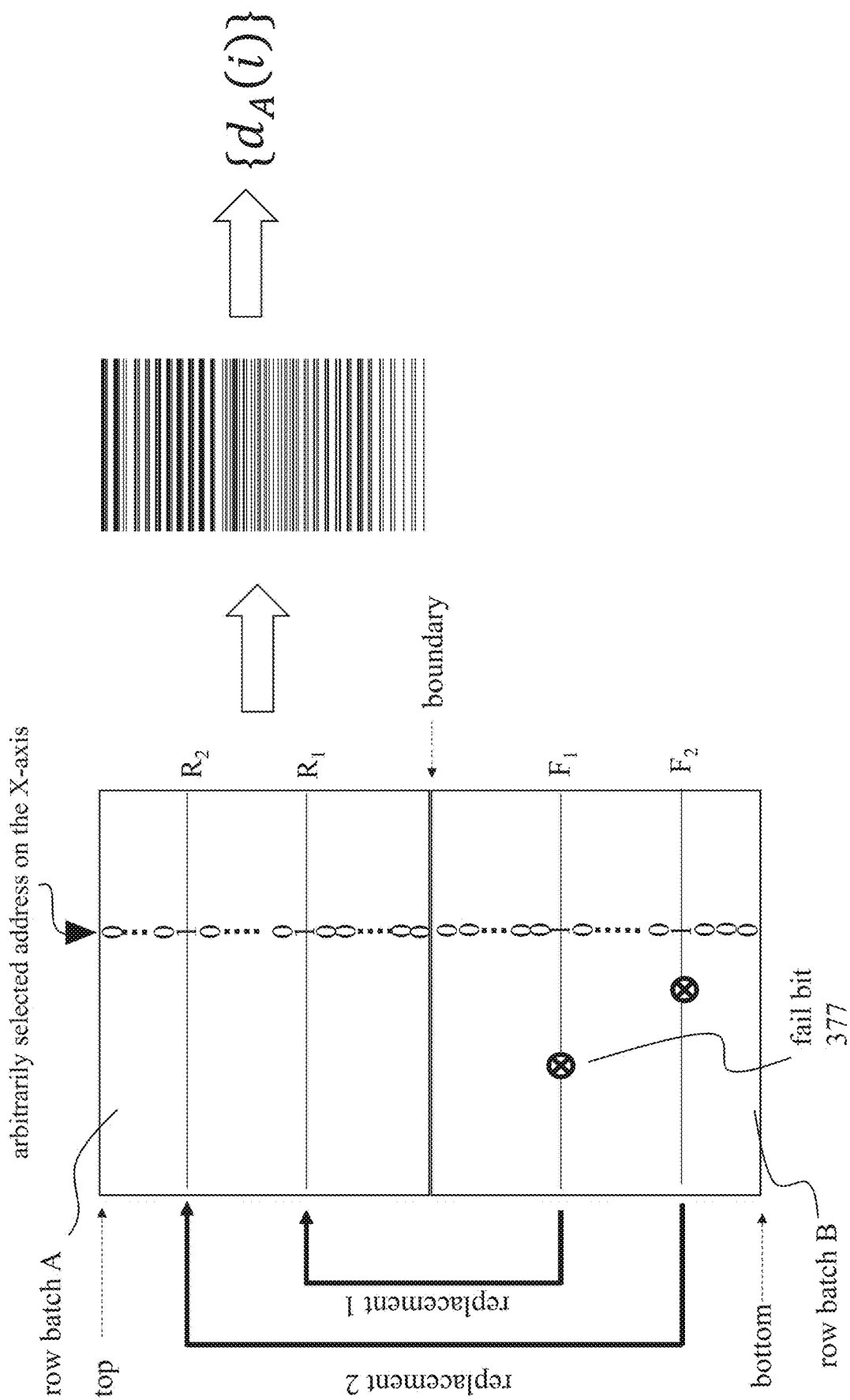
FIG. 80 shows an example of methods to generate a portion of output code from the row batch A.

FIG. 80 shows an example of method to extract a row number of row to be used for the replacement among the row batch A. Firstly, the (Fi, Ri) stored in the special inner memory in the peripheral circuit may be revised to (Ri, Fi). Subsequently, the row batch A and row batch B are replaced. Specifically, the access to the Y-decoder A and the access to the Y-decoder B may be exchanged. The following processes may be repeated in a way similar to the processes to extract {dB(i)}. Thus, it may be also able to extract physical random number code {dA(i)} from the row batch A. However, i is a natural number ranging from 1 to LA.

Figure 81:
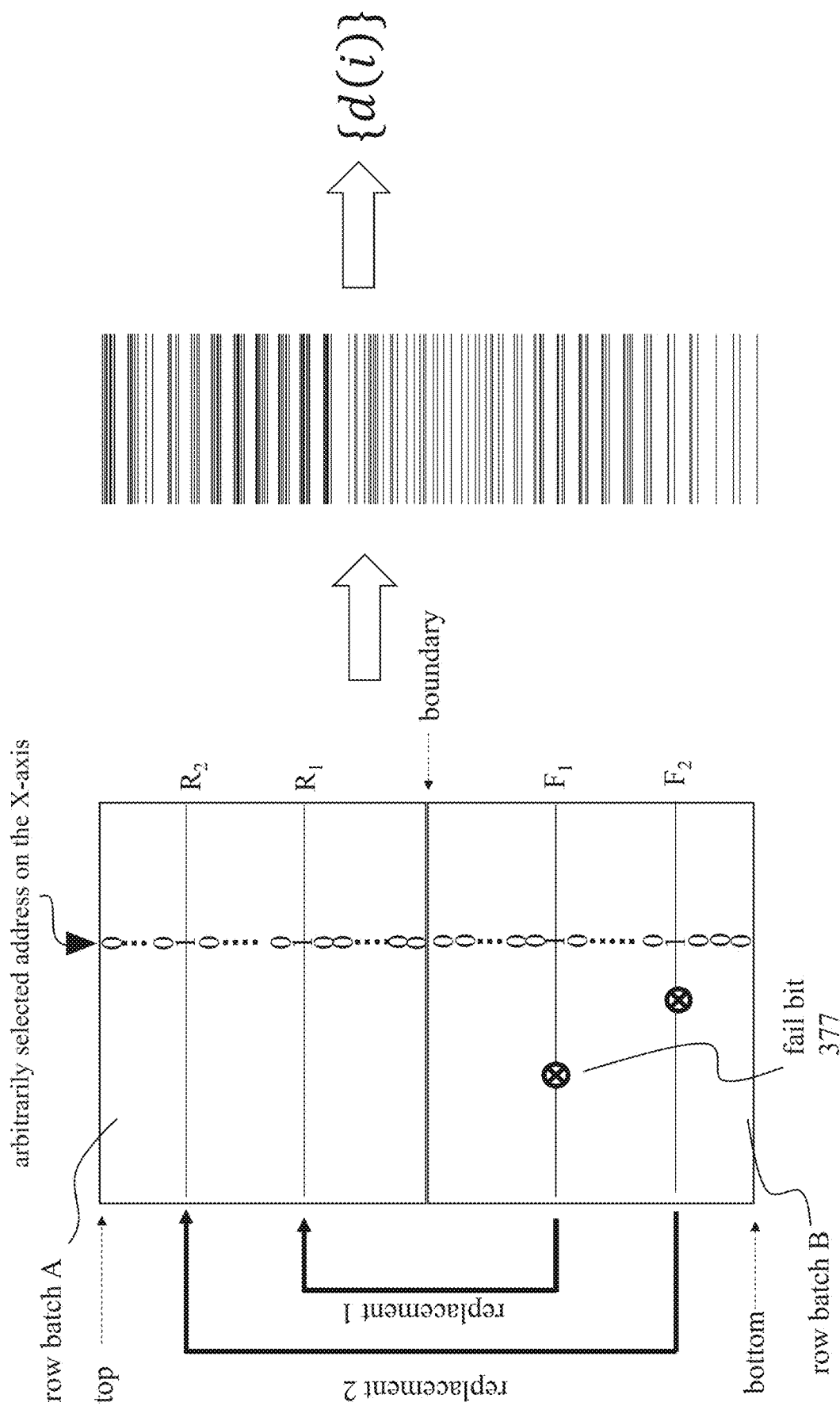
FIG. 81 shows an example of methods to generate output code from the row batches A and B.

FIG. 81 shows an example in which the physical random number code {d(i)} is generated from both the row batch A and the row batch B. The number of cases is calculated with C(LA−mA, mB)×C(LB, mB), where mA is the number of rows having fail bits in the row batch A and i is a natural number ranging from 1 to LA+LB.

The (Fi, Ri) generated like this may be stored in the special inner memory 609 set up in the peripheral area of mass-product memory chip. The bit capacity necessary to store (Fi, Ri) with i being ranging from 1 to mB or 1 to mA+mB is not so large. For example, in the case of 4 Gbits DRAM, the number of all of the redundant bit lines is 153,000. As long as it is a mass-product, the mB should be much smaller than 153,000. The mA is further much smaller than mB. Thus, the special inner memory 609 can be covered by a small bit capacity non-volatile memory such as fuse memory and so forth.

Accordingly, it may be able to extract the physical random number code from (Fi, Ri) stored in the special inner memory 609. It can be represented by equation (4) as follows:

$$d(i)=f(F_i, R_i) \quad \text{Equation 4}$$

The function f is an arbitrary function. For example, if a memory unit is composed of two bytes, the Fi is recorded in the left half of the memory unit and the Ri in the right half. However, the address of every memory unit is i, where i is a natural number ranging from 1 to mB or mA+mB. Alternatively, in another example, the Ri is a dummy while i is stored in the left half of the memory unit and the corresponding Fi is stored in the right half of the memory unit. Moreover, it may be sufficient to just line up Fi in the order of i. However, i is numbered in the order of finding the row numbers with fail bits according to the searching order.

Anyway, as long as an arbitrary function f is defined appropriately, the physical random number code in FIGS. 31 and 41 may be replaced by the sequence {d(i)} to be configured by d(i) in the equation (4). Thus, FIG. 31 showing the concept of the operation of the identification device 600 may be revised to FIG. 82, for example. The detailed description may be omitted since it is almost identical to that of FIG. 31. On the other hand, FIG. 34 showing the concept of the scrambler 890 may be, for example, similar to FIG. 83 with a scrambler 604. The detailed description may be omitted since it is almost identical to that of FIG. 34.

Similarly, it may be sufficient that the random number generator 601 and the code generator 606 may be able to read a necessary data. Not shown in drawings since it may be self-evident, it may be able to add a peripheral circuit to read the data in the peripheral region of chip as necessary. Moreover, it may be possible that new fail bits occur during the repeated usage of the chip. Then, it may be also able to add the address information of those newly found fail bits to the special inner memory 609 by occasionally searching fail bits during the usage of the chip. By doing so, it may be able to revise the physical random number specific to every chip with keeping its initial property while repeating the usage of the chip.

Figure 84:
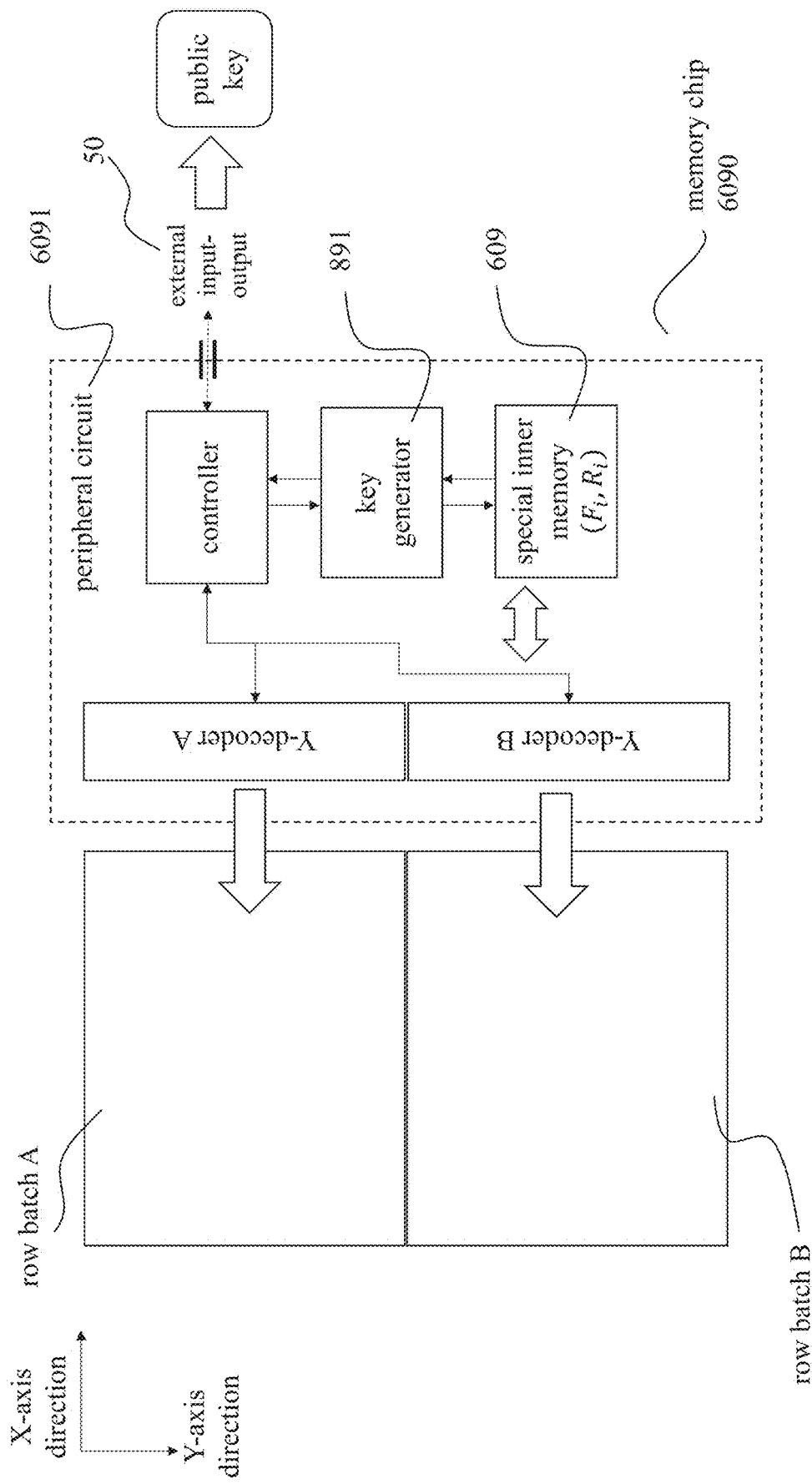
FIG. 84 shows an example in which the peripheral circuit includes the key generator.

FIG. 84 shows the essential configuration of the memory chip 6090 related to the present embodiment, in which the distribution of the memory cell array and the peripheral circuit 6091 is shown. The combination of (Fi, Ri) to be generated according to the distribution of fail bits physically randomly occurring on the memory cell array may be recorded in the special inner memory 609. This combination may be extracted (or read out) as physical random number code {d(i)} according to the equation (4). This random number code {d(i)} may be input to the key generator 891. The response (output) from the key generator 891 may be exported as public key to the external of the memory chip 6090 via the external input-output 50.

Figure 85:
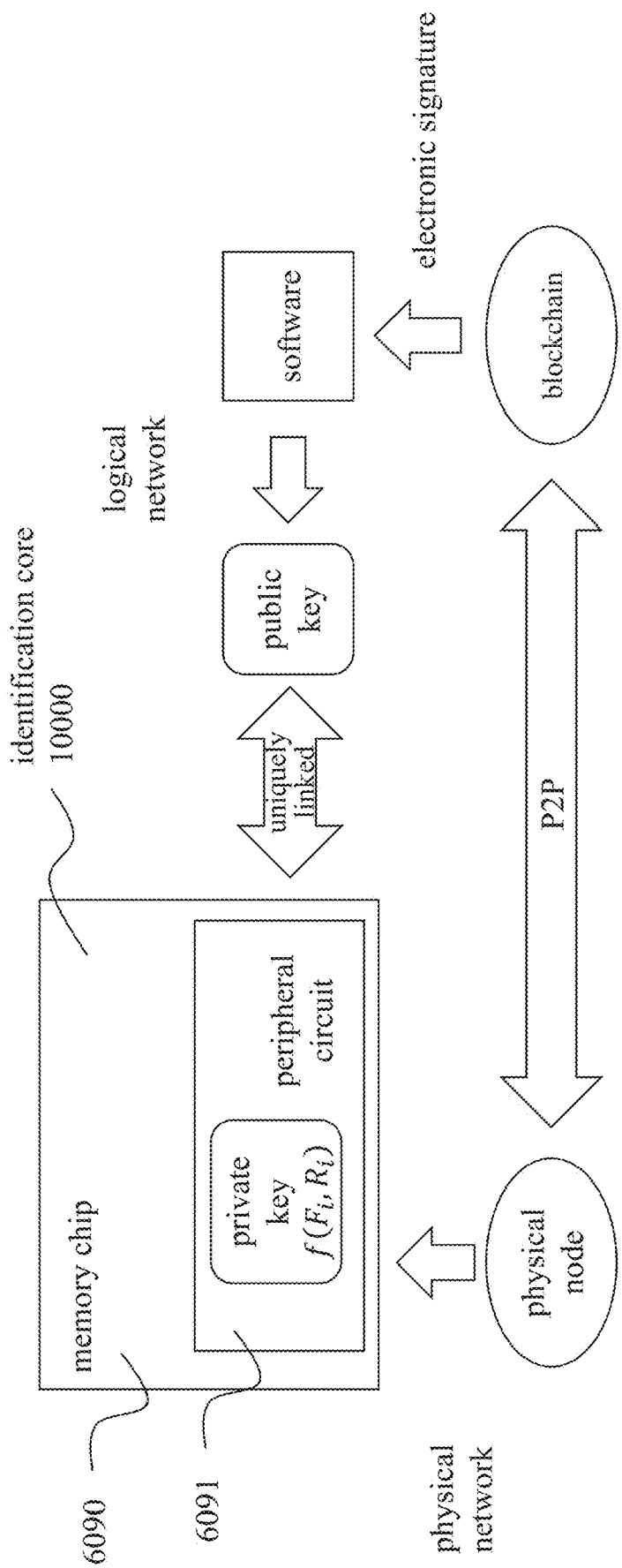
FIG. 85 shows the concept of the connection method to uniquely link logical network and physical network by using the identification core of the present disclosure together with blockchain.

If the memory chip 6090 shown in FIG. 84 is construed as the identification core 10000 to replace the hardware in FIG. 26, FIG. 85 is obtained. The physical random number code {d(i)} is acquired from the combination (Fi, Ri) to be generated with regard to the distribution of fail bits occurring physically randomly on the memory cell array of the memory chip 6090 according to the equation (4). The random number code {d(i)} may be input to the key generator 891 in the peripheral circuit 6091 as private key specific to the memory chip 6090. The response (output) from the key generator 891 may be exported as public key to the external of the identification core 10000. Here, the private key and the public key are uniquely linked.

The private key plays a role of the physical address of the hardware including the memory chip 6090. It is confined within the memory chip 6090 not to be exported to the external. Thus, "invisible physical address" is obtained.

The output public key plays a role of the address on the logical network (logical address). Thus, the logical network configured by software and the physical network configured by hardware are linked by the "invisible physical address" and the logical address. If the transaction between the logical nodes having the logical addresses is administrated by a public ledger which blockchain represents, the Internet-of-Things (IoT) may be configured safe.

Here, the blockchain is merely an example of the public ledger systems. A weak point is that the average transaction time for the registration is 10 minutes. Even if the blockchain is replaced by a new public ledger system of which convenience is enhanced with the average registration time being less than 10 minutes, the essence of the present disclosure is unchangeable. Otherwise, even if the blockchain is replaced by another public ledger system due to a different reason or circumstance, the essence of the present disclosure is unchangeable.

It is because the essence of the present disclosure is, as shown in FIG. 27, to insert the identification layer between the datalink layer and the physical layer, and the logical address and the "invisible physical address" are uniquely linked in the identification layer. As shown in the communication hierarchy of FIG. 2, even if the blockchain above the datalink layer is replaced by another public ledger system, the introduction method of the present disclosure existing below the datalink layer is not influenced at all.

On the contrary, it is unnecessary to make any change on the public ledger system such as blockchain and the configuration of applications built thereon, in order to introduce the identification device (identification core 10000) of the present disclosure.

Figure 2:
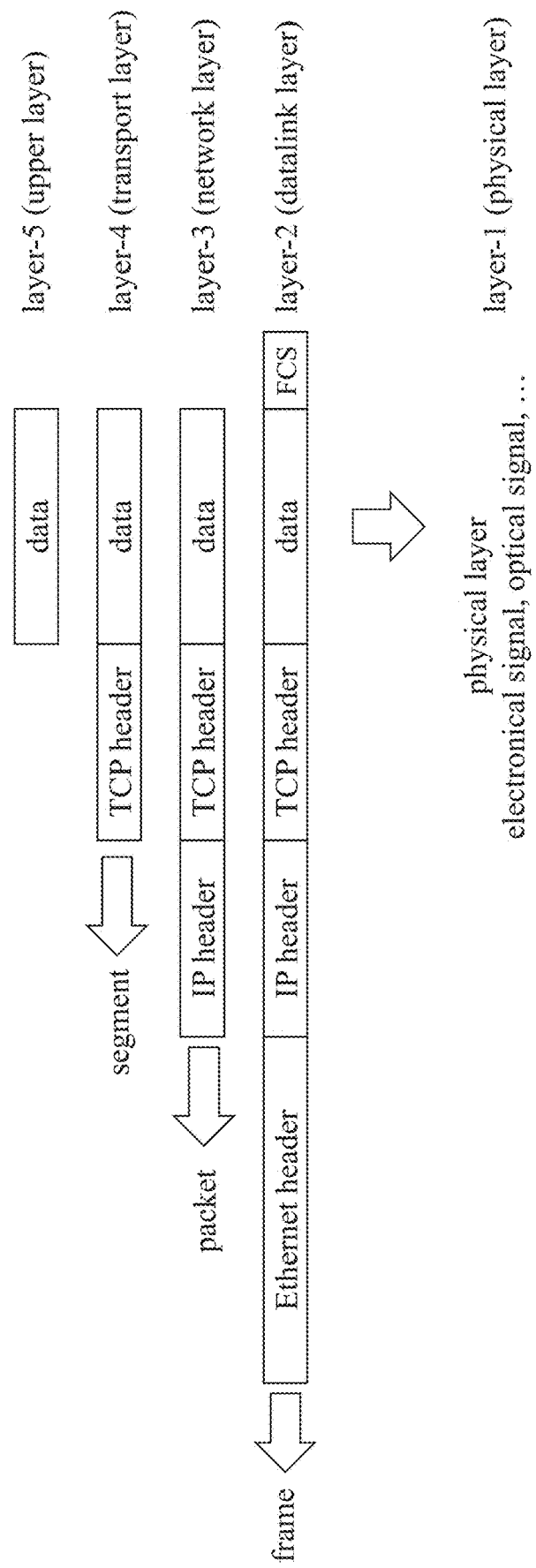
FIG. 2 is a diagrammatic view of the configuration of a communication hierarchy.
Figure 3:
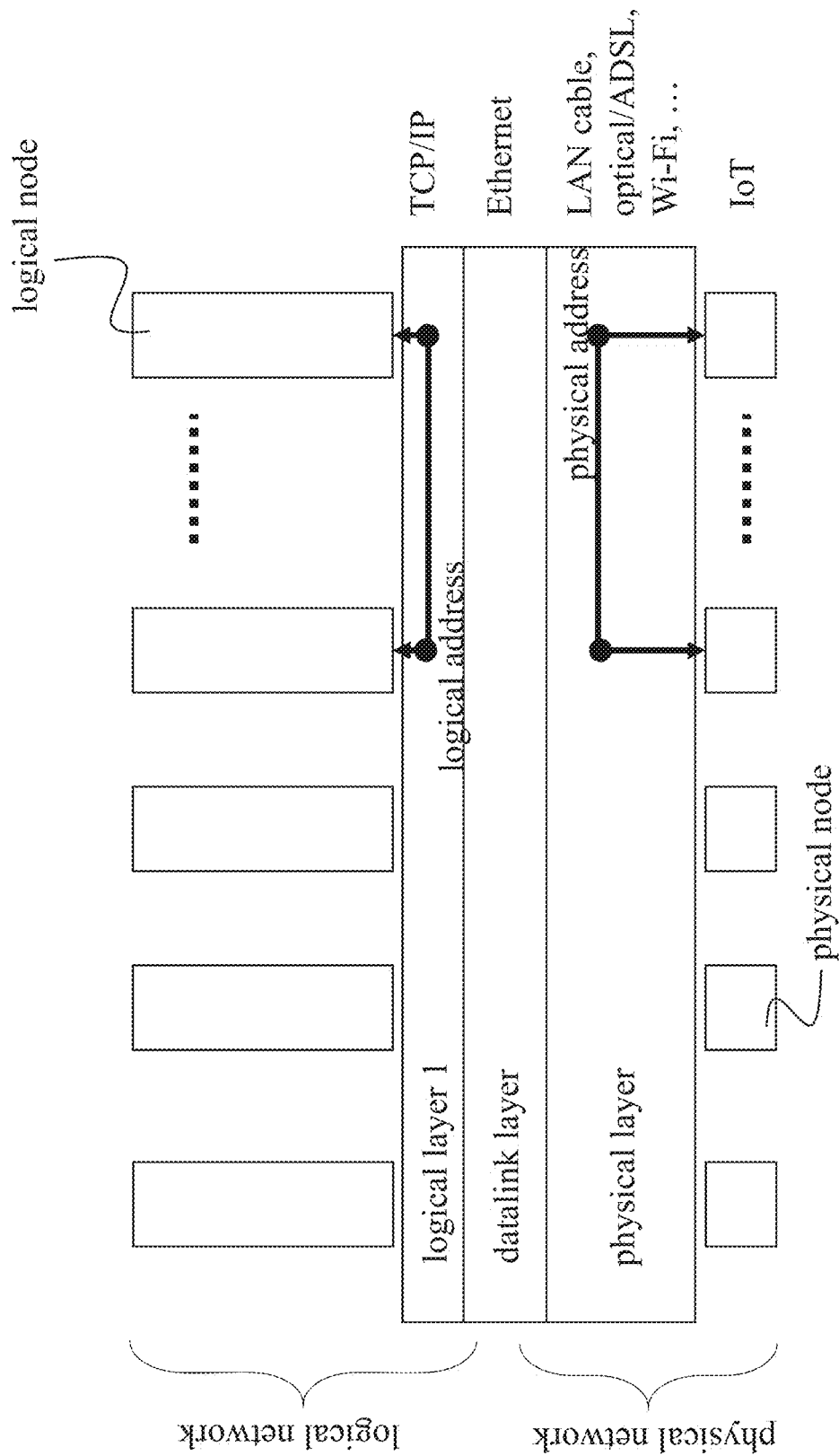
FIG. 3 shows the relationship between a logical network and a physical network.
Figure 4:
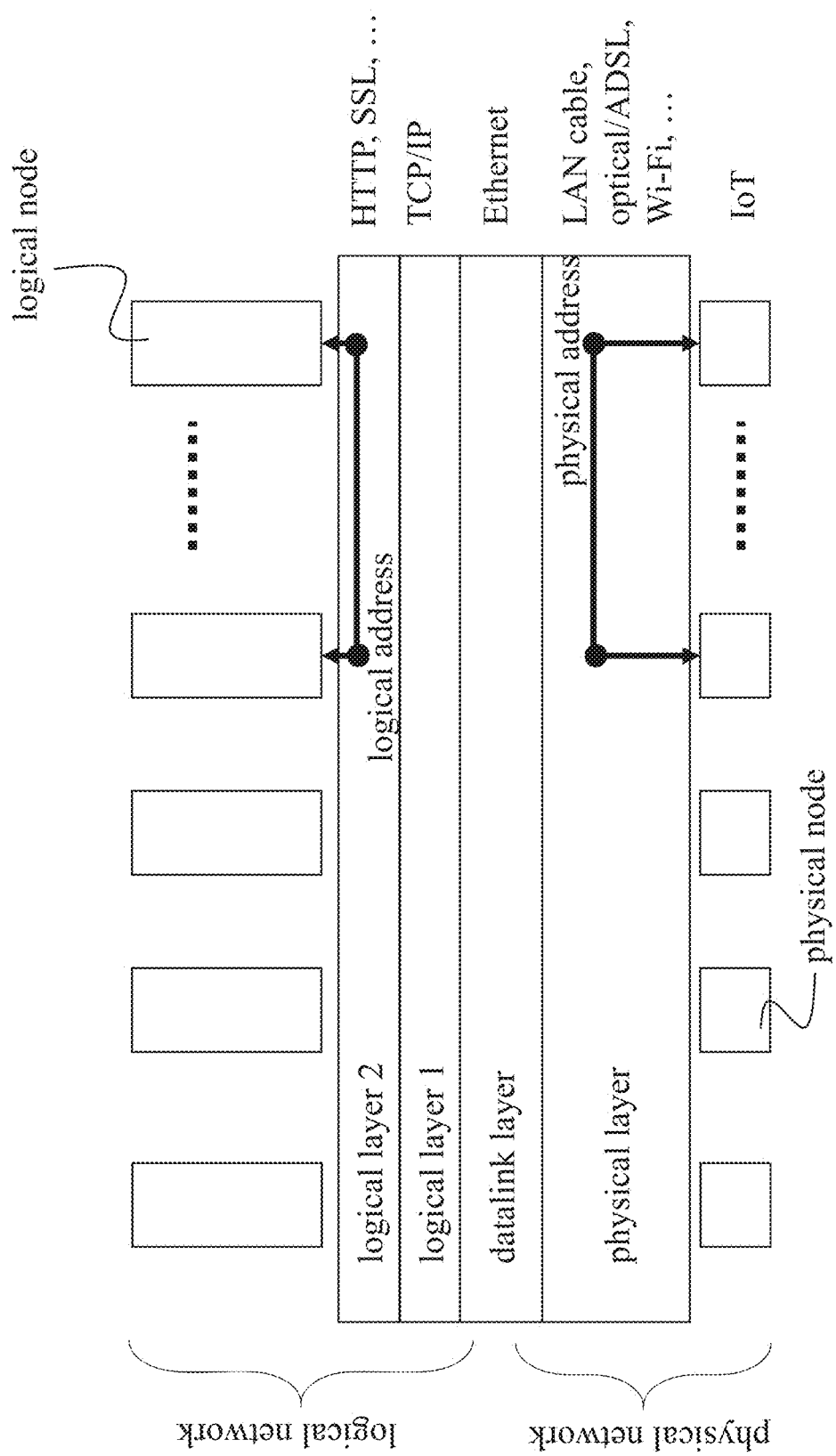
FIG. 4 shows the relationship between a logical network and a physical network.
Figure 5:
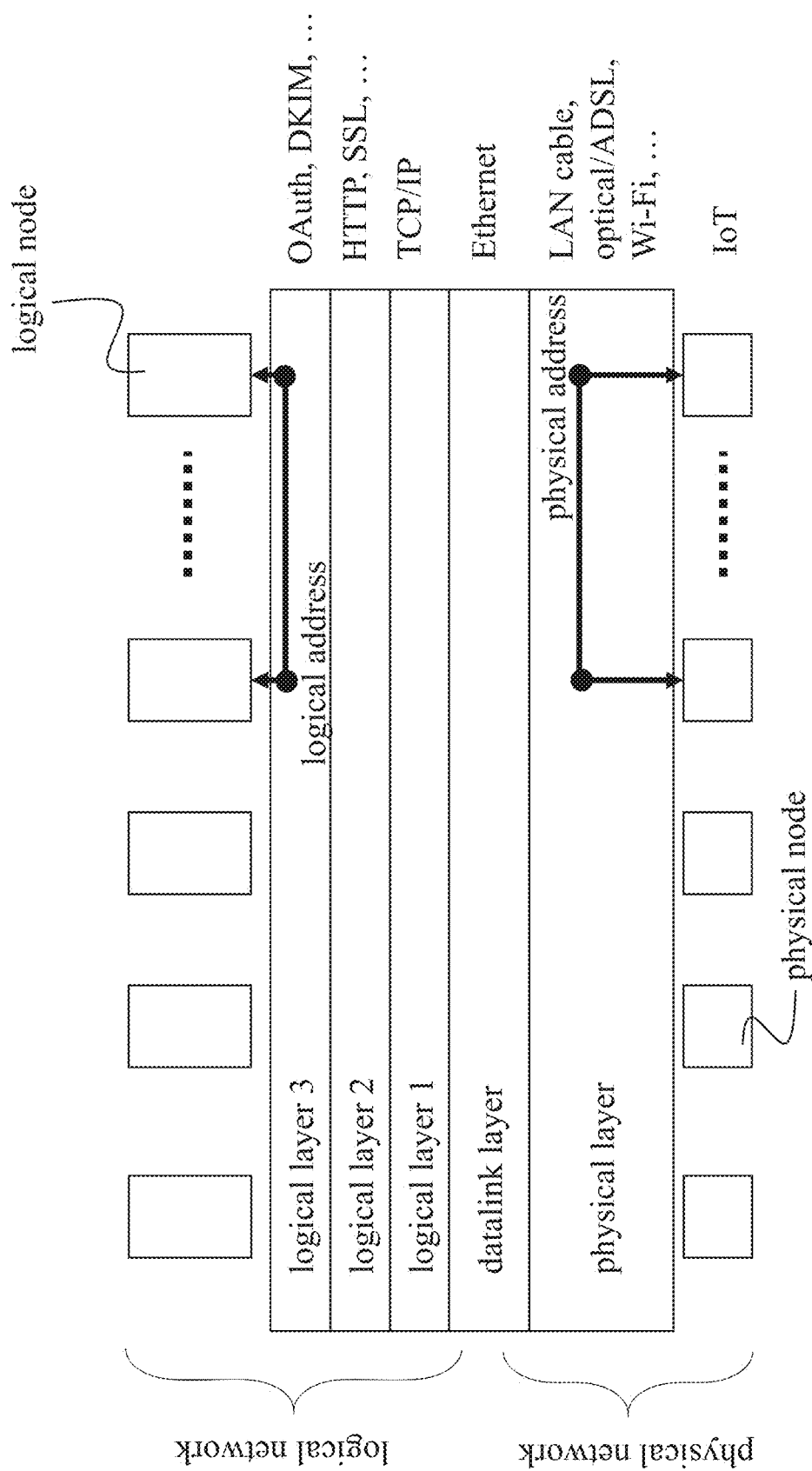
FIG. 5 shows the relationship between a logical network and a physical network.
Figure 6:
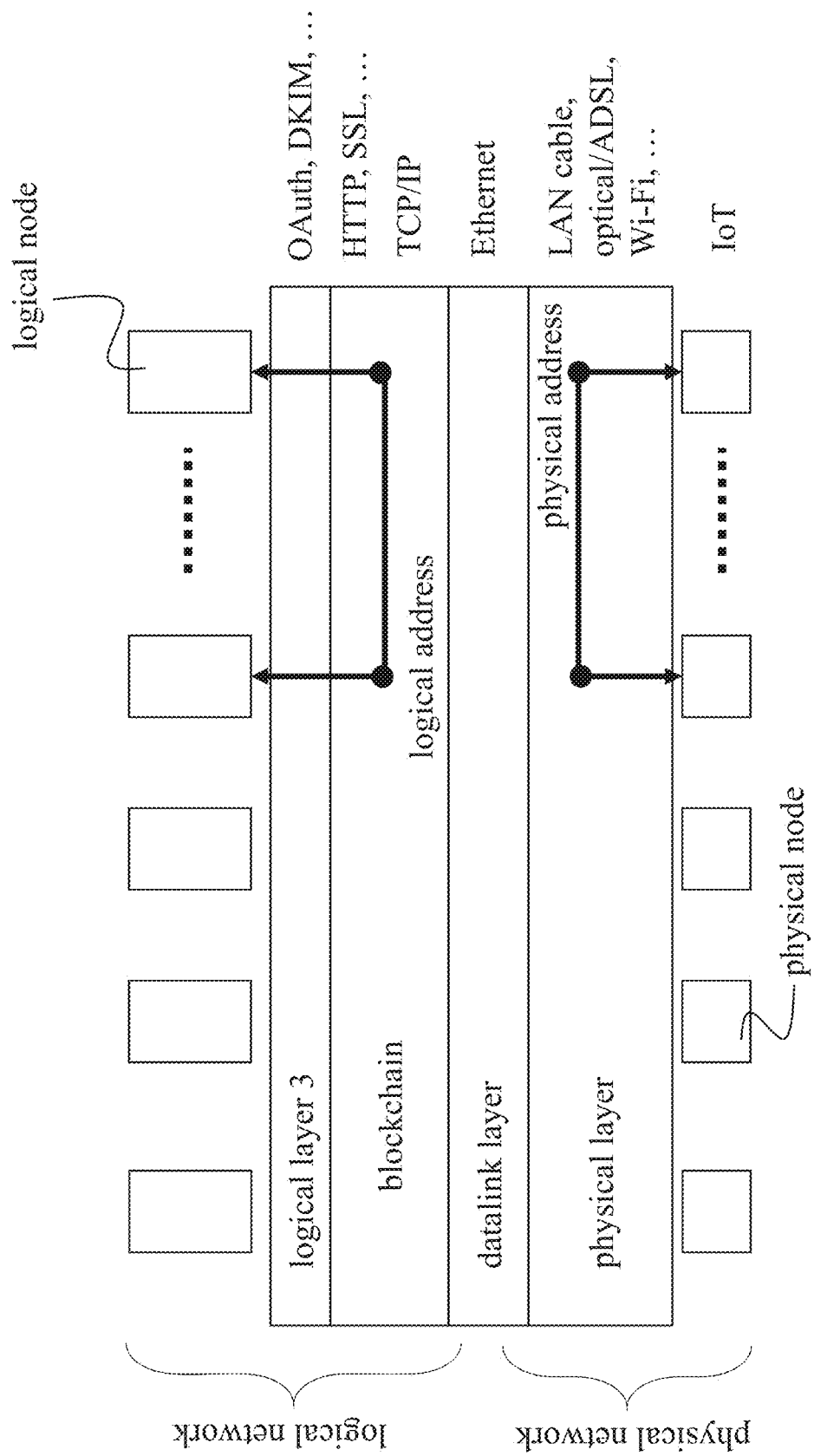
FIG. 6 shows the relationship between a logical network and a physical network.
Figure 7:
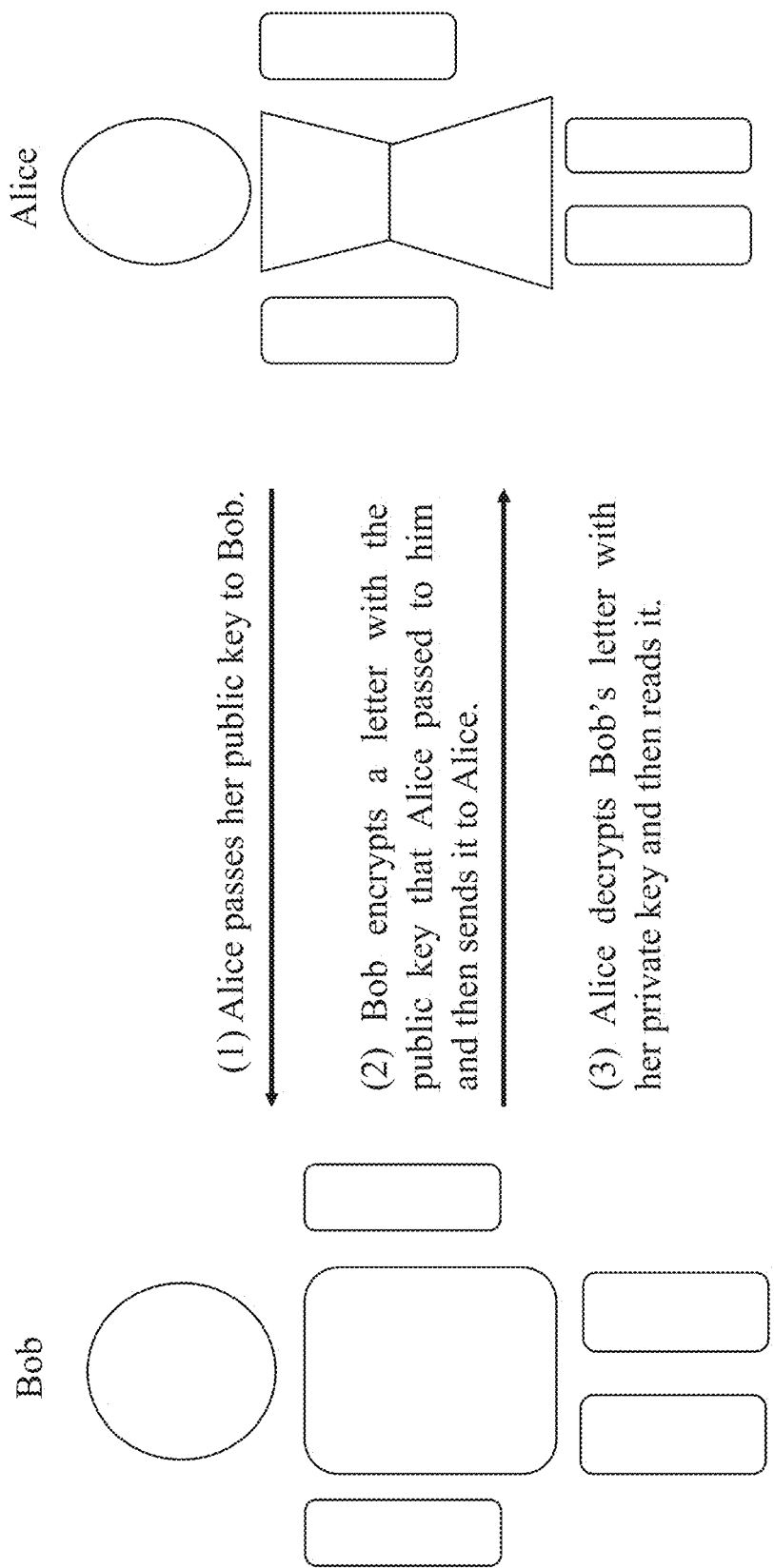

It is because the essence of the present disclosure is just to replace the hardware in FIG. 26 with the hardware to be equipped with the identification core of the present disclosure. More specifically, the memory chip equipped into the information apparatus 140 may be replaced with the memory chip 6090 in FIG. 84. As illustrated in FIG. 2, the upper layers are free from any change to be made in lower layers. This is according to the design philosophy of the conventional communication hierarchy.

The memory chip 6090 in FIG. 84 is merely an example of the identification core 10000. In the case that this memory chip is DRAM, as shown in FIGS. 54 to 56, it may be stacked together with central operational unit (CPU) to form an identification core.

As long as CPU needs DRAM, the identification core 10000 using DRAM chip may be an optimum solution for realizing One-CPU-One-Vote.

Moreover, considering the operation of CPU, it is unnecessary to concern if a private key is extracted from the register during the code generation. It is, as shown in FIG. 84, because the special inner memory 609 stores data (Fi, Ri) underlying the physical random number code {d(i)} to generate a private key. Usually mass-product memory chip has no wiring to access the special inner memory 609.

The data (Fi, Ri) extracted from the inside of the peripheral circuit 6091 in a method as illustrated in FIGS. 70 to 81 is directly input to the key generator 891. The key generator 891 forwards only the public key to the controller inside the peripheral circuit 6091. The controller outputs only the public key to the external via the external input-output.

Accordingly, it is possible to neither steal nor counterfeit the private key unless disassembling the memory chip 6090. By doing so, the identification core 10000 related to the present disclosure can provide "uneditable and uncopiable physical address generated physically randomly and specific to the chip" without disassembling the chip.

Accordingly, it is impossible to steal a private key from CPU during the code generation by the remote manipulation on the network.

Alternatively, as another example, as shown in FIGS. 58 to 59, the key generator is set up in the external of the first chip 110 (memory chip 6090 in the present embodiment). In this case, it is actually impossible to steal the private key from CPU during the code generation by the remote manipulation on the network with the reverse engineering.

It is because the register is a very small dynamic memory. For example, it is 32 bits or at most 64 bits in usual personal computers. The data (Fi, Ri) underlying the physical random number code to generate private key is much more than 64 bits in the bit capacity. However i is a natural number ranging from 1 to mB.

Here, suppose that every Fi or Ri spends 1 byte (8 bits). For example, in the case that mB is 1000, the required memory is more than 16 kbits. This means that the register memory is forced to decompose it into 250 segments and then those segments are iteratively stored in the register memory. The memory chip 6090 and CPU must successively exchange those 250 segments. Since the register area is overwritten during every update, it is actually impossible to steal the entire data (Fi, Ri) underlying the physical random number code {d(i)} by the remote manipulation even during the code generation.

In mass-product memory chip such as DRAM, the redundant bit lines batch or the redundant word lines batch and the fuse memory as the special inner memory 609 are set up in advance for the product control.

Like this, as long as the key generator 891 is set up in the external of chip, "Uneditable and uncopiable physical address generated physically randomly" related to the present disclosure may be provided without change in the mass-product memory chip. However, to execute the process in FIG. 81, it may be necessary that the external input includes a redundant code to indicate the test mode-1 and the test mode-2, similar to FIG. 67. Alternatively, in another example, it may be also able to design the peripheral circuit 6091 so as to complete the execution process inside the memory chip 6090 by recording the execution code therein.

Anyway, the identification cell 977 related to the present disclosure may be any kind of electron devices or its parts to be mass-producible in general semiconductor manufacturing process such as resistors, capacitors, Schottky junctions, PN junctions, transistors, MROM cells, DRAM cells, floating gate transistors, phase change memory cells, magnetic resistive memory cells and so forth. Otherwise, specially designed nanostructures may also be applicable.

In the case that the identification cells 977 are probabilistically broken, high voltage or electric stress may be applied. Thus, it may be possible to select all of the addresses on the chip or a part of the addresses as necessary to apply breaking pulse voltage. Anyway, it may be able to generate "Uneditable and uncopiable physical address generated physically randomly and specific to chip" from the cell array in which the identification cells are physically randomly broken.

Alternatively, in another example, as mentioned above, it may be also able to generate "Uneditable and uncopiable physical address generated physically randomly and specific to chip" by using fail bits to occur by chance in the manufacturing process.

In the case that an independent input is selected to input to the identification device, additional merits may be obtained, which are: (1) Even though a node (an information terminal such as PC, tablet and so forth) is shared by colleagues and family, every user can actually own an independent wallet as long as he uses a different input independent from the others independently, and (2) Even though a node (mobile information terminal such as smart phone, tablet and so forth) is passed into another's hand due to theft or loss, it is possible to avoid the theft of the wallet unless the person obtaining the node simultaneously obtains an independent input, since a different input to the identification device forms a different wallet.

It may be sufficient that the function f in the equation (4) just lines up the row numbers of rows having fail bits in the row batch B (Fi) by regarding the other parameter Ri as a dummy. In this case, the suffix i is numbered in the order of finding those row numbers according to the searching order.

According to the present disclosure, an identification core including an identification device specific to every semiconductor chip having physical substance may be linked to a logical address by the public encryption key, and then the networks of hardware and software are linked functionally with each other.

The method to link a semiconductor chip to a logical address is, more specifically, to confine a private key in the semiconductor chip with an identification device and then to make the logical address be a public key uniquely linked to the private key on the network.

The semiconductor chip related to the present disclosure may be preferred to be designed on the basis of mass-product memory chip.

Additionally, it may be able to let hardware and public ledger system represented by blockchain functionally cooperate in conjunction with electronic signature technology. As a result, the security and the reliability of network system may be excellently enhanced.

Moreover, not shown in the drawings since it may be self-evident, the identification controller to control the identification device related to the present disclosure may be able to also serve as the controller for the memory cell array of the memory chip, which exists together with the whole or a part of the identification device.

It may be able to provide an infrastructure of more secure and useful information technologies at cheaper cost with the present disclosure.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. An authenticated network comprising:
a logical network comprising a plurality of logical nodes;
a physical network comprising a plurality of physical nodes, wherein each of the plurality of physical nodes comprises an identification core, wherein each of the plurality of logical nodes is respectively linked to the identification core, wherein the identification core comprises at least one semiconductor chip intrinsically having a physical randomness, wherein the at least one semiconductor chip comprises a memory cell array and a peripheral region, wherein the memory cell array comprises a plurality of memory cells distributed according to a predetermined address format, wherein the physical randomness is generated as a combination of addresses of fail bits occurred due to a certain physical process in the memory cell array, is read with a predetermined method, and is recorded as an electronic information in a special inner memory included in the peripheral region of the at least one semiconductor chip; and
a physical random number code reflecting the physical randomness generated in response to the electronic information recorded in the special inner memory, wherein the identification core generates a private key based on the physical random number code and outputs a public key generated based on the private key with a key generator, wherein the public key serves as a logical address of one of the plurality of logical nodes linked to the identification core, wherein the private key serves as a physical address of one of the plurality of physical nodes, wherein the one of the plurality of logical nodes and the one of the plurality of physical nodes are uniquely linked by the private key and the public key, and wherein the private key is confined in the identification core,
wherein the combination of the addresses of the fail bits is acquired by utilizing an acquiring code of a special mode,
wherein the acquiring code of the special mode comprises the addresses of the fail bits, a plurality of access modes to select methods to access each of the plurality of memory cells in the memory cell array, and an operation mode to read,
wherein the plurality of memory cells is distributed at addresses according to the predetermined address format, wherein the addresses are distributed according to cross-points of rows and columns, which are respectively parallel to a X-axis direction and a Y-axis direction in the memory cell array on a semiconductor surface, wherein an aggregation of the addresses is divided into a first row batch and a second row batch along the Y-axis direction.

2. The authenticated network as claimed in claim 1, wherein the plurality of access modes comprises a first access mode, a second access mode, and a third access mode, wherein the first access mode is to access all of the memory cells along the Y-axis direction throughout the first and second row batches at an arbitrary selected address on the X-axis direction, wherein the second access mode is to access all of the memory cells along the Y-axis direction throughout the first row batch at the arbitrary selected address on the X-axis direction, and the third access mode is to access rows that do not include the fail bits in the second row batch and to access rows in the first row batch after re-allocating rows including the fail bits in the second row batch.

3. The authenticated network as claimed in claim 2, wherein firstly, all of the memory cells to be accessed in the first access mode are written with a first value, next, all of the memory cells to be accessed in the second access mode are written with a second value, and lastly, all of the memory cells to be accessed in the third access mode are read, and row numbers of the memory cells are lined up in an order of finding the second values and then recorded in the special inner memory, wherein the physical randomness is formed of a distribution of the fail bits among the plurality of memory cells.

4. The authenticated network as claimed in claim 1, wherein the plurality of access modes comprises a first access mode and a second access mode, wherein the first access mode is to access all of the memory cells along the Y-axis direction throughout the first row batch at an arbitrary selected address on the X-axis direction, wherein the second access mode is to access rows that do not include the fail bits in the second row batch and to access rows in the first row batch after re-allocating rows including the fail bits in the second row batch.

5. The authenticated network as claimed in claim 4, wherein firstly, all of the memory cells to be accessed in the second access mode are written with a first value, next, all of the memory cells to be accessed in the first access mode are written with a second value, and lastly, all of the memory cells to be accessed in the second access mode are read, and row numbers of the memory cells are lined up in an order of finding the second values and then recorded in the special inner memory, wherein the physical randomness is formed of a distribution of the fail bits among the plurality of memory cells.

6. The authenticated network as claimed in claim 1, wherein the identification core generates the private key based on the physical random number code and further based on an input code from an external of the identification core, wherein the identification core outputs the public key generated based on the private key and further based on the input code with a key generator.

7. The authenticated network as claimed in claim 6, wherein the input code is an independent input that a regular user of electronic apparatus comprising the identification core sets up arbitrarily.

8. The authenticated network as claimed in claim 7, wherein the independent input comprises a digital code information necessary to boot an application software operating on the authenticated network, wherein the digital code information comprises at least an information selected from a passcode, a pin code, a barcode and a Quick Response (QR) code.

9. The authenticated network as claimed in claim 7, wherein the independent input comprises a biological information necessary to boot an application software operating on the authenticated network, wherein the biological information comprises at least an information selected from fingerprint information, vein information, retina information and deoxyribonucleic (DNA) information of the regular user.

10. The authenticated network as claimed in claim 7, wherein the independent input comprises a personal information necessary to boot an application software operating on the authenticated network, wherein the personal information comprises at least an information selected from voice, picture and physical information extracted from and able to identify the regular user.

11. The authenticated network as claimed in claim 7, wherein the independent input comprises a digital code information that the regular user is required by an application software operating on the authenticated network as necessary, wherein the digital code information comprises at least an information selected from a passcode, a pin code, a barcode and a Quick Response (QR) code.

12. The authenticated network as claimed in claim 7, wherein the independent input comprises a biological information that the regular user is required by an application software operating on the authenticated network as necessary, wherein the biological information comprises at least an information selected from finger print information, vein information, retina information and deoxyribonucleic (DNA) information of the regular user.

13. The authenticated network as claimed in claim 7, wherein the independent input comprises a personal information that the regular user is required by an application software operating on the authenticated network as necessary, wherein the personal information comprises at least an information selected from voice, picture and physical information extracted from and able to identify the regular user.

14. The authenticated network as claimed in claim 7, wherein the independent input comprises a digital code information necessary to boot an information terminal installed with an application software operating on the authenticated network, wherein the digital code information comprises at least an information selected from a passcode, a pin code, a barcode and a Quick Response (QR) code.

15. The authenticated network as claimed in claim 7, wherein the independent input comprises a biological information necessary to boot an information terminal installed with an application software operating on the authenticated network, wherein the biological information comprises at least an information selected from finger print information, vein information, retina information and deoxyribonucleic (DNA) information of the regular user.

16. The authenticated network as claimed in claim 7, wherein the independent input comprises a personal information necessary to boot an information terminal installed with an application software operating on the authenticated network, wherein the personal information comprises at least an information selected from voice, picture and physical information extracted from and able to identify the regular user.

* * * * *